(12) United States Patent
Renick et al.

(10) Patent No.: US 11,623,188 B2
(45) Date of Patent: Apr. 11, 2023

(54) SPINNING VESSEL SYSTEMS AND METHODS FOR MIXING, SUSPENDING PARTICULATES, ALIQUOTING, WASHING MAGNETIC BEADS, AND CONCENTRATING ANALYTES

(71) Applicant: V&P Scientific, Inc., San Diego, CA (US)

(72) Inventors: Joel I. Renick, San Diego, CA (US); John E. Chavez, San Diego, CA (US); Kristi K. Myers, San Diego, CA (US); Alan J. Loi, San Diego, CA (US); Christopher A. Angelo, San Diego, CA (US); Natalie A. Knuth, San Diego, CA (US); Patrick H. Cleveland, Rancho Santa Fe, CA (US); Christopher P. W. Hickman, San Diego, CA (US)

(73) Assignee: V&P SCIENTIFIC, INC., San Diego, CA (US)

( * ) Notice: Subject to any disclaimer, the term of this patent is extended or adjusted under 35 U.S.C. 154(b) by 505 days.

(21) Appl. No.: 16/696,262

(22) Filed: Nov. 26, 2019

(65) Prior Publication Data
US 2020/0164322 A1    May 28, 2020

Related U.S. Application Data

(60) Provisional application No. 62/772,397, filed on Nov. 28, 2018.

(51) Int. Cl.
*B01F 29/81* (2022.01)
*G01N 35/10* (2006.01)
(Continued)

(52) U.S. Cl.
CPC .............. *B01F 29/81* (2022.01); *B01F 23/50* (2022.01); *B01F 31/10* (2022.01); *B01F 33/813* (2022.01);
(Continued)

(58) Field of Classification Search
CPC ............................ B01F 2101/44; B01F 29/81
See application file for complete search history.

(56) References Cited

U.S. PATENT DOCUMENTS

| 3,829,223 A | 8/1974 | Hamel |
|---|---|---|
| 4,123,173 A | 10/1978 | Bullock et al. |

(Continued)

FOREIGN PATENT DOCUMENTS

WO    WO-2020/112801 A1    6/2020

OTHER PUBLICATIONS

International Search Report dated Mar. 25, 2020, for PCT Application No. PCT/US2019/063288, filed Nov. 26, 2019, 5 pages.
(Continued)

*Primary Examiner* — David L Sorkin
(74) *Attorney, Agent, or Firm* — Mintz, Levin, Cohn, Ferris, Glovsky and Popeo, P.C.

(57) ABSTRACT

Provided herein are apparatuses and systems for mixing liquids and suspensions that include vessels with structures that improve mixing while not contacting liquid delivery components. The apparatuses and systems can include a motor drive that allows speed and directional control of rotation of the vessel. The apparatuses and systems can include one or more magnets for separating magnetic beads in a suspension. Also provided are methods using said apparatuses and systems for mixing and separation processes.

21 Claims, 40 Drawing Sheets

(51) Int. Cl.
  *G01N 1/38* (2006.01)
  *B03C 1/28* (2006.01)
  *G01N 35/00* (2006.01)
  *B03C 1/01* (2006.01)
  *B03C 1/033* (2006.01)
  *B01F 23/50* (2022.01)
  *B01F 31/10* (2022.01)
  *B01F 35/71* (2022.01)
  *B01F 33/81* (2022.01)
  *B01F 23/00* (2022.01)
  *B01F 29/00* (2022.01)
  *B01F 101/23* (2022.01)
  *B01F 101/44* (2022.01)

(52) U.S. Cl.
  CPC ............ *B01F 35/7174* (2022.01); *B03C 1/01* (2013.01); *B03C 1/0332* (2013.01); *B03C 1/0335* (2013.01); *B03C 1/288* (2013.01); *G01N 1/38* (2013.01); *G01N 35/0098* (2013.01); *G01N 35/1074* (2013.01); *B01F 23/02* (2022.01); *B01F 29/40221* (2022.01); *B01F 2101/23* (2022.01); *B01F 2101/44* (2022.01); *B03C 2201/18* (2013.01)

(56) References Cited

U.S. PATENT DOCUMENTS

| | | | |
|---|---|---|---|
| 4,197,287 A | 4/1980 | Piasio et al. | |
| 4,665,035 A * | 5/1987 | Tunac | C12M 23/08 435/304.2 |
| 4,883,644 A * | 11/1989 | Perlman | B01F 31/201 422/310 |
| 4,934,828 A | 6/1990 | Janssen | |
| 5,060,151 A * | 10/1991 | Mikyska | B01F 35/212 318/260 |
| 5,084,393 A | 1/1992 | Rogalsky | |
| 5,272,084 A | 12/1993 | O'Connell et al. | |
| 5,328,105 A | 7/1994 | Sims et al. | |
| 6,033,574 A | 3/2000 | Siddiqi | |
| 6,274,726 B1 | 8/2001 | Laugharn, Jr. et al. | |
| 6,461,034 B1 | 10/2002 | Cleveland | |
| 6,509,193 B1 | 1/2003 | Tajima | |
| 6,742,549 B1 * | 6/2004 | Feygin | B01F 35/81 141/102 |
| 2002/0187079 A1 | 12/2002 | Ringleben et al. | |
| 2004/0022123 A1 | 2/2004 | Coville et al. | |
| 2006/0013729 A1 | 1/2006 | Carey et al. | |
| 2007/0212265 A1* | 9/2007 | Ebers | B01F 31/201 422/400 |
| 2010/0181251 A1 | 7/2010 | Alspektor | |
| 2013/0011566 A1 | 1/2013 | Colin et al. | |
| 2017/0014787 A1 | 1/2017 | Douglas et al. | |
| 2017/0333916 A1 | 11/2017 | Kamees et al. | |
| 2018/0154321 A1 | 6/2018 | Ozeki | |

OTHER PUBLICATIONS

Written Opinion dated Mar. 25, 2020, for PCT Application No. PCT/US2019/063288, filed Nov. 26, 2019, 12 pages.

Extended European Search Report dated Aug. 3, 2022, for EP Patent Application No. 19889987.4, 5 pages.

* cited by examiner

| CONCENTRIC RING NAME | RING DISTANCE FROM CENTER (mm) |
| --- | --- |
| 250a | 6.36 |
| 250b | 14.23 |
| 250c | 19.09 |
| 250d | 22.94 |
| 250e | 26.24 |
| 250f | 31.81 |
| 250g | 34.27 |
| 250h | 38.71 |
| 250i | 40.74 |
| 250j | 42.69 |
| 250k | 44.54 |
| 250l | 46.32 |
| 250m | 49.70 |
| 250n | 51.30 |
| 250o | 54.37 |
| 250p | 58.67 |
| 250q | 62.17 |

FIGURE 2F

| CONCENTRIC RING NAME | RING DISTANCE FROM CENTER (mm) |
|---|---|
| 350a | 4.50 |
| 350b | 13.50 |
| 350c | 22.50 |
| 350d | 31.50 |

FIGURE 3J

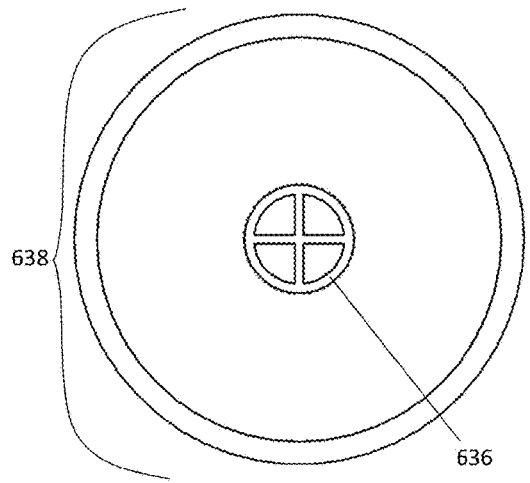
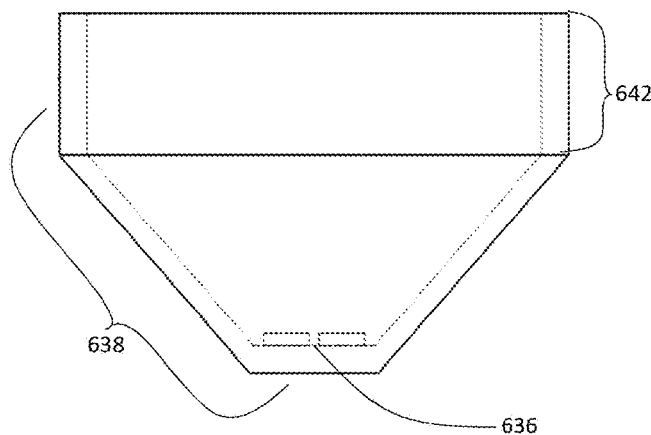
FIGURE 6E  FIGURE 6F
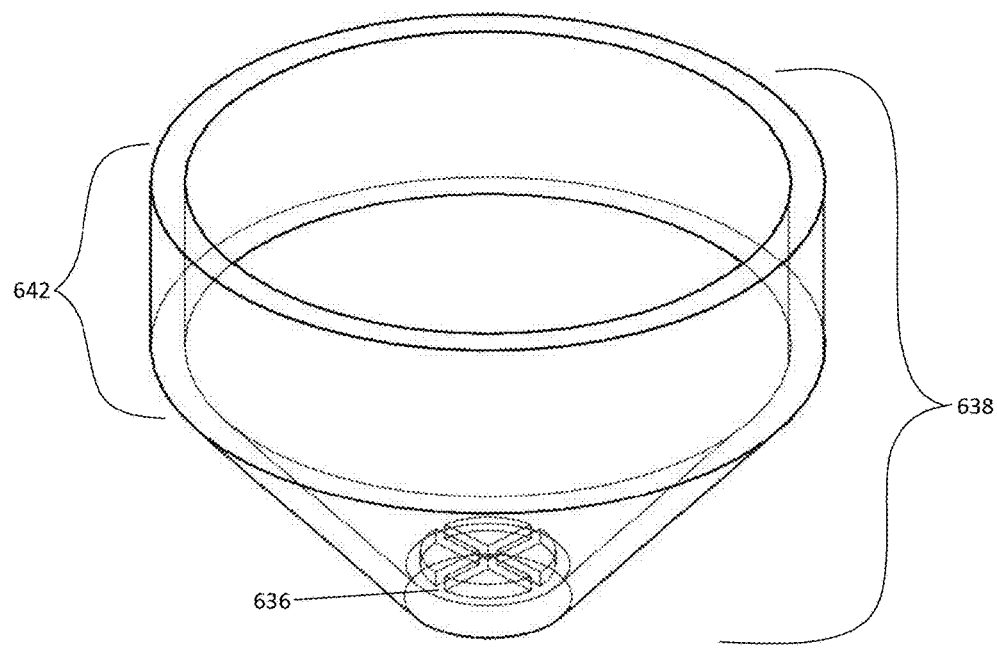
FIGURE 6G

Comparison of Morphology of 190 micron Dextran Bead suspension over time between SpinVessel, Bubble Paddle Mixing, and Magnetic Stir Disc mixing.

| Determine effect of 3 hour pulse spinning in 3 different spin vessels on Human Embryonic Kidney cell line count and viability |||
|---|---|---|
| TREATMENT | NUMBER OF 293-F CELLS/ml | % VIABLE CELLS |
| initial count | 420,000/ml | 97.8% |
| spin vessel in FIG. 3D | 420,000/ml | 97.1% |
| spin vessel in FIG. 2A | 430,000/ml | 96.9% |
| spin vessel in FIG. 6B | 450,000/ml | 96.7% |

FIGURE 25

| Determine effect of long-term pulse spinning in a FIG. 2A spin vessel on Human Embryonic Kidney cell line count and viability |||
|---|---|---|
| TREATMENT | NUMBER OF 293-F CELLS/ml | % VIABLE CELLS |
| initial count | 760,000/ml | 96.0% |
| after 2 hours pulse spinning | 740,000/ml | 97.0% |
| after no pulse spinning for 30 minutes | 14,000/ml | 97.5% |
| after 5 minutes resuming pulse spinning | 720,000/ml | 96.5% |

FIGURE 26

| Determine the horizontal uniformity of cell suspension pulse spinning in a FIG. 2A spin vessel from samples collected with a 12 channel pipet using 2 hour pulse spinning on Human Embryonic Kidney cell line count and viability | | |
|---|---|---|
| TREATMENT | NUMBER OF 293-F CELLS/ml | % VIABLE CELLS |
| initial count | 620,000/ml | 96.1% |
| Channel 1 | 630,000/ml | 95.3% |
| Channel 2 | 650,000/ml | 96.7% |
| Channel 3 | 680,000/ml | 95.8% |
| Channel 4 | 630,000/ml | 96.0% |
| Channel 5 | 640,000/ml | 95.5% |
| Channel 6 | 610,000/ml | 96.6% |
| Channel 7 | 670,000/ml | 95.9% |
| Channel 8 | 590,000/ml | 95.7% |
| Channel 9 | 620,000/ml | 97.0% |
| Channel 10 | 650,000/ml | 95.6% |
| Channel 11 | 590,000/ml | 96.7% |
| Channel 12 | 610,000/ml | 96.8% |

FIGURE 27

SPINNING VESSEL SYSTEMS AND METHODS FOR MIXING, SUSPENDING PARTICULATES, ALIQUOTING, WASHING MAGNETIC BEADS, AND CONCENTRATING ANALYTES

CROSS REFERENCE

The present application claims priority to U.S. Provisional Patent Application No. 62/772,397 entitled "Spinning Vessel Systems and Methods for Mixing, Resuspending, Disrupting and Increasing Surface Area of Solutions" filed Nov. 28, 2018, which is hereby incorporated by reference in its entirety.

TECHNICAL FIELD

Provided herein are apparatuses and systems for mixing liquids and suspensions that include vessels with structures that improve mixing while not contacting liquid delivery components. The apparatuses and systems can include a motor drive that allows speed and directional control of rotation of the vessel. The apparatuses and systems can include one or more magnets for separating magnetic beads in a suspension. Also provided are methods using said apparatuses and systems for mixing and separation processes.

BACKGROUND

Magnetic stirrers, where a magnet is placed in a container with a solution and subjected to rotational force by rotating a magnet underneath the container, are well known in the art. The process of stirring with a magnetic stir element in the vessel has significant drawbacks: At high spin speeds, heavier particulates are spun to the outer wall of the vessel and lighter particulates migrate to the center of the vessel, hence the vortex cone effect of a rapidly spinning stir bar. Also the shear forces created by a physical magnetic stir element placed inside a vessel and spun at a rate of speed to produce a vortex often can break fragile cell membranes, cell walls, vesicles, liposomes, micelles, beads, resins or other particulates due to the friction and grinding action produced by the strong magnetic attraction between the drive magnet and the magnetic stir element. At high speed, shear forces can also entrap air bubbles into the mixture, which can cause a deleterious effect on surface tension, emulsion formation and can cause foaming and subsequent denaturation of proteins. Uniformly suspending particulates (beads, resins, cells, microorganisms, liposomes, or micelles) in a liquid to make uniform reproducible aliquots for dispensing is difficult to achieve with a physical stir element placed in the bottom of the vessel because of the subsequent reduction in fluid volume associated with dispensing operations. Also, the physical dimensions of the stir element prevent automated liquid handlers from removing expensive liquid from the very bottom of the vessel creating a large "dead volume" of liquid that cannot be used in the sampling.

Paramagnetic beads (often conjugated with DNA, RNA, antibodies, antigens, ligands, receptors, or reactive enzymes or proteins) have become a mainstay assay in many fields such as diagnostic assays, sample preparation for DNA sequencing, and protein, antibody, antigen, or cell isolation in basic biology research. The beads must be kept in uniform suspension for aliquoting purposes during certain phases of their use. Unfortunately, most magnetic stir elements cannot be used to keep paramagnetic beads in uniform suspension because the paramagnetic beads will be attracted to and bind to the magnetic stir elements in the vessels.

The cost of a magnetic physical stir element may be significant enough to preclude their use. This is especially true if the stir elements are to be considered disposable. The application protocol may prevent the addition of a physical magnetic stir element to the vessel. The addition of a physical stir element to the vessel adds the risk of sample contamination. One form of sample contamination is with heavy metals (e.g. cadmium and chromium) which are found in less expensive unencapsulated magnetic steel stir elements. Samples can be contaminated by stir elements containing microorganisms, viruses, DNA, RNA, enzymes or other reactive proteins. Re-using magnetic stir elements requires rigorous and expensive cleaning and sterilization methods to render them sufficiently contaminant-free prior to reuse. Re-using a magnetic stir element from samples containing infectious agents, corrosive chemicals, or radioactive isotopes may prove to be too dangerous for re-use. Thorough sampling of the total contents (top and bottom) of the vessel while it is being mixed is difficult with a stir element in the vessel.

Another method for creating vortex mixing cones in vessels is to use a vibrating rubber cup like the "Vortex Genie #1" to produce a vortex cone while manually holding one or more test tubes in the rubber cup while it violently vibrates in place. This method does not lend itself to use on a robotic liquid handler and the process of mixing in vessels with a vibrating rubber cup has significant drawbacks that include the vessel(s) having to be manually held, and/or only two or three vessels can be handled at a time.

Another method for mixing vessels without using physical stir elements are orbital shaker platforms like the New Brunswick orbital shaker and the Vortex Genie II. These orbital shakers use an eccentric shaft coupled to a motor and will mix the contents of multiple large and small vessels as long as the contents are not viscous fluids. The process of mixing the contents of vessels with an orbital shaker has significant drawbacks: They do not vigorously mix in smaller vessels especially those vessels with viscous fluids. They are not compatible with use on automated liquid workstations because of their requirement of an orbital movement in the X and Y directions, as it limits their ability to add or remove material to and from orbital shakers without stopping the orbital shaking action.

Another device, but one used in a totally different application area is the "Wiggler" made by Global Cell Solutions. The Wiggler was designed as a bioreactor for gently culturing organoids and cells by increasing fluid motion in the bioreactor and not as a much more vigorous uniform particulate suspension system for aliquoting particulates. The Wiggler oscillates vessels slowly with tall sinusoidally configured agitators inside the vessel that keep cells moving longitudinally in the vessel but not suspending the cells or organoids to the top of the solution. Another problem with this system is that the tall agitators will protrude through the liquid's meniscus as the volume of the liquid is reduced during aliquoting thus causing shear forces at the meniscus that can entrap air bubbles into the mixture, which can cause foaming and subsequent denaturation of proteins. Still another problem with Wiggler system is that it uses a magnetic clutch system, which does not have the torque capabilities to withstand the greater demands for coupling when a large vessel spinning at high speed needs to stop suddenly to create the turbulence necessary to uniformly suspend the particulates. Also, the volume of liquid in the Wiggler vessel and the orientation of the agitators are not compatible with 4, 5, 6, 8, 12, or 96 pipettors on robotic liquid handlers to remove aliquots.

Another method of suspending particulates for aliquoting is the Bubble Paddle Stirrer U.S. Pat. No. 6,461,034. The Bubble Paddle system has 5 problems, 1) it is very expensive and 2) it is not disposable and must be cleaned and sterilized between uses, 3) the high rate of speed the paddles must turn creates significant shear forces that damage fragile cells and fragile beads, 4) The maximum volume of a particulate solution that a Bubble Paddle Stirrer can keep in uniform suspension is 300 ml, 5) it has a significant "dead volume" of liquid that cannot be used for sampling from the bottom of the Bubble Paddle reservoir.

Consequently, there is a need for an inexpensive sterile disposable method of mixing and uniformly resuspending particulates in preparation for aliquoting, performing sequential assays on chemical and biological reactions, washing magnetic beads, and concentrating analytes in vessels that are compatible with robotic liquid handlers or robotic reagent dispensers.

SUMMARY

In certain aspects of the current subject matter, challenges associated with mixing liquids, suspending particulates, washing magnetic beads, and concentrating analytes can be addressed by inclusion of one or more of the features described herein or comparable/equivalent approaches as would be understood by one of ordinary skill in the art. Aspects of the current subject matter relate to methods and system for mixing liquids, suspending particulates, washing magnetic beads, and concentrating analytes.

In some variations, one or more of the following features may optionally be included in any feasible combination.

Provided herein, inter alia, are systems for mixing liquids and uniformly suspending particulates. In embodiments, provided herein are "spin vessel" systems that include at least one substantially cylindrical vessel with a center and a radius with a vessel opening, a vessel base interior, and a vessel base exterior. The vessel includes a plurality of side fins, the side fins having a side fin width and a side fin height, a plurality of interior projections extending from the vessel base interior, the interior projections having an interior projection width and an interior projection height, and a plurality of circumferences, the circumferences each having a circumference radius. The circumferences have the following radii: 6.4 mm, 14.2 mm, 19.1 mm, 22.9 mm, 26.2 mm, 31.8 mm, 34.3 mm, 38.7 mm, 40.7 mm, 42.7 mm, 44.5 mm, 46.3 mm, 49.7 mm, 51.3 mm, 54.3 mm, 58.7 mm, 62.2 mm; or the following radii: 4.5 mm, 13.50 mm, 22.50 mm, 31.50 mm. Neither the side fin width nor interior projection width extends within 1.5 mm of any of the circumferences. The system can further include a drive base operably connected to the vessel base exterior, a motor operatively connected to the drive base and a motor controller with speed and rotational direction control.

Provided herein are methods for sampling a liquid or suspension by mixing a liquid in the vessels disclosed by rotating the vessel in a clockwise direction for a first period of time, pausing the rotation for a second period of time, rotating the vessel in a counterclockwise direction for a third period of time, and pausing the rotation for a second period of time; and optionally repeating step (a) a plurality of times; and, removing a volume of the liquid or suspension.

Provided herein are systems for magnetic bead attraction and liquid mixing having at least one substantially cylindrical vessel with a center and a radius comprising a vessel opening, a vessel base exterior, an interior vessel wall, and an exterior vessel wall. The vessel having a plurality of side fins, the side fins having a side fin width and a side fin height, wherein the side fin width does not extend into a region closer than 1.5 mm to the center of the vessel. The system including a magnet positioned adjacent to the exterior vessel wall. The system can further include a drive base operably connected to the vessel base exterior, a motor operatively connected to the drive base; and a motor controller with speed and rotational direction control.

Provided herein are methods for separating or washing magnetic beads in a liquid or suspension by (a) mixing a liquid or suspension of magnetic beads in the vessels disclosed by rotating the vessel in a clockwise direction for a first period of time, pausing the rotation for a second period of time, rotating the vessel in a counterclockwise direction for a third period of time, and pausing the rotation for a second period of time, (b) optionally repeating step (a) a plurality of times; (c) applying a magnetic field sufficient to cause a substantial portion of the magnetic beads to adhere to the vessel wall interior, (d) removing a volume of the liquid or suspension from the vessel, (e) optionally adding a second liquid or suspension to the vessel, (f) optionally discontinuing the application of the magnetic field, and (g) optionally repeating steps (a) through (f).

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

BRIEF DESCRIPTION OF THE DRAWINGS

The accompanying drawings, which are incorporated into and constitute a part of this specification, show certain aspects of the subject matter disclosed herein and, together with the description, help explain some of the principles associated with the disclosed implementations. In the drawings:

FIG. 2F shows a table of the radii of the circumferences generated by an 8×12 array of points on 9 mm centers when a substantially cylindrical vessel is rotated on its center;

FIG. 2I illustrates a side view of a spin vessel system including a motor box, motor, motor shaft, and drive base for coupling to the spin vessel;

FIG. 3J shows a table of the radii of the circumferences generated linear array of 8 points on 9 mm center to center spacing] mm centers when a substantially cylindrical vessel is rotated on its center;

FIG. 6E illustrates a top down view of a large conical drive base illustrating the circle with a cross-slot pattern and the perimeter containment for the spin vessel;

FIG. 6F illustrates a side view of a large conical drive base illustrating the circle with a cross-slot pattern and the perimeter containment for the spin vessel;

FIG. 6G illustrates an isometric view of a large conical drive base illustrating the circle with a cross-slot pattern and the perimeter containment for the spin vessel;

FIG. 25 illustrates Human Embryonic Kidney cell suspensions prepared by 3 different spin vessels (illustrated in FIG. 2A, FIG. 3D and FIG. 6B) without loss of cell viability or reduction in cell concentration after 3 hours of pulse spinning.

FIG. 26 illustrates Human Embryonic Kidney cell suspensions prepared by the spin vessel illustrated in FIG. 2A demonstrates the rapidity of resuspending the cells after they are allowed to settle out of solution and without loss of cell viability or reduction in cell concentration.

FIG. 27 illustrates the uniformity of Human Embryonic Kidney cell suspensions collected at different horizontal distances across a FIG. 2A spin vessel and without loss of cell viability or reduction in cell concentration.

DETAILED DESCRIPTION

Figure 1:
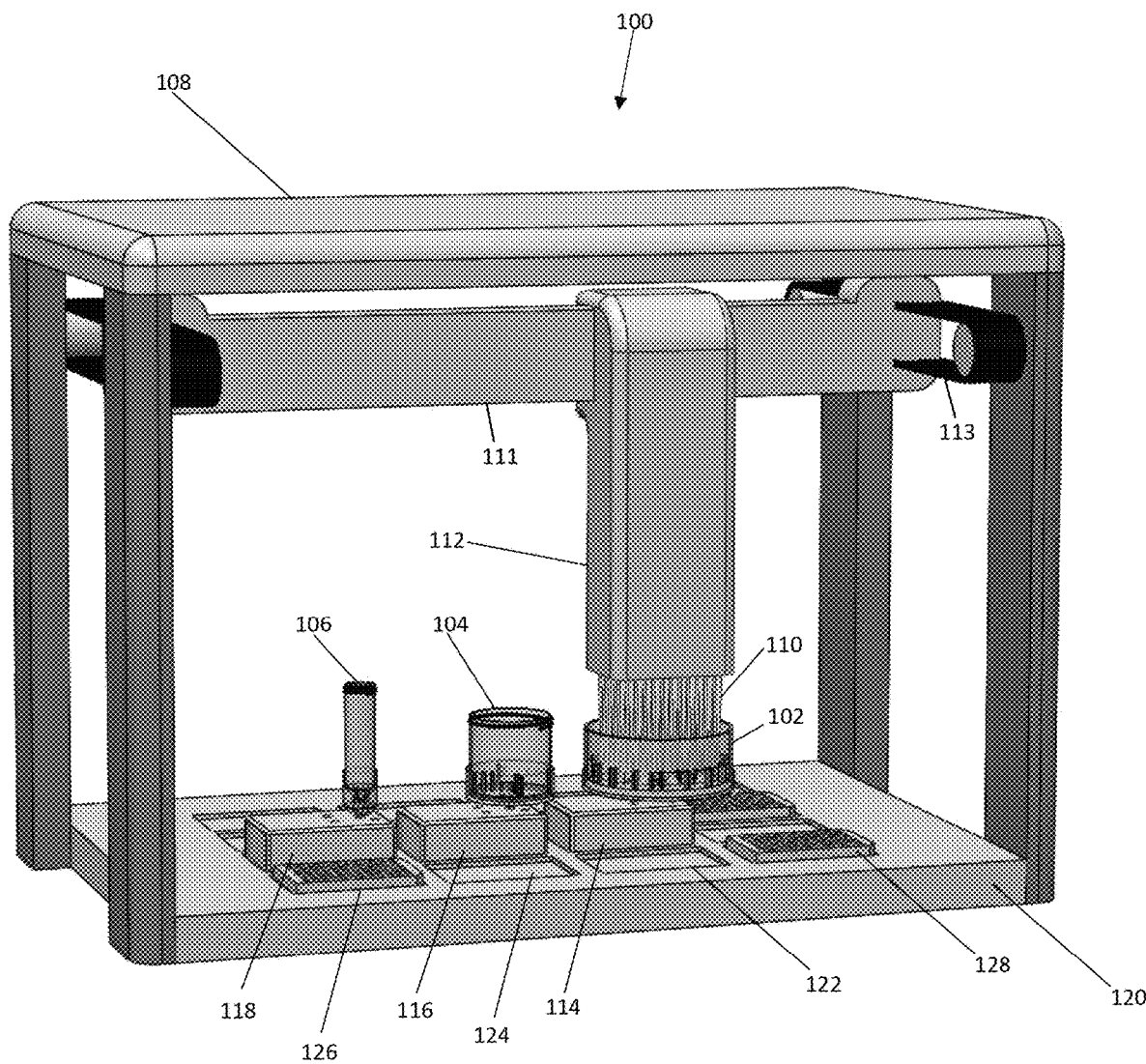
FIG. 1 illustrates an embodiment of a spin vessel system configured to mix solutions and suspend particulates in one or more spin vessels.

Provided herein are apparatuses and systems for mixing liquids and suspensions that include vessels with structures that improve mixing without while not contacting liquid delivery components. The apparatuses and systems can include a motor drive that allows speed and directional control of rotation of the vessel. The apparatuses and systems can include one or more magnets for separating magnetic beads in a suspension. Also provided are methods using said apparatuses and systems for mixing and separation processes.

Applicants have found that the instantly disclosed mixing systems are superior to traditional mixing that is done by rotating an impeller with either axial or radial mounted blades in a stationary vessel, which generates shearing force against the rotating impeller. In the disclosed systems, side fins and interior projections in the vessel move as one unit thereby creating a vortex when rotated. While not wishing to be held by theory, mixing occurs by alternating the rotation of the vessel thereby generating a pulsing radial flow mixing that effectively pushes the mixture to the sidewall, lifts the mixture, and brings it back down to the bottom in the center of the vessel to complete a radial flow loop. Consequently, structures in the vessel allow for adequate mixing of liquids and suspensions by alternating clockwise and counterclockwise rotation without the need for an impeller.

These systems allow users to uniformly mix liquids and suspensions to prepare aliquots, mix liquids, and sequentially follow chemical and biological reactions in real time with multiple variant analysis, wash magnetic beads, and concentrate analytes with magnetic beads. The disclosed systems are compatible with robotic liquid handlers, robotic reagent dispensing systems, and manual dispensing systems. The disclosed systems are superior for use with such liquid handling systems compared to systems that require an impeller or magnetic stirring.

Provided herein are systems that include vessels for uniformly mixing solutions and suspensions and aliquoting same from vessels. The mixing vessel, referred to herein as a spin vessel, is a container for a fluid having a flat bottom and a plurality of side fins at the inside periphery of the container and projections in the flat bottom central area of the container. The spin vessel may receive the material and particulates to be mixed in a liquid. For example, the side fins and projections may be positioned to be compatible with pipet spacing of 18 mm center-to-center spacing and 9 mm center-to-center spacing on a robotic liquid handler. The side fins and projections may be positioned in the spin vessel such that neither the side fins nor the projections may contact the pipet tips of the robotic liquid handler while the vessel is spinning. The side fins and projections may be sized, shaped, and located as to facilitate the suspension of particulates. In alternate embodiments, the spin vessel can be inexpensive, sterile, and disposable.

Another embodiment relates to a spin vessel for particulate aliquoting and mixing in large conical vessels. The large particulate aliquoting and mixing spin vessel may include a container having a conical shape and a flat bottom that ranges from 5 mm to 100 cm with or without projections and with a plurality of side fins at the inside conical periphery of the vessel. The spin vessel may receive the material and particulates to be mixed in a liquid. The side fins may be compatible (e.g., not interfere) with the siphon tubes on a robotic reagent dispenser (e.g., Intregra Viafill, BioTek MultiFlo, Formulatrix Mantis, Hudson Micro 10×, or Thermo Fisher MultiDrop). The side fins may be positioned in the spin vessel such that the side fins may not contact the siphon tubes while the spin vessel is spinning. In alternate embodiments, the spin vessel can be inexpensive, sterile, and disposable.

In certain embodiments, a spin vessel may include at least one side fin positioned on an interior wall of the spin vessel. In certain embodiments, at least one surface projection may be positioned on a bottom surface of the spin vessel. In certain embodiments, a spin vessel may be a vial, a test tube, a centrifuge tube, a cup, a bowl, or a bottle. In certain embodiments, a spin vessel system may include at least 1, at least 4, at least 6, at least 8, at least 10, at least 12, at least 16, at least 24, at least 32 at least 48, and/or at least 96 vessels.

In certain embodiments, the spin vessel may include metal or plastic. In certain embodiments, the plastic may be Polytetrafluoroethylene (PTFE), polypropylene, nylon, polyester, acetal (DELRIN® Acetal homopolymer), Acrylonitrile Butadiene Styrene (ABS), Ultra-High Molecular Weight polyethylene (UHMW), High Density Polyethylene (HDPE), Low Density Polyethylene (LDPE), Polyvinyl Chloride (PVC), Polyvinylidene Difluoride (SOLEF® or KYNAR® PVDF), silicone, modified Polyphenylene Oxide (NORYL® PPO), Fluorinated Ethylene Propylene (FEP), Polyphenylene Sulfide (PPS), Polyether Ether Ketone (PEEK), Perfluoroalkoxy (TEFLON® PFA), Polyetherimide (PEI), Polyamide-Imide (TORLON® PAI), polyamide, polylactic acid (PLA), photo epoxy resin, or photo polymer resin. In certain embodiments, the spin vessel may be machined, molded, or 3-D printed.

Spin vessels, and any other component disclosed herein of similar composition, can be manufactured by a molding process, non-limiting examples of which include thermoforming, vacuum forming, pressure forming, plug-assist forming, reverse-draw thermoforming, matched die forming, extrusion, casting and injection molding. A spin vessel or spin vessel system component (e.g., drive base) as described herein can be made from a suitable injection molding process, non-limiting examples of which include co-injection (sandwich) molding, die casting, fusible (lost, soluble) core injection molding, gas-assisted injection molding, in-mold decoration and in mold lamination, injection-compression molding, insert and outsert molding, lamellar (microlayer) injection molding, low-pressure injection molding, metal injection molding, microinjection molding, microcellular molding, multicomponent injection molding, multiple live-feed injection molding, powder injection molding, push-pull injection molding, reaction injection molding, resin transfer molding, rheomolding, structural foam injection molding, structural reaction injection molding, thin-wall injection molding, vibration gas injection molding and water assisted injection molding.

Injection molding is a manufacturing process for producing objects (e.g., spin vessel system components, for example) from, in some embodiment, thermoplastic (e.g., nylon, polypropylene, polyethylene, polystyrene and the like, for example) and thermosetting plastic (e.g., epoxy and phenolics, for example) materials. Sometimes a plastic material of choice is sometimes fed into a heated barrel, mixed, and forced into a mold cavity or void where it cools and hardens to the configuration of a mold cavity. In some embodiments of injection molding, granular plastic is fed by gravity from a hopper into a heated barrel. Sometimes the granules are slowly moved forward by a screw-type plunger and the plastic is forced into a heated chamber, where it is melted. In certain embodiments, as the plunger advances, the melted plastic is forced through an opening (e.g., a nozzle, a sprue) that rests against the mold, allowing it to enter the mold cavity, sometimes through a gate and/or runner system. In some embodiments a pressure injection method ensures the complete filling of the mold with the melted plastic. In certain embodiments a mold remains cold so the plastic solidifies almost as soon as the mold is filled. Sometimes plastic in a mold is cooled after injection is complete. In some embodiments plastic in a mold is cooled to a predetermined temperature before ejecting the product. Sometimes a mold is cooled to between about 100° C. to about −10° C., about 80° C. to about 20° C., about 80° C. to about 25° C., or about 65° C. to about 25° C. In certain embodiments a mold is cooled to about 85° C., 80° C., 75° C., 70° C., 65° C. 60° C. 55° C. 50° C. or about 45° C.

After the mold cools (e.g., to a predetermined temperature), the mold portions are separated, and the molded object is ejected. In some embodiments, additional additives can be included in the plastic or mold to give the final product additional properties (e.g., anti-microbial, or anti-static properties, for example). In some embodiments, spin vessel system components described herein are injection molded as a unitary construct.

A mold often is configured to hold the molten plastic in the correct geometry to yield the desired spin vessel system component upon cooling of the plastic. Injection molds sometimes are made of two or more parts. In some embodiments molds typically are designed so that the molded part reliably remains on the ejector side of the mold after the mold opens, after cooling. The part can then fall freely away from the mold when ejected from the ejector side of the mold. In some embodiments, an ejector sleeve pushes the spin vessel system component from the ejector side of the mold.

A mold for manufacturing a spin vessel system component by an injection mold process, sometimes comprises a body that forms an exterior portion of a rack component and a member that forms an inner surface of a rack component. A mold can be made of a suitable material, non-liming example of which include hardened steel, pre-hardened steel, aluminum, and/or beryllium-copper alloy, the like, or combinations thereof.

Spin vessels, and any other component disclosed herein of similar composition can be manufactured by 3-D printing. Typically, additive manufacturing or 3-D printing techniques start from a digital representation of the 3-D object to be formed. Generally, the digital representation is divided into a series of cross-sectional layers, which are overlaid to form the object as a whole. The layers represent the 3-D object, and may be generated using additive manufacturing modeling software executed by a computing device. For example, the software may include computer aided design and manufacturing (CAD/CAM) software. Information about the cross-sectional layers of the 3-D object may be stored as cross-sectional data. An additive manufacturing or 3-D printing machine or system utilizes the cross-sectional data for the purpose of building the 3-D object on a layer by layer basis. Accordingly, additive manufacturing or 3-D printing allows for fabrication of 3-D objects directly from computer generated data of the objects, such as computer aided design (CAD) files. Additive manufacturing or 3-D printing provides the ability to quickly manufacture both simple and complex parts without tooling and without the need for assembly of different parts.

Examples of additive manufacturing and/or three dimensional printing techniques include stereolithography, selective laser sintering, fused deposition modeling (FDM), foil-based techniques, and the like. Stereolithography ("SLA"), for example, utilizes a vat of liquid photopolymer "resin" to build an object a layer at a time. Each layer includes a cross-section of the object to be formed. First, a layer of resin is deposited over the entire building area. For example, a first layer of resin may be deposited on a base plate of an additive manufacturing system. An electromagnetic ray then traces a specific pattern on the surface of the liquid resin. The electromagnetic ray may be delivered as one or more laser beams which are computer-controlled. Exposure of the resin to the electromagnetic ray cures, or, solidifies the pattern traced by the electromagnetic ray, and causes it to adhere to the layer below. After a coat of resin has been had been polymerized, the platform descends by a single layer thickness and a subsequent layer of liquid resin is deposited. A pattern is traced on each layer of resin, and the newly traced layer is adhered to the previous layer. A complete 3-D object may be formed by repeating this process. The solidified 3-D object may be removed from the SLA system and processed further in post-processing.

Selective laser sintering ("SLS") is another additive manufacturing technique that uses a high power laser, or another focused energy source, to fuse small fusible particles of solidifiable material. In some embodiments, selective laser sintering may also be referred to as selective laser melting. In some embodiments, the high power laser may be a carbon dioxide laser for use in the processing of, for example, polymers. In some embodiments, the high power laser may be a fiber laser for use in the processing of, for example, metallic materials. Those of skill in the art will recognize that, in some embodiments, other types of high power lasers may be used depending on the particular application. The particles may be fused by sintering or welding the particles together using the high power laser. The small fusible particles of solidifiable material may be made of plastic powders, polymer powders, metal (direct metal laser sintering) powders, or ceramic powders (e.g., glass powders, and the like). The fusion of these particles yields an object that has a desired 3-D shape. For example, a first layer of powdered material may be deposited on a base plate. A laser may be used to selectively fuse the first layer of powdered material by scanning the powdered material to create and shape a first cross-sectional layer of the 3-D object. After each layer is scanned and each cross-sectional layer of the object is shaped, the powder bed may be lowered by one layer of thickness, a new layer of powdered material may be applied on top of the previous layer, and the process may be repeated until the build is completed and the object is generated. The cross-sectional layers of the 3-D object may be generated from a digital 3-D description of the desired object. The 3-D description may be provided by a CAD file or from scan data input into a computing device. The solidified 3-D object may be removed from the SLS system and processed further in post-processing.

Additive manufacturing or 3-D printing systems include, but are not limited to, various implementations of SLA and SLS technology. Materials used may include, but are not limited to, polyurethane, polyamide, polyamide with additives such as glass or metal particles, resorbable materials such as polymer-ceramic composites, etc. Examples of commercially available materials include: DSM Somos® series of materials 7100, 8100, 9100, 9420, 10100, 11 100, 12110, 14120 and 15100 from DSM Somos; Accura Plastic, DuraForm, CastForm, Laserform and VisiJet line of materials from 3-Systems; Aluminium, CobaltChrome and Stainless Steel materials; Maranging Steel; Nickel Alloy; Titanium; the PA line of materials, PrimeCast and PrimePart materials and Alumide and CarbonMide from EOS GmbH.

Spin vessel systems include rotational control that can include setting speed of rotation, duration of the rotation, duration of pause between reversal of rotational direction, and number of cycles and may be individually selected and/or set. The turbulent uplifting mixing action caused by the reversal of spin direction may keep even heavy particulates in uniform suspension. Depending upon the physical size, shape, and density of the particulates, the diameter of the vessel, and the viscosity of the liquid, the various control variables (speed, rotational distance, pause, reversal, and number of spin cycles) can be determined by one skilled in the art. The design of the control mechanism facilitates the setting of these variables.

Various embodiments of a spin vessel system and methods are described herein that provide a number of benefits, including gentle yet vigorous mixing, suspension, or blending of a sample while avoiding contamination, which may allow materials to be added and aliquots to be removed while still mixing or uniformly suspending particulates for dispensing and aliquoting operations, mixing viscous reagents, dissolving solids into liquids, and washing magnetic beads and concentrates analytes with magnetic beads.

The spin vessel systems and methods as described may provide more rigorous stirring action than current orbital shakers on viscous liquids, and may include more platform stability which may be more compatible with robotic work stations for sequential addition of materials to a spin vessel while mixing, sampling chemical reactions over time, or sampling of products produced by growing biological organisms over time and after precise addition of growth stimulating factors or growth challenging factors with time and multiple variant analysis.

The spin vessel systems and methods as described may provide uniform aliquoting of particulates in fluids by keeping the particulates in uniform gentle suspension for dispensing operations. Paramagnetic beads may be easily kept in uniform suspension using one or more embodiments of the spin vessel system, as described herein. In some embodiments, no restrictions concerning liquid volume may be encountered to either addition of material or removal of sample when the disclosed spin vessel systems are used.

In some embodiments, shear forces applied to the spin vessel system, as described herein, may be lower than forces applied using magnetic stir elements and thus, may not damage fragile particulates. The spin vessel and the reversal of rotational direction may create an uplifting turbulence with less destructive shear forces for fragile particulates.

The spin vessel systems and methods as described may produce both centrifugal forces and gentle shear forces resulting in an uplifting turbulence being generated in the contents, thus mixing, dissolving, blending, emulsifying, suspending particulates, washing magnetic beads, or concentrating analytes with magnetic beads. Such actions may be produced without the necessity of placing a stir element inside the spin vessel, as one or more side fins and/or one or more projections of the spin vessel may become the moving stir element, and friction between the fluid and the side fins and/or projections may produce an uplifting turbulent shear force configured to mix the contents.

Operation of Control System

Provided herein are computer systems operably coupled to at least one motor configured to drive the spin vessel. The computer system can include components, such as a programmable processor, that are configured for running one or more logic function, such as with respect to a program stored in a memory module coupled to the processor. To provide interaction with a user, the system also may use a touch screen interface or device. In some embodiments, the touch screen may be the primary way that users interface with the system. Computer programs in a variety of languages may be used to run the applications. This embodiment may include memory and storage modules as well as a network interface to communicate with other computers and to download programs. Such programs may include, for example, speed regulation as the volume in the vessel decreases after removing many aliquots of liquid.

A controller of the spinning mechanism may be configured to have an interactive touch screen that allows for the input of data and setting of control values including speed of rotation, duration of the rotation, and pause between reversal of rotational direction, number of reversal cycles to be repeated each of which may be individually determined for each application and particulate. Depending upon the physical size, shape, density of the particulates, the diameter of the vessel, and the viscosity of the liquid, the various control variables (speed, rotational distance, pause, reversal speed and rotational distance and number of cycles) can be determined by one skilled in the art. The design of the controller mechanism facilitates the setting of the variables.

Such embodiments of the spin vessel system as described herein may be used to aliquot magnetic beads, resin beads, blood, cells, fungi, algae, bacteria, virus particles, phage particles, vesicles, liposomes, micelles, DNA, RNA, proteins, antigens, antibodies, ligands, analytes, liquids, chemicals, slurries of test articles or drugs, chemical or biological reaction products. Embodiments of a spin vessel system coupled with an Intregra Viafill or similar robotic reagent dispenser may be used to sequentially monitor chemical or biological reaction product production and multivariant analysis in a timed sequential manner.

Any of the spin vessel embodiments disclosed above can be configured to be used in conjunction with an apparatus that allows separation methods using magnetic beads. Provided herein are systems that include one or more spin vessels that include one or more magnets opposed to the exterior wall of the spin vessel. The magnet can be a permanent magnet or an electromagnetic. The magnet can generate a magnetic field, when applied, sufficient to cause magnetic beads in the spin vessel to adhere to the interior wall of the spin vessel. In embodiments, the magnet can generate a field of at least a 30 megagauss-oersteds (MG·Oe) magnetic field. Megagauss-oersted is a term used to describe the density of the magnetic lines of flux or magnet performance or maximum energy product (often abbreviated as $BH_{max}$), and is typically measured in units of megagauss-oersteds (MG·Oe). For example, 1 MG·Oe is approximately equal to 7957.74715 J/m³. Because the spin vessels may be compatible with robot liquid handlers and programmable through a control system, the tedious job of magnetic bead washing can be achieved using a robot.

Selection of a spin vessel with side fins and/or projections and determination of whether to rotate the spin vessel in one rotational direction continuously or reversing the spin direction repeatedly may determine which of the various methods as described herein can be performed. Thus, one spinning machine can effectively be used to affect several different method processes. By constructing the vessels with low side fins and projections that may be arranged to avoid contacting a plurality of pipet tips, including for example, either single, 4, 5, 6, 8, 12, or 96 pipet tips, on a liquid handler when the vessels are spinning, the vessel can be readily sampled (aliquoted) or added to while spinning (in uniform suspension) and the near total volume of the vessel may be available for use.

One or more embodiments of a spin vessel may be configured for integration with a robotic liquid handler or a robotic reagent dispenser, and thereby facilitates applications of the spin vessel, especially in the large batch aliquoting of particulates such as magnetic beads, resin beads, blood, cells, fungi, algae, bacteria, virus particles, phage particles, vesicles, liposomes, micelles, DNA, RNA, mRNA, proteins, recombinant proteins, secretory proteins, or media from recombinant cell culture supernatants of animals, insects, fungi, yeast, algae, plants, bacteria or, antigens, antibodies, ligands, analytes, chemical or biological reaction products.

Motor Drive Systems

In some embodiments of a spin vessel system, a motor shaft may be coupled to a drive base having a perimeter wall surrounding a spin vessel. The drive base may include a friction fit, O-ring, a slot system, a tab system, or set screw system which may correspond to a matching complementary system of the exterior bottom of the spin vessel. For example, a slot system coupling with a tab system can provide a stable connection between the drive base and the spin vessel bottom to allow effective alternating rotation repeatedly at varying speeds, varying rotational directions, and/or having various pause times. A stable tab/slot system connection between the spin vessel and the drive base can be advantageous for 40 mm diameter and larger spin vessels where the spin speed and reversal of rotational direction cause increased torque forces. Spin vessels have been made with diameters as small as 10 mm and as large as 145 mm. Spin vessels can be as large as 100 cm in diameter, or larger.

In some embodiments, a spin vessel system may include a single motor shaft configured to drive multiple drive bases. For example, each drive base may be coupled with a spin vessel via a pulley belt drive system or a gear system.

In certain embodiments, the drive base may include metal or plastic. In certain embodiments, the plastic may be Polytetrafluoroethylene (PTFE), polypropylene, nylon, polyester, acetal (DELRIN® Acetal homopolymer), Acrylonitrile Butadiene Styrene (ABS), Ultra-High Molecular Weight polyethylene (UHMW), High Density Polyethylene (HDPE), Low Density Polyethylene (LDPE), Polyvinyl Chloride (PVC), Polyvinylidene Difluoride (SOLEF® or KYNAR® PVDF), silicone, modified Polyphenylene Oxide (NORYL® PPO), Fluorinated Ethylene Propylene (FEP), Polyphenylene Sulfide (PPS), Polyether Ether Ketone (PEEK), Perfluoroalkoxy (TEFLON® PFA), Polyetherimide (PEI), Polyamide-Imide (TORLON® PAI), polyamide, PLA, photo epoxy resin, or photo polymer resin. In certain embodiments, the drive base may be machined, molded, or 3-D printed.

Motor Drive

In some embodiments, a spin vessel system may be configured to reverse a rotational direction of a spin vessel to create turbulence and a suspension of particulates and mixing of the spin vessel contents in one or more solutions. The spin vessel system may include at least one spin vessel having an opening, a plurality of side fins and/or a plurality of central projections, a spin vessel base having a tab system and a spin vessel exterior diameter, a drive base, and a motor drive operatively connected to the drive base. The drive base may include a substantially cylindrical base having a proximal region, a distal region, and a diameter. The proximal end of the drive base may be configured to be coupled to a base of the spin vessel via a slot system.

In some embodiments, the proximal region of the drive base may be adapted to friction fit to the spin vessel. In other embodiments, the proximal region of the drive base may include a setscrew collar or an O-ring. The O-ring can include rubber. The drive base can be metal or plastic. In certain embodiments, the plastic may be Polytetrafluoroethylene (PTFE), polypropylene, nylon, polyester, acetal (DELRIN® Acetal homopolymer), Acrylonitrile Butadiene Styrene (ABS), Ultra-High Molecular Weight polyethylene (UHMW), High Density Polyethylene (HDPE), Low Density Polyethylene (LDPE), Polyvinyl Chloride (PVC), Polyvinylidene Difluoride (SOLEF® or KYNAR® PVDF), silicone, modified Polyphenylene Oxide (NORYL® PPO), Fluorinated Ethylene Propylene (FEP), Polyphenylene Sulfide (PPS), Polyether Ether Ketone (PEEK), Perfluoroalkoxy (TEFLON® PFA), Polyetherimide (PEI), Polyamide-Imide (TORLON® PAI), polyamide, polylactic acid (PLA), photo epoxy resin, or photo polymer resin. The drive base can be machined, molded, or 3-D printed.

In some embodiments, the motor drive may include a control mechanism that can control speed of rotation, direction of rotation, duration of rotation, length of pause of rotation, reversal of rotation direction, and length of time the cycle will repeat.

In some embodiments, the motor may be a direct drive with each vessel directly mated to a single motor via a drive shaft and drive base.

In other embodiments, the motor may be an indirect drive. The indirect motor drive can be a belt driven pulley system or a gear system with a pulley base or gear base that mates to the spin vessel.

In some embodiments, the drive shaft may include a drive shaft base configured to securely attach to the spin vessel by complementary threading on the drive shaft base. The threading can be right-handed or left-handed. The threading can be interior or exterior threads. Other configurations to securely attach the shaft base to the spin vessel may include, but are not limited to, by friction fit, a collar such as a set screw collar, O-rings that can include flexible material such as rubber, or a tab/slot configuration wherein complementary tabs on the spin vessel can be indexed and affixed to the complementary slot features on the proximal region of the drive shaft base, pulley base or gear base. One skilled in the art will understand the matching attachment configuration based on the selected spin vessel.

Methods

Provided herein are methods for efficiently and adequately mixing liquids or suspending particulates in solution and, in embodiments, delivering at least a portion of the liquid or suspension. The methods include mixing a liquid or suspension in a spin vessel system disclosed above, subjecting it to alternating rotation sufficient to yield a homogeneity, and removing at least a portion of the liquid or suspension. Removal can be accomplished using pipetting or dispensing methods. Alternate rotational mixing can be accomplished by reversing the rotational direction from a first rotational direction to a second rotational direction (e.g., clockwise and counterclockwise directions) of a spin vessel at a speed and reversal pulse cycle (turbulence) sufficient to create an uplifting mixing action and uniform suspension of particulates, consistent with implementations of spin vessel systems as described herein. In certain embodiments, the particulate component may include particulates such as magnetic beads, resin beads, blood, cells, fungi, yeast, algae, bacteria, virus particles, phage particles, vesicles, liposomes, micelles, DNA, RNA, proteins, antigens, antibodies, ligands, analytes, slurries of test articles or drugs, chemical, or biological reaction products.

In some embodiments, a method of a spin vessel system for agitation mixing a solution by reversing the rotational direction from a first rotational direction to a second rotational direction (e.g., clockwise and counterclockwise directions) of a vessel at a speed and reversal pulse cycle (turbulence) sufficient to create an uplifting mixing action may be provided, consistent with implementations of spin vessel systems as described herein. In certain embodiments, the method may include introducing a particulate component to a spin vessel while turbulence occurs in the spin vessel thus providing rapid mixing of a new component in the spin vessel. Such embodiments of the spin vessel system may enable the initiation of a chemical or biological reaction that can be followed sequentially by a robotic liquid handler or a robotic reagent dispenser configured to remove subsequent samples at regular intervals for multivariant analysis.

Provided herein are methods for using magnetic beads for concentrating an analyte such as DNA, RNA, mRNA, antibody, antigen, protein, recombinant proteins, secretory proteins, or recombinant cell culture supernatants of animals, insects, fungi, yeast, algae, plants, bacteria, or virus, phage, and vesicles, liposomes, or micelles from a specimen like urine, blood, stool, bronchial lavage, or other such source. In certain embodiments, the magnetic beads may be linked such that the magnetic beads may bind to particulates, cells, DNA, RNA, mRNA, exosomes, fungal, bacteria, virus particles, phage, vesicles, liposomes, micelles, slurries of test articles or drugs, chemical reaction products, proteins, antigens, antibodies, or biotinylated ligands. Magnetic beads may have a specific ligand attached for concentrating the analyte on the magnetic beads and then collecting the magnetic beads to the side of the vessel wall near a magnetic field. Repeating the resuspension of the magnetic beads in the specimen several times before removing the specimen may ensure the maximum capture and concentration of the analyte. By repeating the wash procedure, as described above, several times, the maximum exposure of the component may be achieved. The beads can be subjected to one or more wash cycles, and the concentrated analyte can be eluted from the magnetic beads and processed. Because the spin vessels may be compatible with robot liquid handlers, the tedious job of magnetic bead concentrating an analyte and washing can be done on a robot.

In embodiments, a spin vessel system that includes a magnetic field placed adjacent to the spin vessel wall to perform analyte separation and concentration. A spin vessel containing a suspension of magnetic beads can be subjected to alternating rotational movement causing turbulence and pulsed axial flow up the vessel wall such that the magnetic beads may be suspended and washed in a liquid retained by the spin vessel. When the spin vessel stops spinning, the magnetic beads can be subjected to a magnetic field sufficient to cause the beads to adhere to the interior wall of the spin vessel. After the active magnetic beads are captured by the magnet, the liquid and weakly magnetic beads may be removed and, optionally, a second liquid may be added. In some steps, the second liquid can be additional analyte-containing sample to further concentrate a sample. In some steps, the second liquid can be a wash solution to remove non-analytes. In some steps, the second liquid can be an elution solution that causes release of the analyte from the magnetic beads. The process may be repeated until the desired level of concentration, washing, or elution is achieved. In certain embodiments, the method may include periodically alternating the rotational direction of the spin vessel in altering rotational directions (e.g., clockwise and counterclockwise rotations). In certain embodiments, the spin vessel may be rotated at about 10 to 1,000 RPM.

In some embodiments, the spin vessel may be positioned in a static location on an automation platform where mixing, collecting of magnetic beads, removal of old wash buffer, addition of new wash buffers followed by more mixing and collecting of magnetic beads may be performed at the same X & Y position on the automation platform.

In some embodiments, provided are methods of washing magnetic beads by rotationally spinning a spin vessel with side fins or projections having a strong magnetic field placed adjacent to the spin vessel wall at a speed sufficient to create a vortex in a spin vessel system, according to the embodiments above, which may cause the magnetic beads to be suspended and washed in a liquid contained by the spin vessel. When the spin vessel stops rotational movement, the magnetic beads may again be attracted to the spin vessel wall adjacent the strong magnet. After all the magnetic beads are captured by the magnet, the old liquid may be removed and a new liquid may be added, and the process may be repeated until the desired level of washing is achieved. In certain embodiments, the method may include periodically alternating the rotational direction of the spin vessel in clockwise and counterclockwise rotations. In certain embodiments, the spin vessel may be rotated at about 10 to 1,000 RPM.

In some embodiments, magnetic beads having receptors specific for said analyte can be used to concentrate component analyte using a magnetic bead washing platform as described above and then rotating a spin vessel with side fins or projections to mix and expose the magnetic beads to the component analyte to be concentrated and then collect the component analyte magnetically when the rotational movement is stopped. By repeating the wash procedure several times, the maximum concentration of the component may be achieved. In certain embodiments, the magnetic beads may be linked such that the magnetic beads may bind to soluble components, secreted proteins from cell culture supernatants, cell culture supernatants from recombinant DNA injected cells producing human, animal, insect, plant, fungal, bacterial, viral, or phage proteins, particulates, animal insect and plant cells, DNA, RNA, mRNA, exosomes, bacteria, virus particles, phage, vesicles, liposomes, micelles, chemical reaction products, proteins, antigens, antibodies or biotinylated ligands.

Spin Vessel Mixing

Various embodiments of a spin vessel system and methods are described herein that may include a method of mixing and suspending particulates predicated on fluid dynamics and flow geometry. In some embodiments, a method of blending may be achieved by integrating radially oriented side fins and projections into the spin vessel system and rotated in different directions to generate a pulsing radial fluid flow. The flow path may start at a bottom of the spin vessel, where the fluid and particulates may be pushed to the sidewalls of the spin vessel. As the fluid and particle mixture strikes the sidewall, the angled side fins may guide the fluid flow up the spin vessel, thus generating lift along the spin vessel walls. The fluid flow loop may be completed by the mixture flowing down the center of the spin vessel due to gravity and the nature of radial flow.

The projections and side fins of the spin vessel system may provide one or more benefits including adequate mixing even for low volume applications where a scientist must aliquot from a bottom of a vessel. For this reason, the side fins and projections may be positioned at the bottom of the spin vessel, protruding no more than 25% of the total spin vessel height. Moreover, because the projections and side fins are positioned adjacent the bottom of the spin vessel, fluid flow may occur and generate effective mixing through radial flow. Axial flow, while a dominant mixing method with less shear force, may require angled projections that require clearance between the bottom of the vessel and the projection. Such radial flow may benefit scientists working with low volume mixtures. Similarly, radial flow may prevent higher liquid volume mixtures from generating unwanted frothing, protein denaturation and aeration.

Various embodiments of a spin vessel system and methods are described herein that provide a number of benefits, including effective mixing in a spin vessel using a controller technique, which may include switching the directions of rotation. Traditional mixing may be performed by rotating an impeller with either axial or radial mounted blades in a stationary vessel. In one or more embodiments of the spin vessel system as described herein, the side fins and projections may move as one unit. In traditional methods, a stationary vessel wall may generate shearing force against the rotating impeller, which may cause mixing to occur with the impeller spinning in just one direction. In one or more embodiments of the spin vessel system as described herein, the spin vessel may rotate with one or more projections and side fins, such that spinning in one direction may only create vortexing. To create a radial flow, and therefore mixing, the spin vessel may reverse rotational direction. Such reversal may immediately and effectively rotate the side fins and projections in the direction opposite the fluid flow, thus generating the pulsing radial flow-mixing phenomenon that effectively pushes the mixture to the sidewall, lifts the mixture, and brings the mixture back down to the bottom of the spin vessel.

A spin vessel system may be configured to mix and suspend particulates, aliquot samples, preform time sequenced multivariant assays, wash magnetic beads, and concentrate analytes with magnetic beads by spinning vessels having internal side fins and/or projections by controlling the speed, number of rotations, and reversing the direction of rotational movement of the spin vessel from clockwise to counterclockwise while operating in conjunction with pipetting robotic liquid handlers or robotic reagent dispensers.

Various embodiments of disclosed spin vessel systems now follow. FIG. 1 illustrates an embodiment of a spin vessel system 100 configured to mix solutions and suspend particulates in one or more spin vessels, including a first spin vessel 102, a second spin vessel 104, and/or a third spin vessel 106. The spin vessels may be positioned on a robotic liquid handler 108.

In some embodiments, the spin vessels may be configured for use with a plurality of pipets 110. For example, the plurality of pipets 110 may include 1, 4, 5, 6, 8, 12, 16, 24, or 96 pipet tips. Each pipet may be configured to add and/or remove a sample into and/or from the spin vessel. The pipet tips may be coupled by friction fit to a manifold inside a Z-axis gantry 112 for vertical movement. The robotic liquid handler 108 may also be configured to control movement along an X-axis 113 and a Y-axis 111.

In embodiments, the disclosed spin vessel system can include any combination of configurations. For example, a first spin vessel 102 may be configured to accommodate 96 pipet tips, a second spin vessel 104 may be configured to accommodate eight pipet tips, and a third spin vessel 106 may be configured to accommodate a single pipet tip.

The spin vessel system 100 may include one or more motor boxes configured to drive the one or more spin vessels. For example, a first motor box 114, a second motor box 116, and a third motor box 118 may be positioned on a deck 120 of the robotic liquid handler 108. The motor boxes may be configured to be fit into one or more microplate deck positions on the deck 120 of the robotic liquid handler 108. The one or more microplate deck positions may include a first microplate deck position 122, a second microplate deck position 124, and/or a third microplate deck position 126.

For example, a first spin vessel 102 may be configured to couple with the first motor box 114. The first motor box 114 may be configured to be positioned into the first microplate deck position 122. Similarly, a second spin vessel 104 may be configured to couple with the second motor box 116. The second motor box 116 may be configured to be positioned into the second microplate deck position 124. A third spin vessel 106 may be configured to couple with the third motor box 118. The third motor box 118 may be configured to be positioned into the third microplate deck position 126.

Alternatively, a first spin vessel 102 coupled with the first motor box 114 may be configured to be positioned into the second microplate deck position 124 or the third microplate deck position 126. Likewise, a second spin vessel 104 coupled with the second motor box 116 may be configured to be positioned into the first microplate deck position 122 or the third microplate deck position 126. A third spin vessel 106 coupled with the third motor box 118 may be configured to be positioned into the first microplate deck position 122 or the second microplate deck position 124.

In some embodiments, one or more of the microplate deck positions, including the first microplate deck position 122, the second microplate deck position 124, the third microplate deck position 126, and/or other microplate deck positions may be configured to receive a microplate 128. The deck 120 of the robotic liquid handler 108 may be configured with a plurality of microplate deck positions configured to correspondingly hold one or more microplates (e.g., such as microplate 128). The microplate 128 may include and/or be formed of a plastic dish having a plurality of wells equivalent to small test tubes that are commonly used in many scientific applications. For example, one or more microplates may include 6, 24, 48, 96, 384, or 1,536 wells. In some embodiments, the microplates may have standardized X and Y dimensions, regardless of the number of wells in the microplates. For example, the dimensions of the microplates may be 127.71 mm×85.43 mm, and may include 6, 24, 48, 96, 384, or 1,536 wells. In some embodiments, the deck 120 of the robotic liquid handler 108 may include nine microplate deck positions. The plurality of microplate deck positions (e.g., microplate deck positions 122, 124, 126) may be sized to accommodate a microplate (e.g., such as microplate 128). In some embodiments, one or more of the spin vessel motor boxes (e.g., motor boxes 114, 116, and/or 118) may be dimensioned to a similar size as the microplates. For example, one or more of the motor boxes may include dimensions of 127.71 mm×85.43 mm. Such similar dimensional sizing may facilitate placing one or more spin vessels on the deck 120 such that the robotic liquid handler 108 may be configured to precisely determine where to place the pipet tips.

Figure 2A:
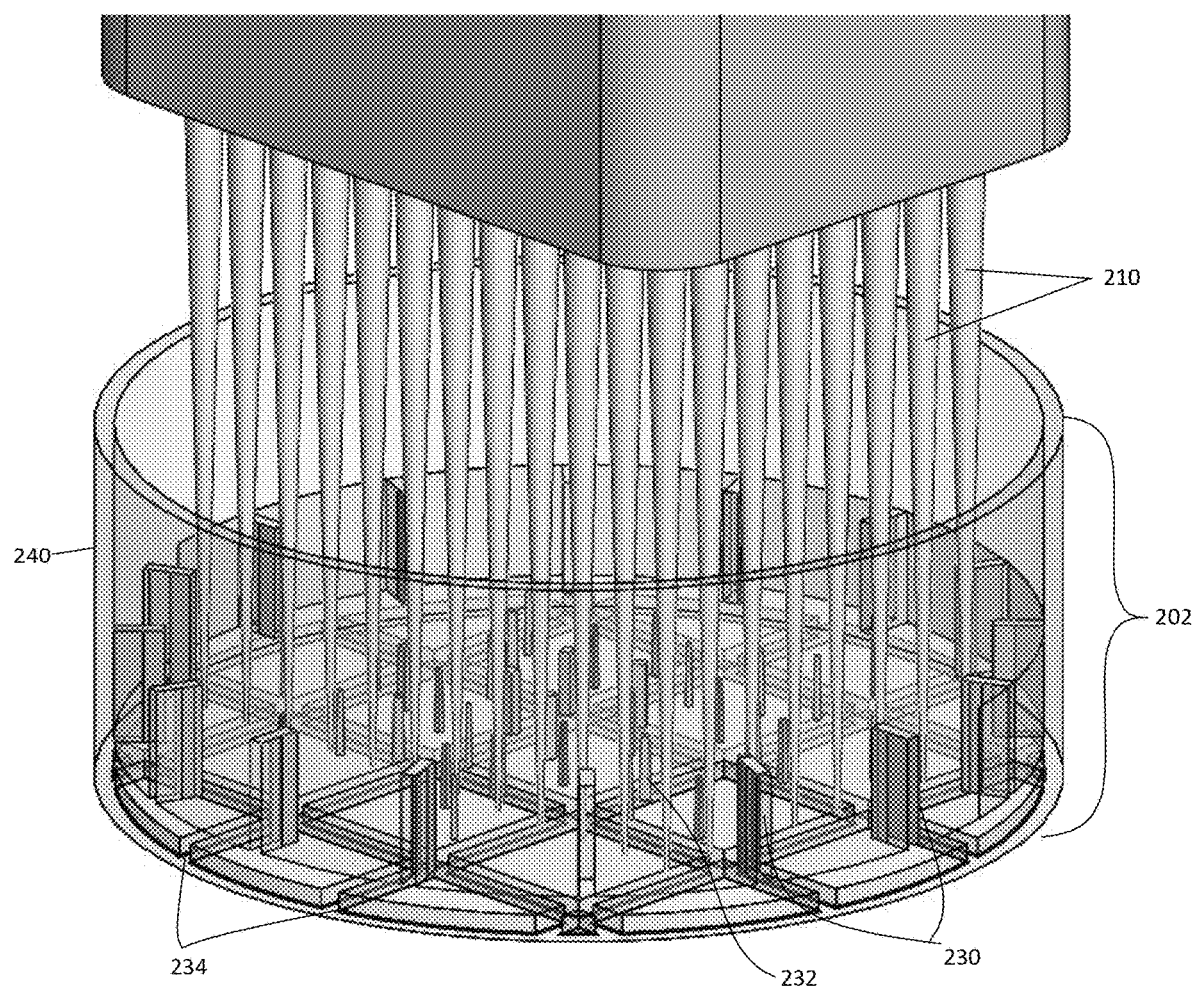
FIG. 2A illustrates an isometric view of a spin vessel and a plurality of pipet tips.
Figure 2B:
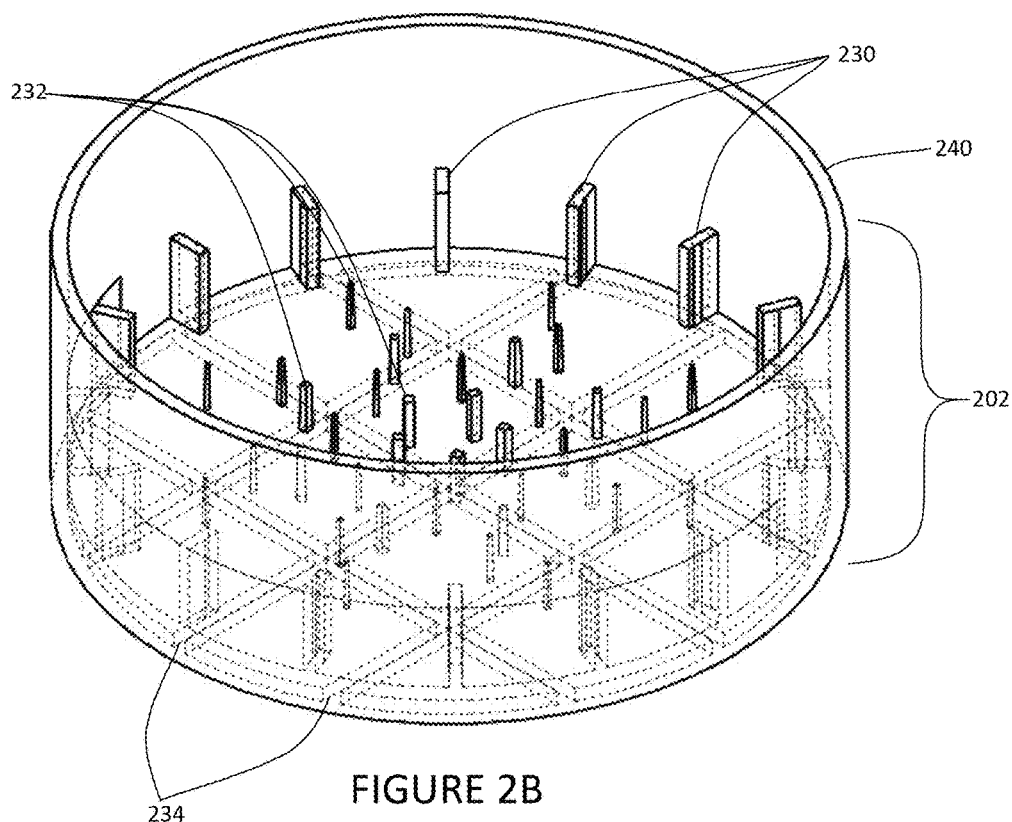
FIG. 2B illustrates an isometric view of the spin vessel of FIG. 2A including side fins and projections positioned to avoid hitting one or more pipet tips of a robotic liquid handler when the spin vessel is rotated.
Figure 2C:
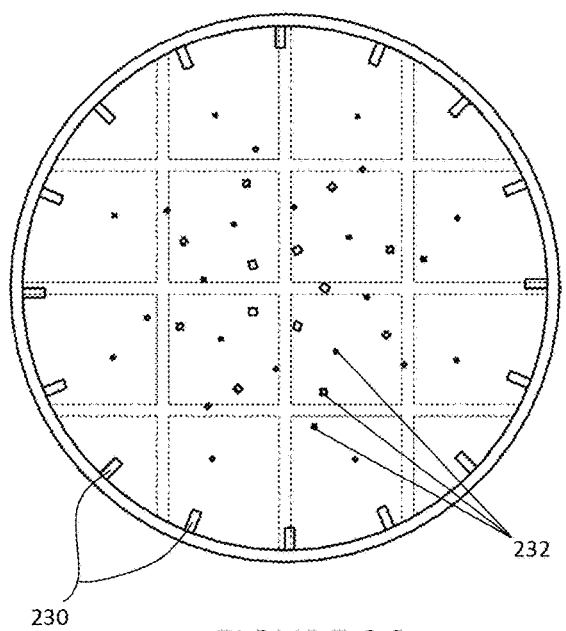
FIG. 2C illustrates a top down view of an inside bottom of the spin vessel of FIG. 2A including a square tab structure configured to couple a bottom of the spin vessel with square slots on a drive base attached to a motor shaft.
Figure 2D:
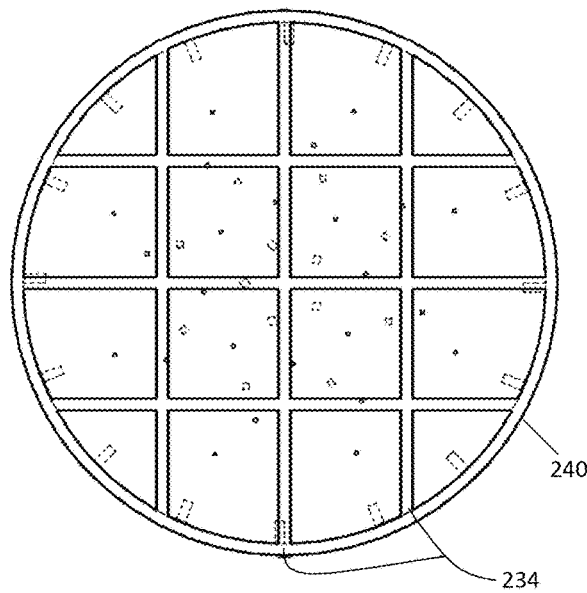
FIG. 2D illustrates a bottom view of an outside bottom of the spin vessel including a square tab structure configured to couple the bottom of the vessel with the square slots on the drive base attached to the motor shaft.

FIG. 2A illustrates an isometric view of a spin vessel 202 in opposition to a plurality of pipet tips 210. One or more interior projections 232 and one or more side fins 230 are located within the spin vessel 202 to avoid contact with the plurality of pipet tips 210 during rotation of the spin vessel 202. The side fins can have a width that is independently at least 1 mm, at least 2 mm, at least 3 mm, at least 4 mm, at least 5 mm, at least 10 mm, at least 20 mm, at least 30 mm, at least 40 mm, at least 50 mm, at least 75 mm, at least 100 mm, at least 125 mm, at least 150 mm, or at least 200 mm. The interior projections can have a width that is independently at least 1 mm, at least 2 mm, at least 3 mm, or at least 4 mm. The height of the side fins and/or interior projections can be less than 20% of the vessel height. In embodiments, the height of the side fins and/or interior projections is below the minimum fill level of the spin vessel. In embodiments, neither side fins nor interior projections are within a 12.5 mm radius of the center of the vessel. The spin vessel 202 may include one or more connecting tabs 234. The connecting tabs 234 may be arranged in a "waffle" pattern. Such pattern may allow the connecting tabs 234 to interlock with one or more slots, shown as the slot system 236 in FIG. 2H. In some embodiments, the spin vessel 202 may be configured to mix and aliquot, particulates, magnetic beads, resin beads, blood, cells, fungi, algae, bacteria, virus particles, phage particles, vesicles, liposomes, micelles, DNA, RNA, proteins, antigens, ligands, analytes, chemicals, liquids, slurries of test articles or drugs, chemical, and/or biological reaction products. In some embodiments, the spin vessel 202 may be coupled with a robotic liquid handler (e.g., robotic liquid handler 108, shown in FIG. 1) and configured to sequentially monitor chemical or biological reaction product production and multivariant analysis in a timed sequential manner.

FIGS. 2A through 2I illustrate an embodiment of a spin vessel 202. The spin vessel 202 may be configured for use with a plurality of pipets. The spin vessel can be sized to accommodate at least 2, 4, 8, 16, 32 or 96 pipets. In some embodiments, the plurality of pipets 210 may include 96 pipets or pipet tips. As used and described herein, "pipets", "pipet tips", and/or "pipettors" may be used interchangeably to refer one or more of the features described herein or comparable/equivalent structures, as would be understood by one of ordinary skill in the art.

The spin vessel 202 includes a plurality of side fins 230 positioned on an interior wall 240 of the spin vessel. The spin vessel 202 may include a plurality of projections 232 and a tab system 234. The side fins 230, the projections 232, and the tab system 234 may be configured to index with a slot system 236 on a drive base 238. The slot system 236 may be configured to provide a stable connection between a motor and the spin vessel 202. Such stability may be necessary for the spin vessel 202 to withstand the force applied responsive to the rotational movement of the spin vessel 202 being suddenly changed from a first rotational direction to a second rotational direction.

Figure 2E:
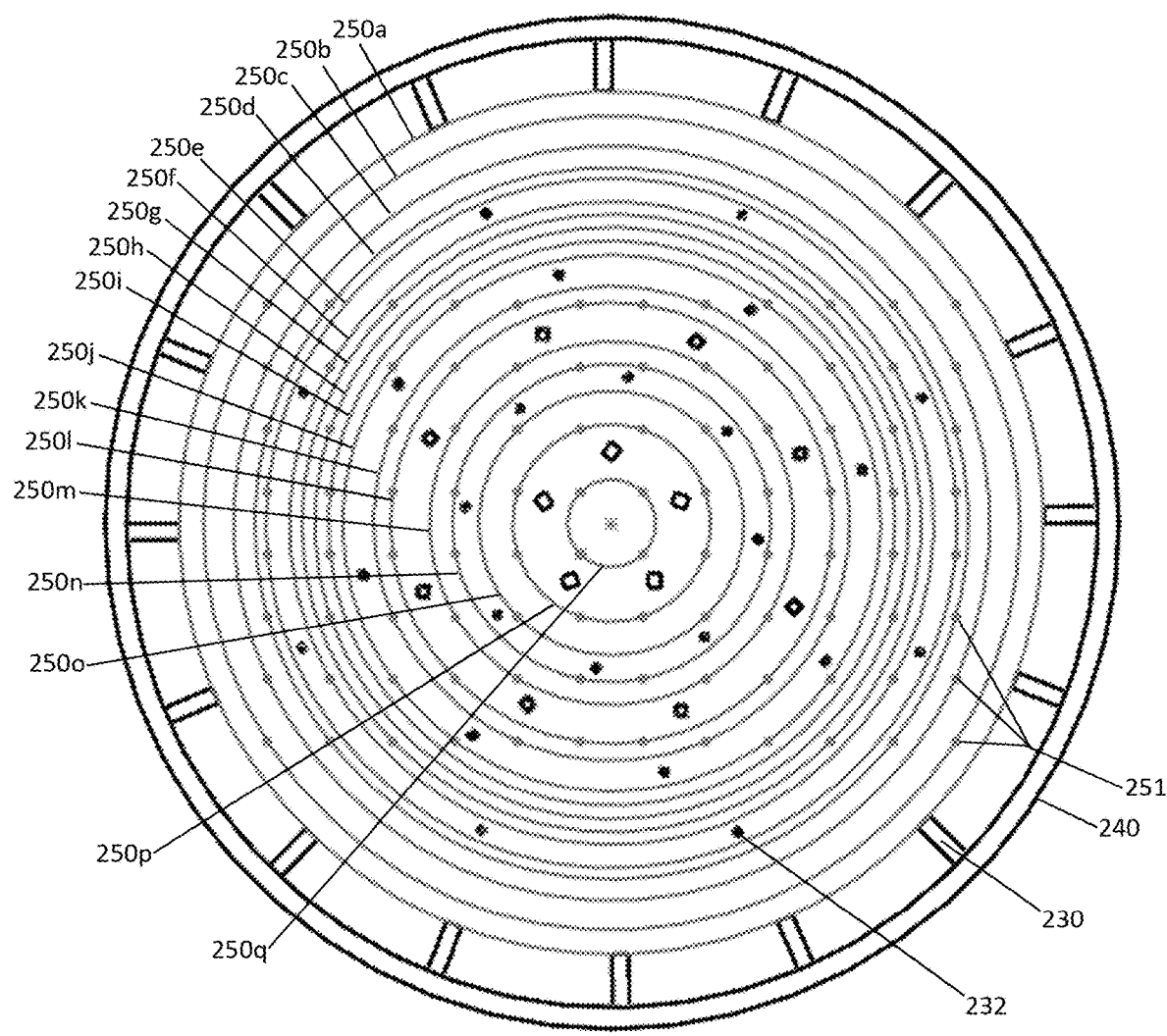
FIG. 2E shows a series of circumferences generated by an 8×12 array of points on 9 mm centers when a substantially cylindrical vessel is rotated on its center, simulating the path that an array of pipettors would clear when positioned above the rotating vessel.

FIGS. 2E and 2F illustrate a series of circumferences of an 8×12 array 251 when the center of the array is positioned over the center of a spin vessel and the spin vessel 202 is rotated 360 degrees. For example, a standard 96-pipet tip array generates a plurality of circumferences 250a-250q, each circumference having a radius. In embodiments, the circumferences include radii of 6.4 mm, 14.2 mm, 19.1 mm, 22.9 mm, 26.2 mm, 31.8 mm, 34.3 mm, 38.7 mm, 40.7 mm, 42.7 mm, 44.5 mm, 46.3 mm, 49.7 mm, 51.3 mm, 54.3 mm, 58.7 mm, and/or 62.2 mm. The radii may be configured such that neither the side fin 230 width nor interior projection 232 width extends within about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, or about 2.5 mm of any of the circumferences 250a-250q. In embodiments, neither the side fin width nor interior projection width extends within about 1.5 mm of any of the circumferences 250a-250q. Those skilled in the art would know the tolerances for standard pipet tip arrays to clear the recited circumferences with knowledge of the industry standards for center on center distances and pipet tip conformations.

Figure 2G:
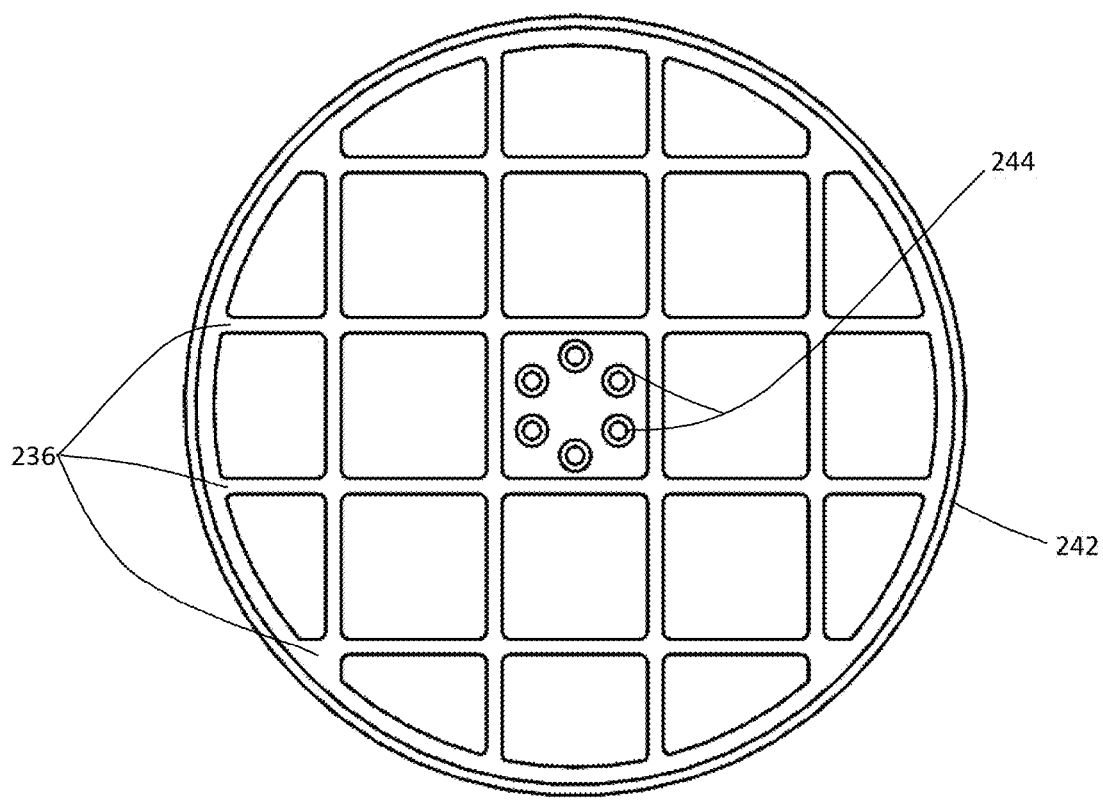
FIG. 2G illustrates a top down view of the drive base illustrating the square slots and a perimeter containment for the spin vessel of FIG. 2A.
Figure 2H:
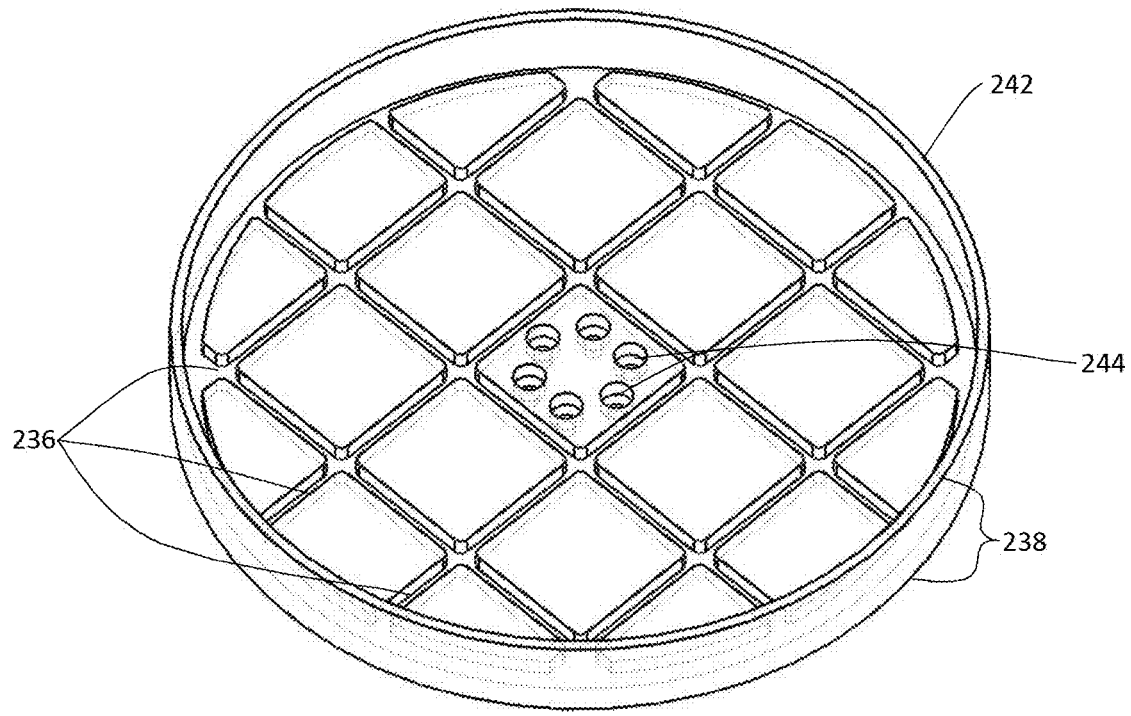
FIG. 2H illustrates an isometric view of the drive base illustrating the square slots and the perimeter containment of the spin vessel of FIG. 2A.

As shown in FIGS. 2G and 2H, the spin vessel 202 may include a lip 242 of the drive base 238. The lip 242 may define an outside diameter of the spin vessel 202. A plurality of holes 244 may be configured to attach the drive base 238 to a motor shaft assembly 246, motor 250, motor box 214, and motor shaft 248 as shown in FIG. 2I and described further herein.

FIG. 2I illustrates a side view of a spin vessel system 202 including a motor box 214, motor 250, motor shaft 248, and drive base 238 for coupling to the spin vessel 202. Also shown are the lip of the drive base 242, the coupling system 246 to attached the drive base to the motor shaft 248.

Figure 3A:
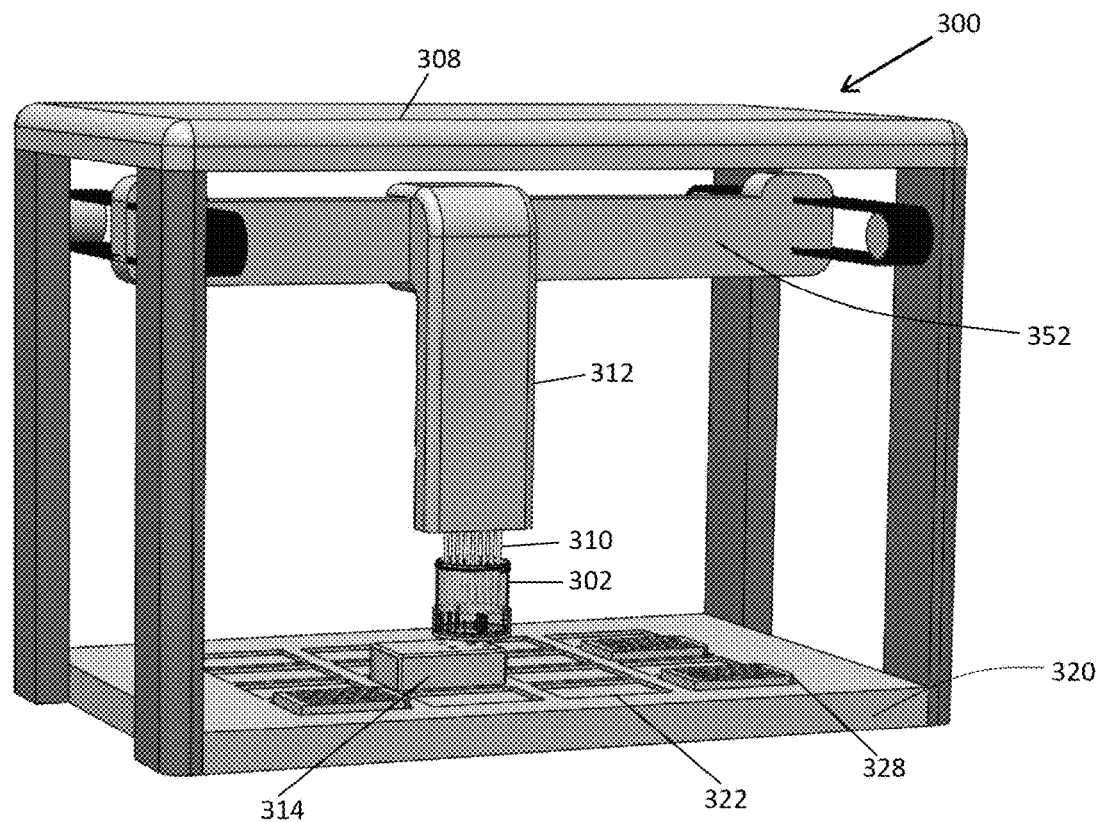
FIG. 3A illustrates an isometric view of an embodiment of a robotic liquid handler with an eight-tip pipetting system using a spin vessel with one or more side fins and projections positioned to avoid contacting one or more pipet tips on the robotic liquid handler.
Figure 3B:
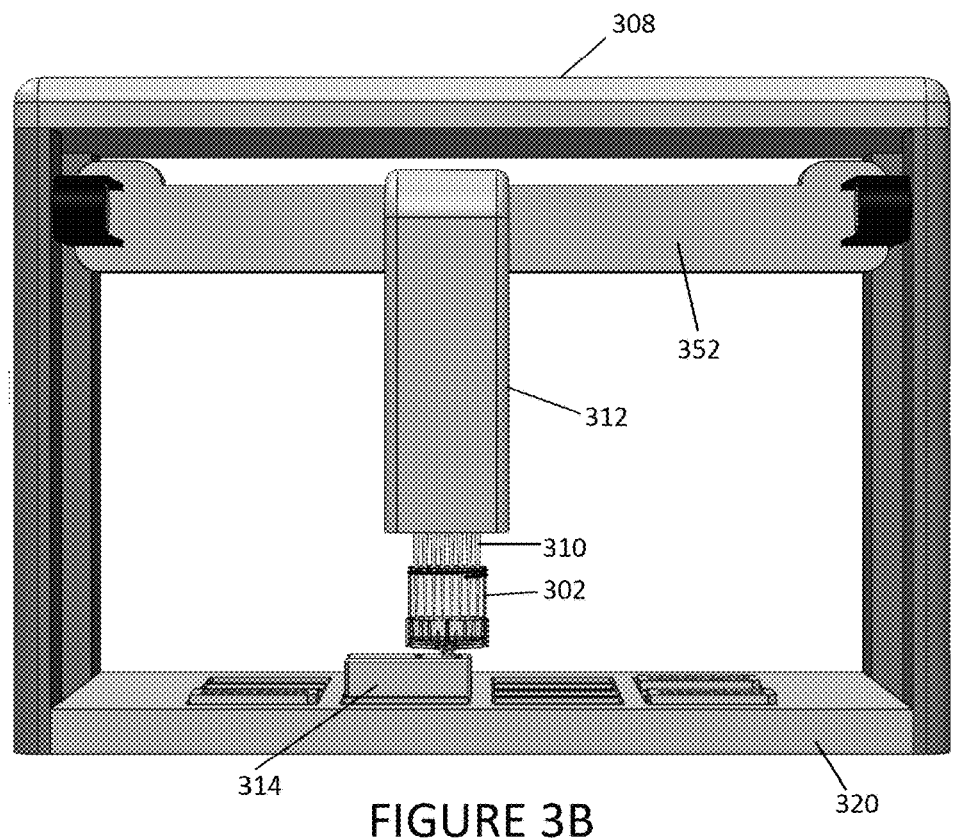
FIG. 3B illustrates a side view of FIG. 3A.

FIGS. 3A and 3B illustrate an embodiment of a spin vessel system 300. The spin vessel system 300 may include a robotic liquid handler 308. The robotic liquid handler 308 may include a Z-axis gantry 312 for vertical movement. The Z-axis gantry 312 may include a plurality of pipet tips 310. The spin vessel system 300 may include a spin vessel 302 configured to be rotationally driven by a motor box 314. The motor box 314 may be configured to couple with a microplate deck position 322 on a deck 320 of the robotic liquid handler 308. One or more microplates, including a microplate 328, may be configured to couple with one or more microplate deck positions on the deck 320 of the robotic liquid handler 308. The Z-axis gantry 312 may be configured to slidably move in the X-axis along a beam 352 of the robotic liquid handler 308. Movement of the Z-axis gantry 312 may allow the plurality of pipets 310 to be positioned over the spin vessel 302.

Figure 3C:
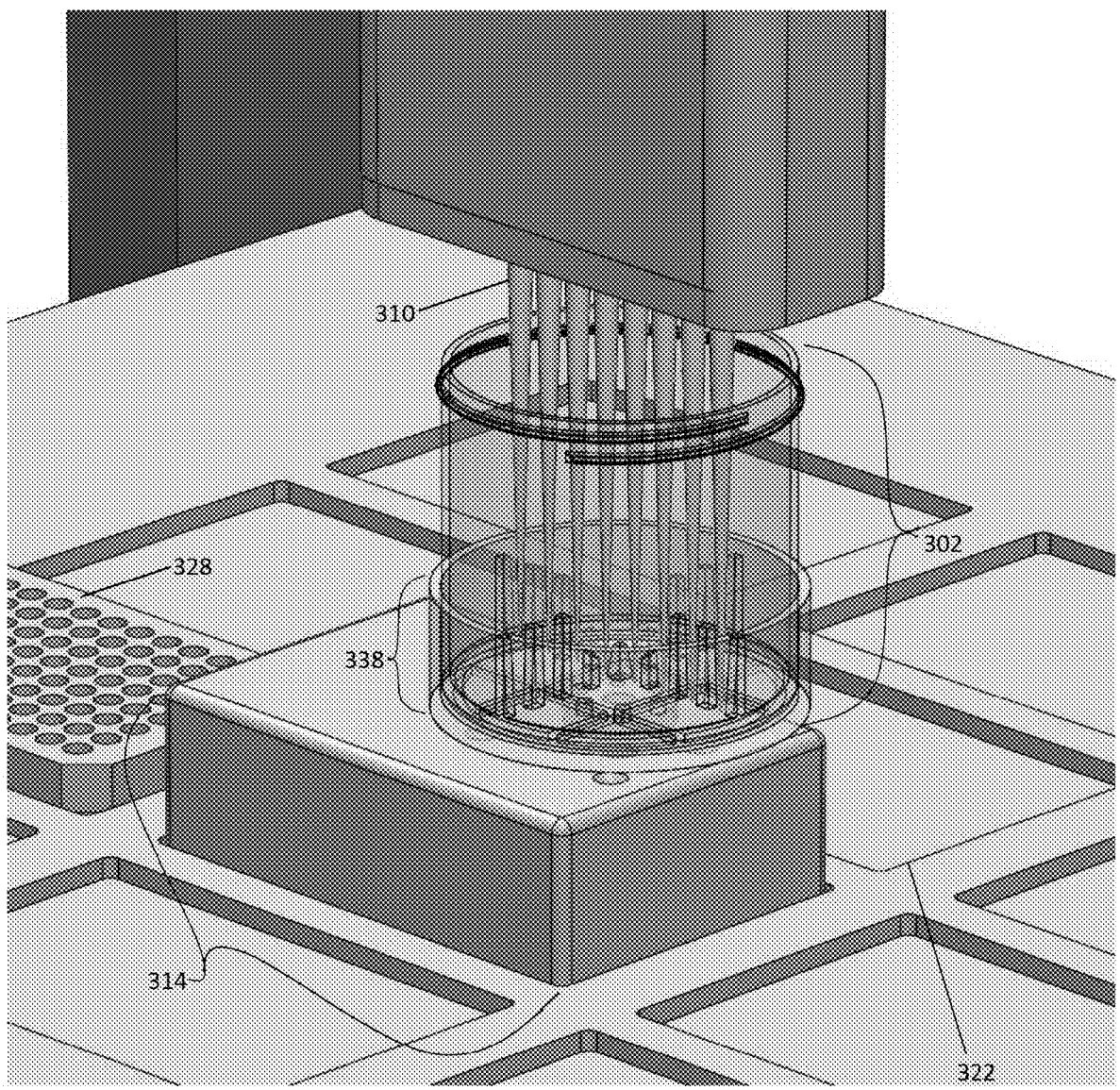
FIG. 3C illustrates an isometric view of an embodiment of a robotic liquid handler of FIG. 3A including an eight-tip pipetting spin vessel system.

FIG. 3C illustrates an embodiment of a spin vessel 302, a drive base 338, and a motor box 314. The motor box 314 may be coupled to a microplate deck position 322 and microplate 328, as described with relation to FIG. 1 and in further detail herein.

Figure 3D:
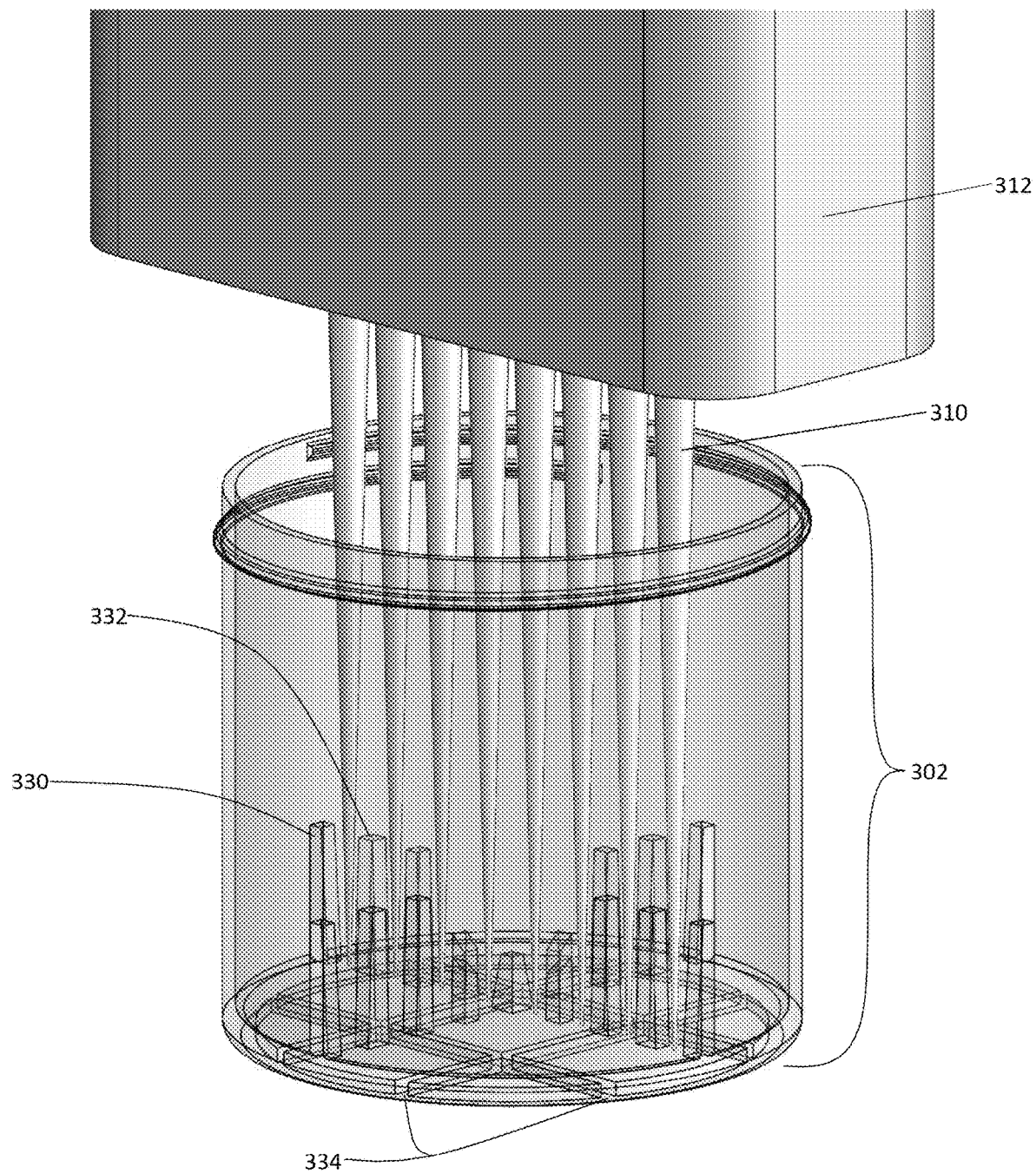
FIG. 3D illustrates an isometric view of an embodiment of the robotic liquid handler with the eight-tip pipetting spin vessel system of FIG. 3C.

FIG. 3D illustrates an isometric view of an embodiment of a spin vessel 302 and a plurality of pipets 310. In this example embodiment, the plurality of pipets 310 may include eight pipet tips. The plurality of pipets 310 may be coupled to a Z-axis gantry 312. The spin vessel 302 may include one or more projections 332 and one or more side fins 330. The projections 332 and side fins 330 may be configured to spin within the spin vessel 302 without contacting the plurality of pipet tips 310. The spin vessel 302 may include a tab system 334. As shown in FIG. 3D, the projections 332 and the side fins 330 may be configured such that as the spin vessel 302 rotates around the pipet tips 310, the projections 332 and the side fins 330 may provide clearance for the pipet tips 310 such that the projections 332 and the side fins 330 do not make contact with the pipet tips 310. For example, as the spin vessel 302 rotates, each pipet tip may be positioned between two projections and/or side fins.

Figure 3E:
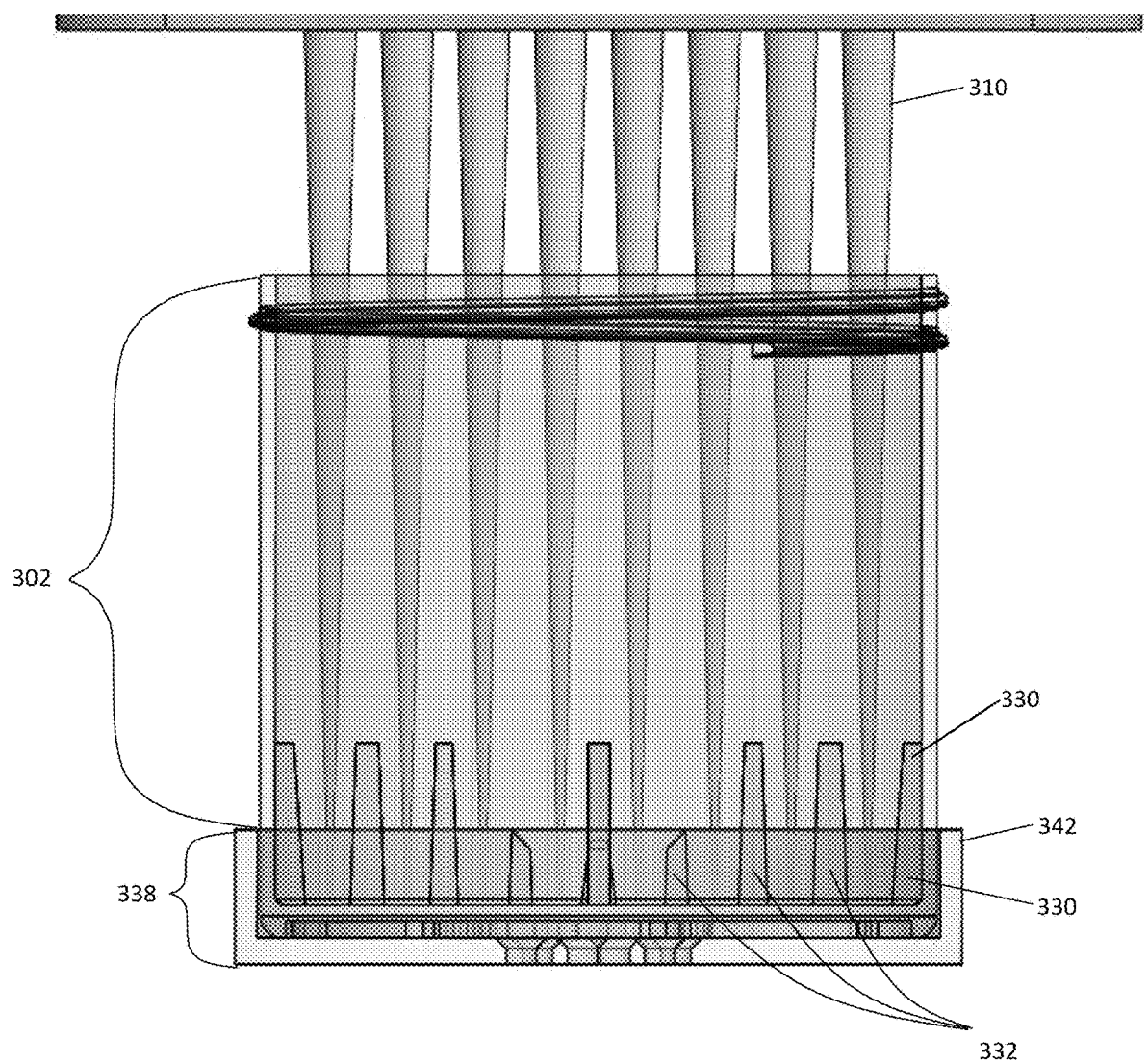
FIG. 3E illustrates a side view of the spin vessel for 8 pipets with the relative locations of side fins and projections.

FIG. 3E illustrates an embodiment of a spin vessel 302, a plurality of pipet tips 310, and a drive base 338. The drive base 338 may include one or more projections 332, one or more side fins 330, and a lip 342.

Figure 3F:
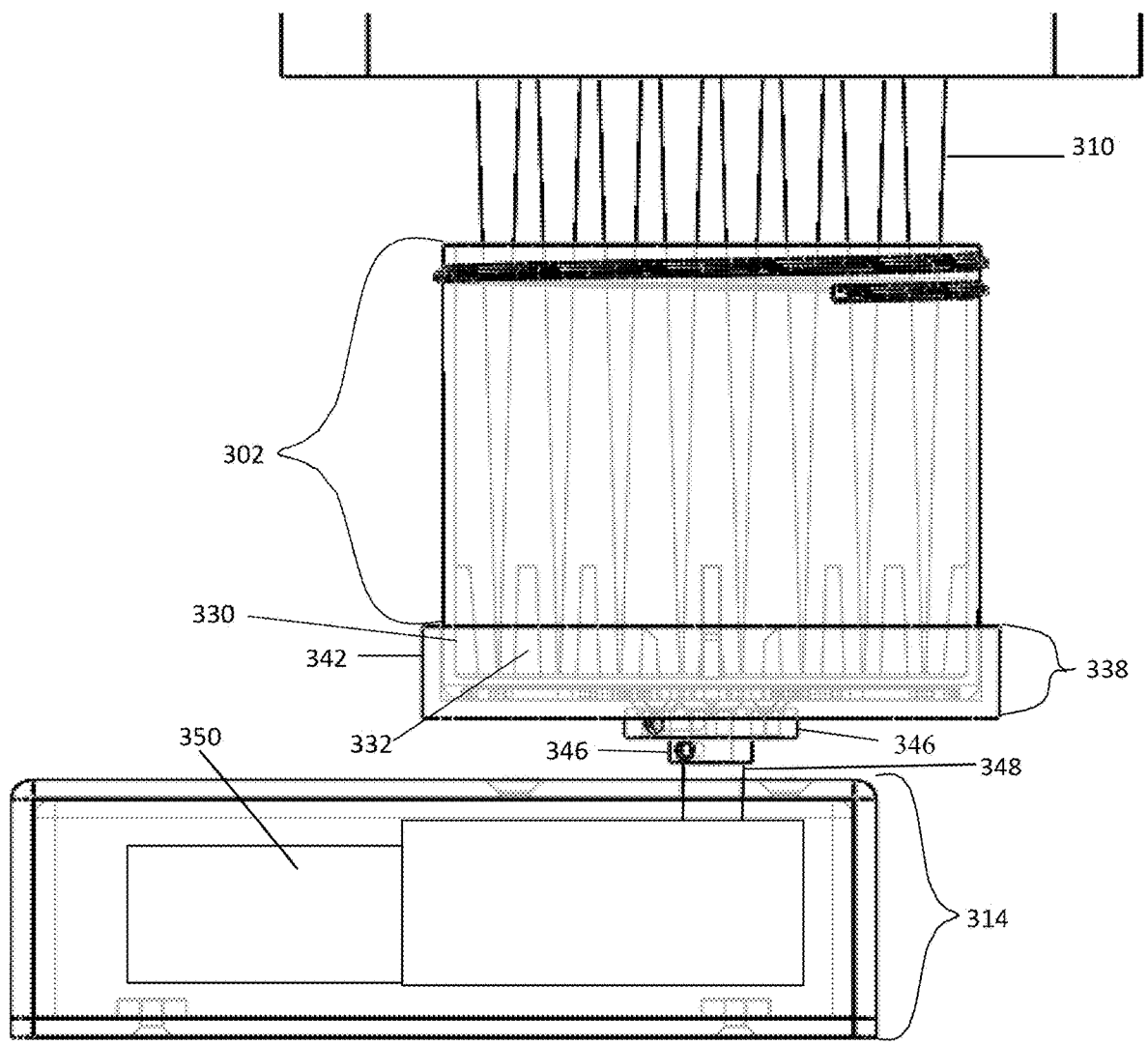
FIG. 3F illustrates a side view of a spin vessel for 8 pipets and the motor box with the relative locations of side fins and projections.

FIG. 3F illustrates an embodiment of the spin vessel 302 coupled with the drive base 338. The drive base 338 may be configured to provide a stable connection between the motor box (e.g., motor box 314) and the spin vessel 302 adequate to withstand the force applied when rotational movement of the spin vessel 302 changes from a first rotational direction to a second rotational direction. As shown in FIGS. 3E, 3F, and 3L, the lip of the drive base (e.g., lip 342) may surround the outside diameter of the spin vessel 302.

Figure 3G:
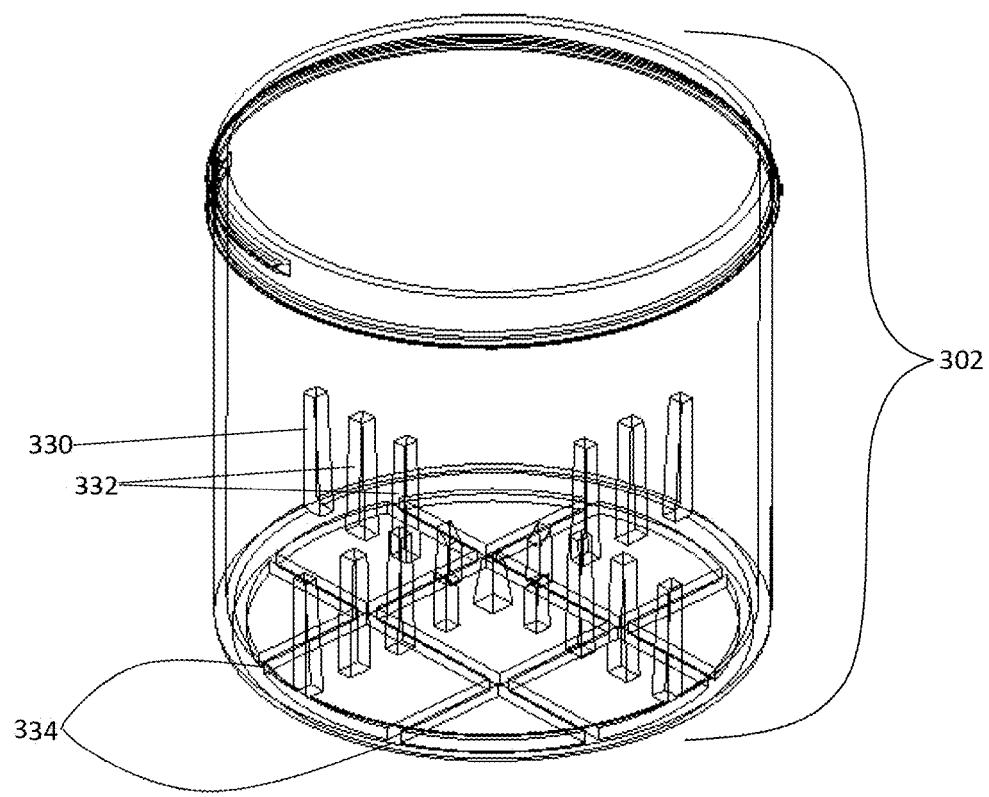
FIG. 3G illustrates an isometric view of an embodiment of a spin vessel designed for eight pipet tips using side fins and projections positioned to avoid contact with one or more pipet tips on the robotic liquid handler.
Figure 3H:
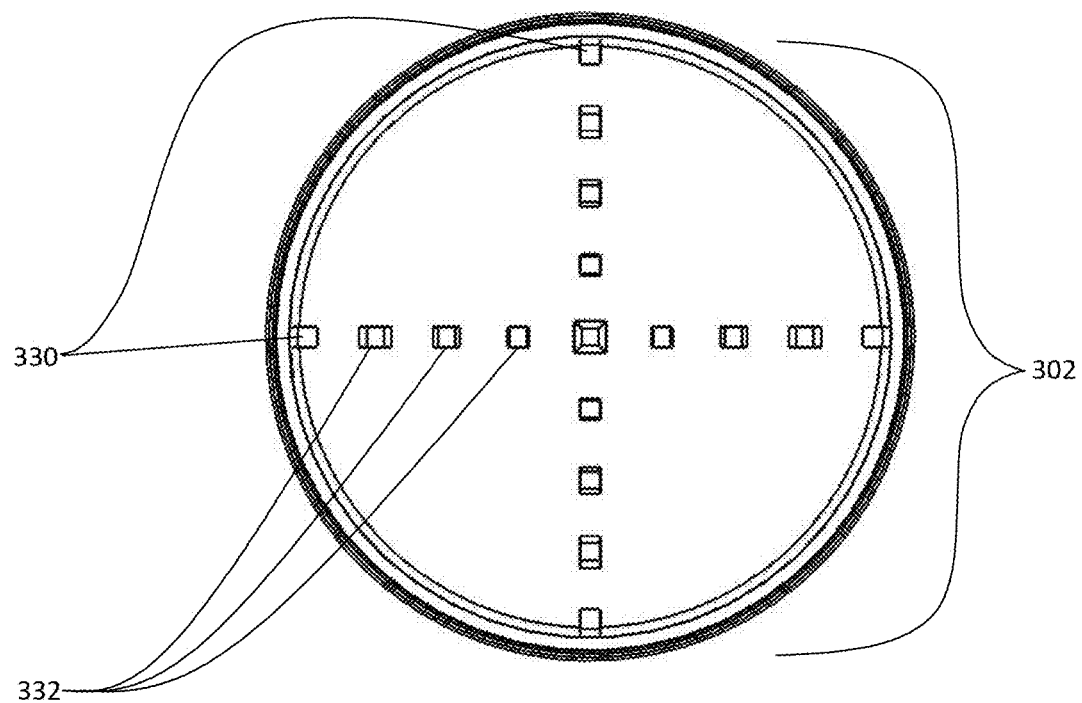
FIG. 3H illustrates a top down view of an embodiment of the spin vessel of FIG. 3G.

FIG. 3G illustrates an isometric view of an embodiment of a spin vessel 302. The spin vessel 302 may include one or more projections 332, one or more side fins 330, and a tab system 334. FIG. 3H illustrates a top down view of the spin vessel 302 shown in FIG. 3G.

Figure 3I:
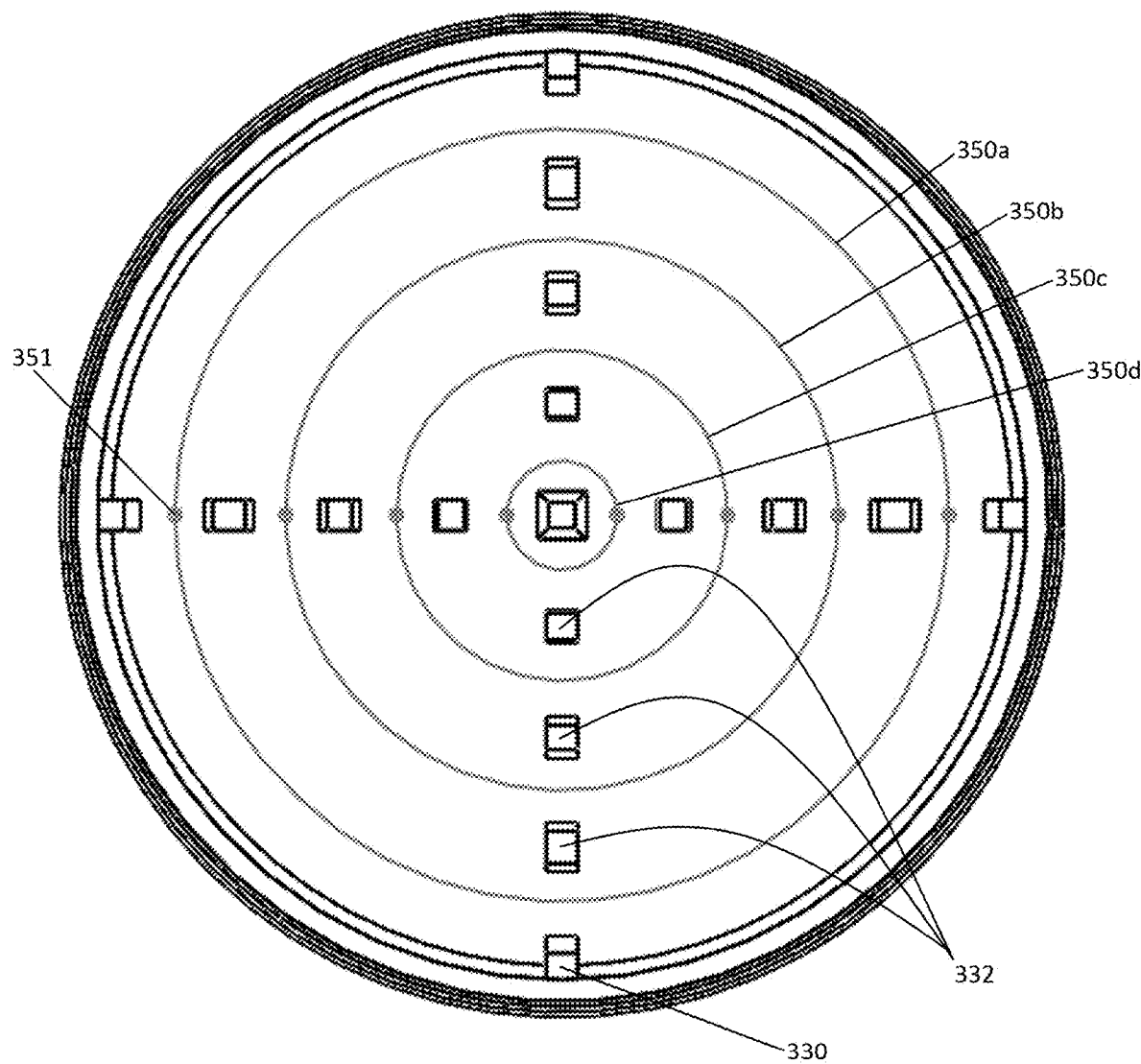
FIG. 3I shows a series of circumferences generated from a linear array of 8 points on 9 mm center to center spacing mm centers when a substantially cylindrical vessel is rotated on its center, simulating the path that an array of pipettors would clear when positioned above the rotating vessel.

FIGS. 3I and 3J illustrate a series of circumferences of generated by a standard pipettor 8×12 array when a spin vessel 302 is rotated 360 degrees. In other embodiments, an 8-pipet tip array 351 may include a plurality of circumferences 350a-350d, each circumference having a radius. For example, the circumferences may include radii of 4.5 mm, 13.50 mm, 22.50 mm, and/or 31.50 mm. The radii may be configured such that neither the side fin 230 width nor interior projection 232 width extends within about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, or about 2.5 mm of any of the circumferences 350a-350d. In embodiments, neither the side fin width nor interior projection width extends within about 1.5 mm of any of the circumferences 350a-350d.

Figure 3K:
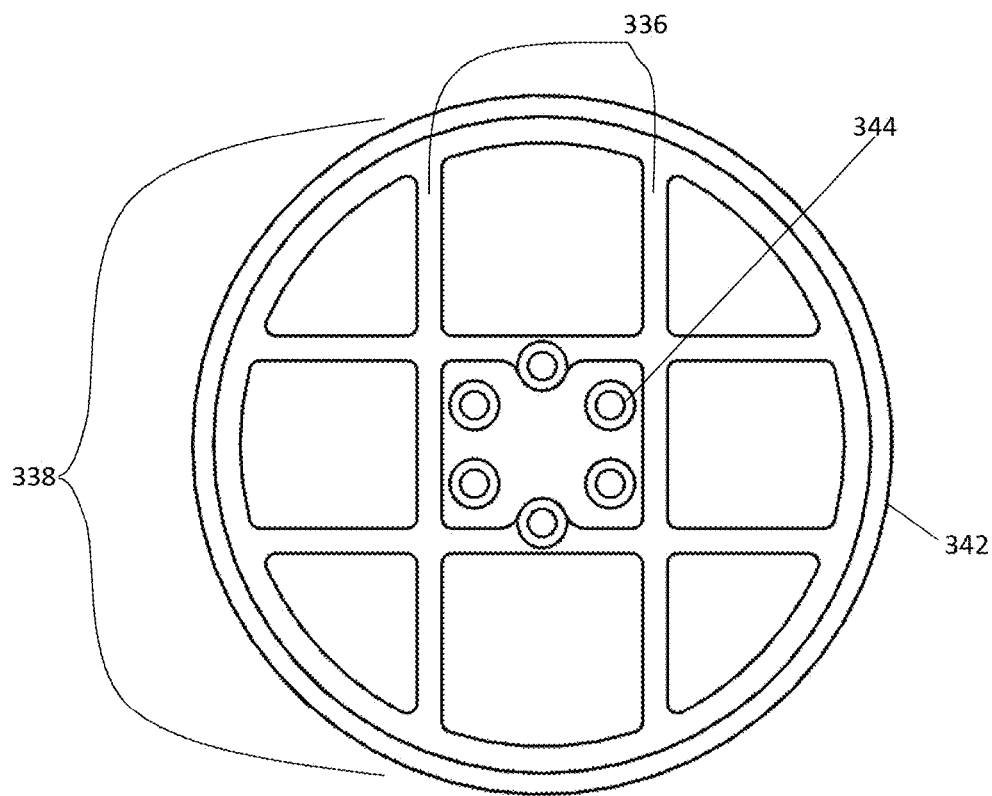
FIG. 3K illustrates the top down view of the drive base illustrating square slot pattern and perimeter containment for the spin vessel of FIG. 3H.
Figure 3L:
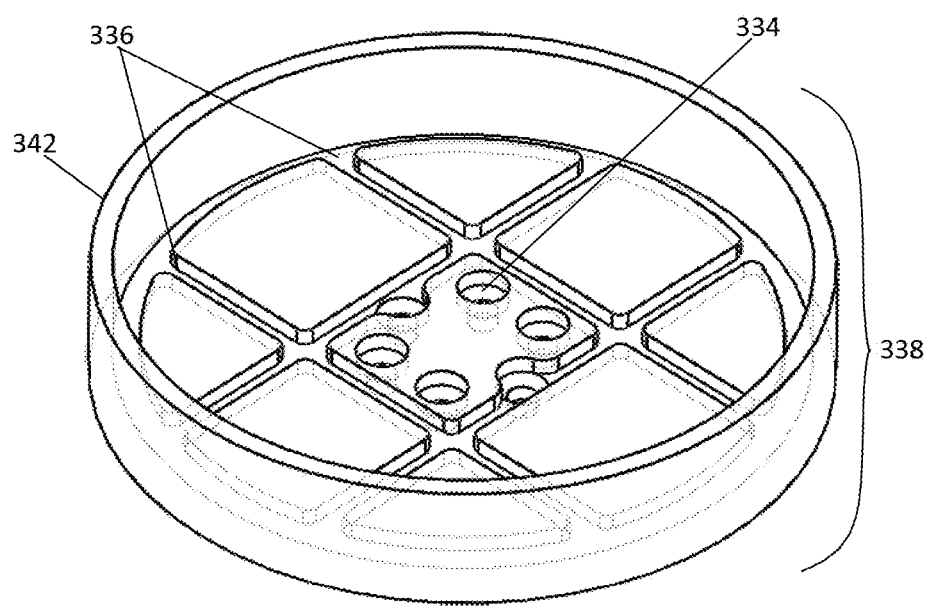
FIG. 3L illustrates an isometric view of the drive base illustrating square slot pattern and perimeter containment for the spin vessel of FIG. 3H.

FIGS. 3K and 3L illustrate an embodiment of a drive base 338. The drive base 338 may include a slot system 336, one or more holes 344, and a lip 342. The holes 344 can be used to attach the drive base 338 to the motor shaft assembly 346 such as by screws. As shown in FIGS. 3G, 3K, and 3L, the "waffle" pattern of the connecting tabs 334 on the spin vessel 302 may be configured such that the connecting tabs 334 interlock with the slot system 336.

In some embodiments, a spin vessel system may be configured for compatibility with an 8-pipet tip embodiment. The spin vessel system may be used to mix and aliquot, particulates, magnetic beads, resin beads, blood, cells, fungi, algae, bacteria, virus particles, phage particles, vesicles, liposomes, micelles, DNA, RNA, proteins, antigens, ligands, analytes, chemicals, liquids, slurries of test articles or drugs, chemical or biological reaction products. In some embodiments, the spin vessel system may be configured to couple with a robotic liquid handler for use in sequentially monitoring chemical or biological reaction product production and multivariant analysis in a timed sequential manner.

Figure 4A:
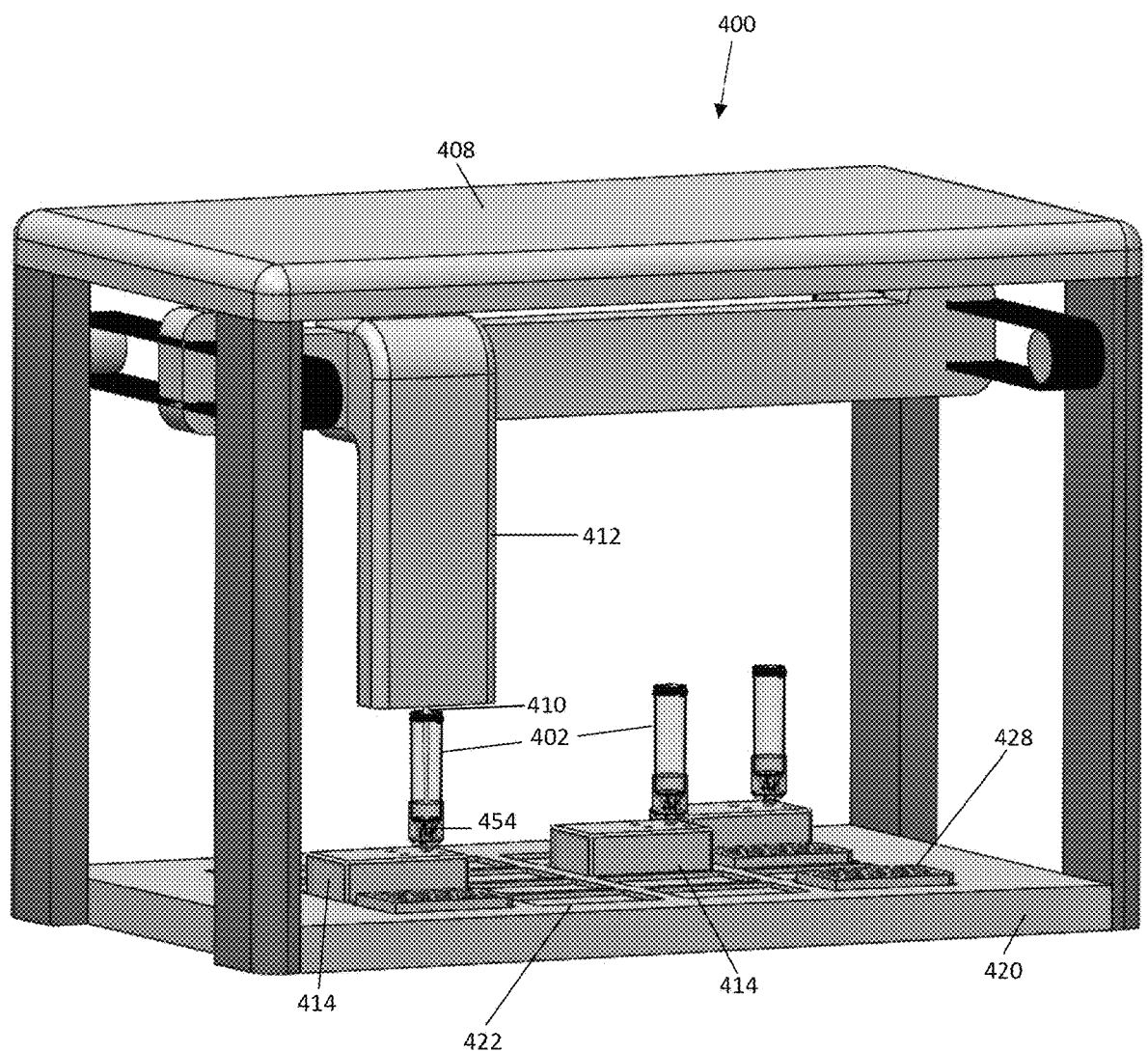
FIG. 4A illustrates an isometric view of an embodiment of a spin vessel system for mixing three different 50 ml spin vessels on a robotic liquid handler with a single pipet.
Figure 4B:
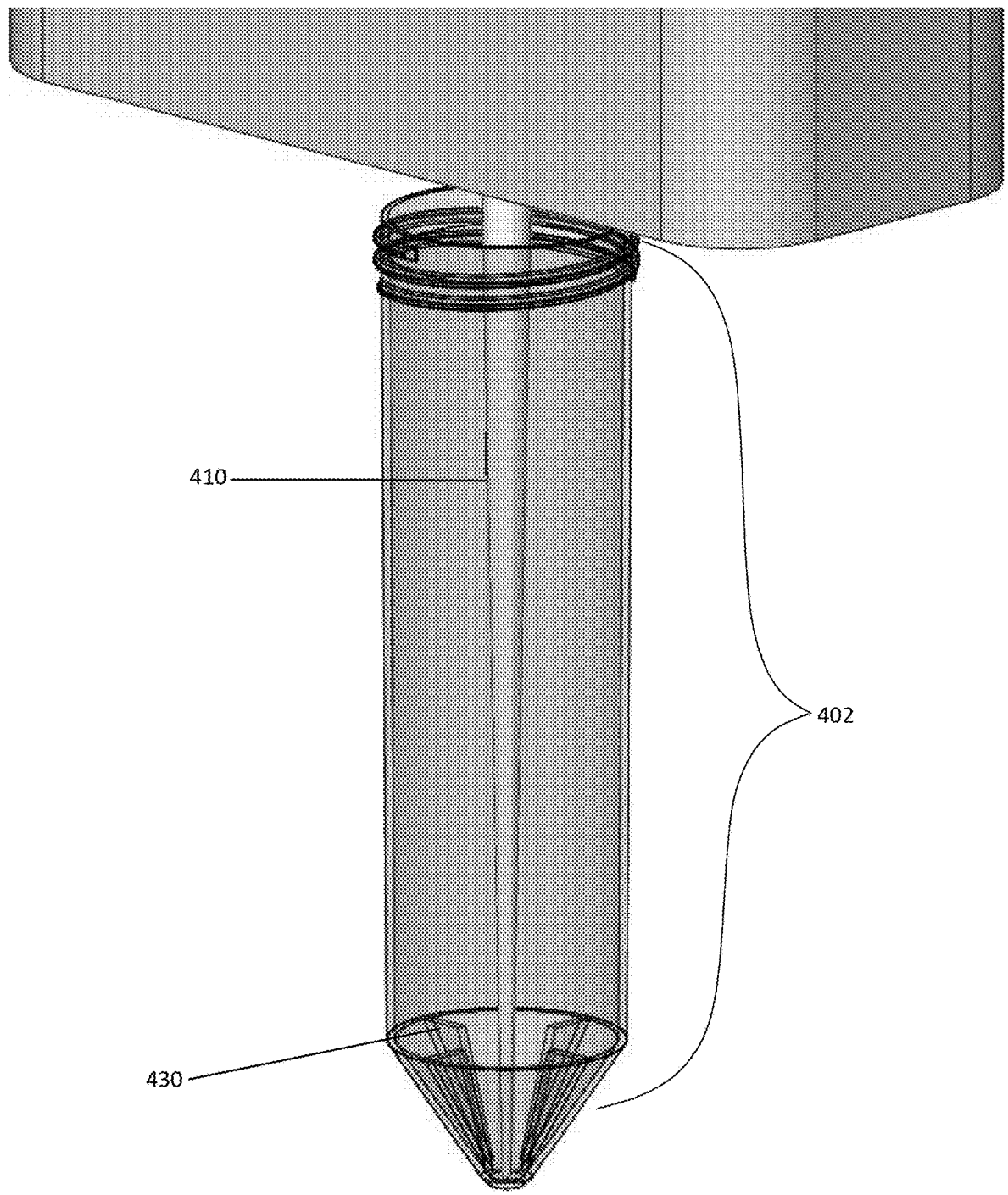
FIG. 4B illustrates an isometric view of a 50 ml spin vessel tube with side fins being sampled with a single robotic pipet tip.
Figure 4C:
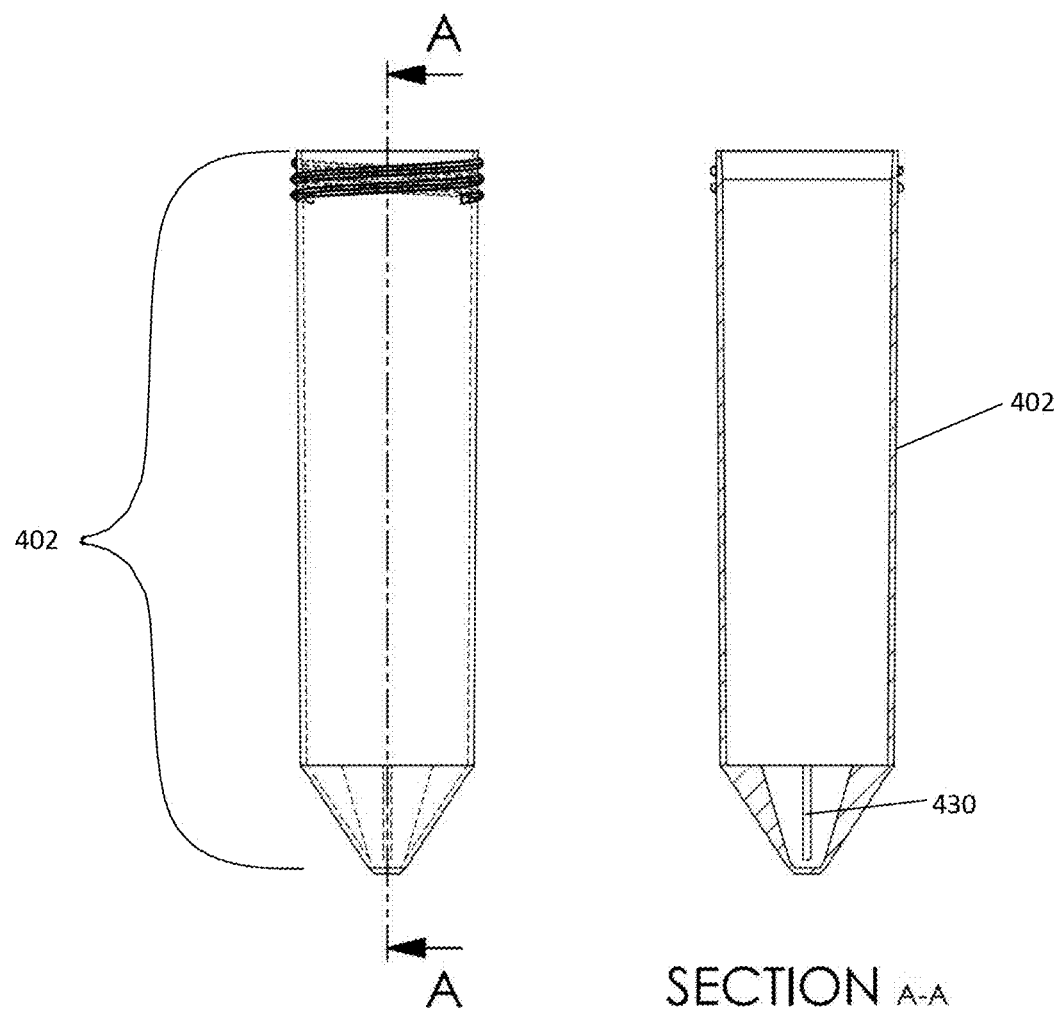
FIG. 4C illustrates side view of a 50 ml spin vessel showing the side fins in the bottom of the conical tube.
Figure 4D:
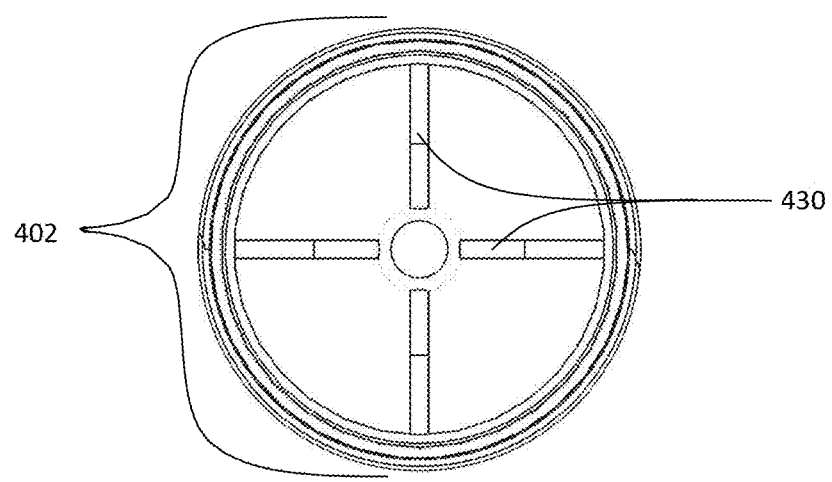
FIG. 4D illustrates a top down view of the bottom of the 50 ml spin vessel tube of FIG. 4C.

FIG. 4A illustrates another embodiment of a spin vessel system 400 configured for use with a single pipet compatible spin vessel 402. In this embodiment, the placement and shape of one or more side fins 430 may be configured to accommodate a single pipet 410, as shown in FIGS. 4B through 4D. In some embodiments, a drive base 454 may include a friction fit O-ring configured to connect a spin vessel 402 to the motor box 414 on a deck 420 of the robotic liquid handler 408.

This single pipet tip compatible embodiment of the spin vessel system can be used to mix and/or aliquot particulates, magnetic beads, resin beads, blood, animal cells, fungi, algae, bacteria, virus particles, phage particles, vesicles, liposomes, micelles, DNA, RNA, proteins, antigens, antibodies, ligands, analytes, chemicals, liquids, slurries of test articles or drugs, chemical or biological reaction products. This spin vessel system embodiment may be coupled with a robotic liquid handler for use in sequentially monitoring chemical or biological reaction product production and multivariant analysis in a timed sequential manner. In some embodiments, the spin vessel system 400 may be configured for manual applications.

Figure 5A:
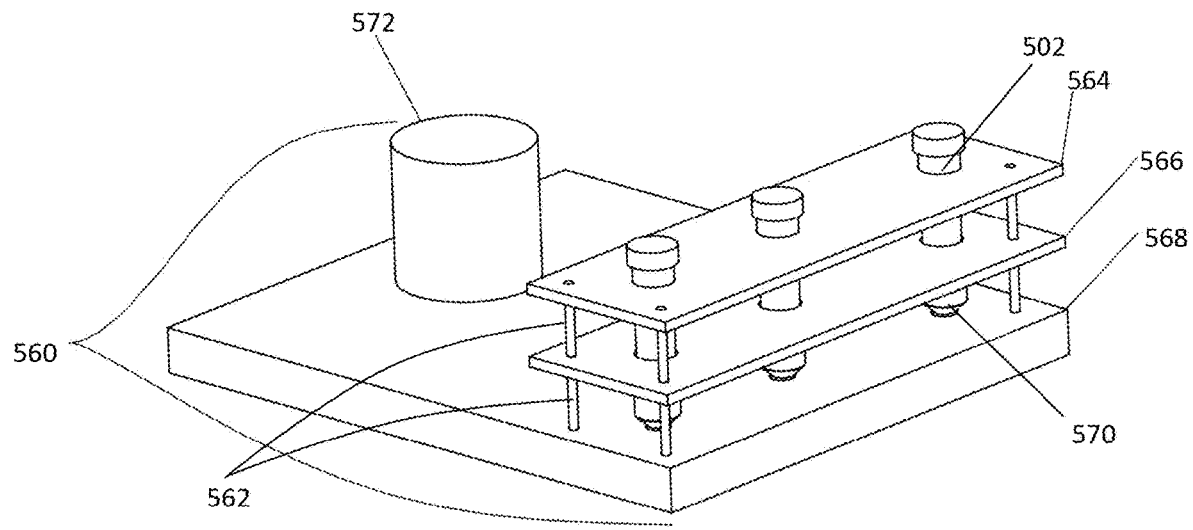
FIG. 5A illustrates an isometric view of a pulley driven drive shaft system with three 50 ml spin vessel tubes being driven by a single motor.
Figure 5B:
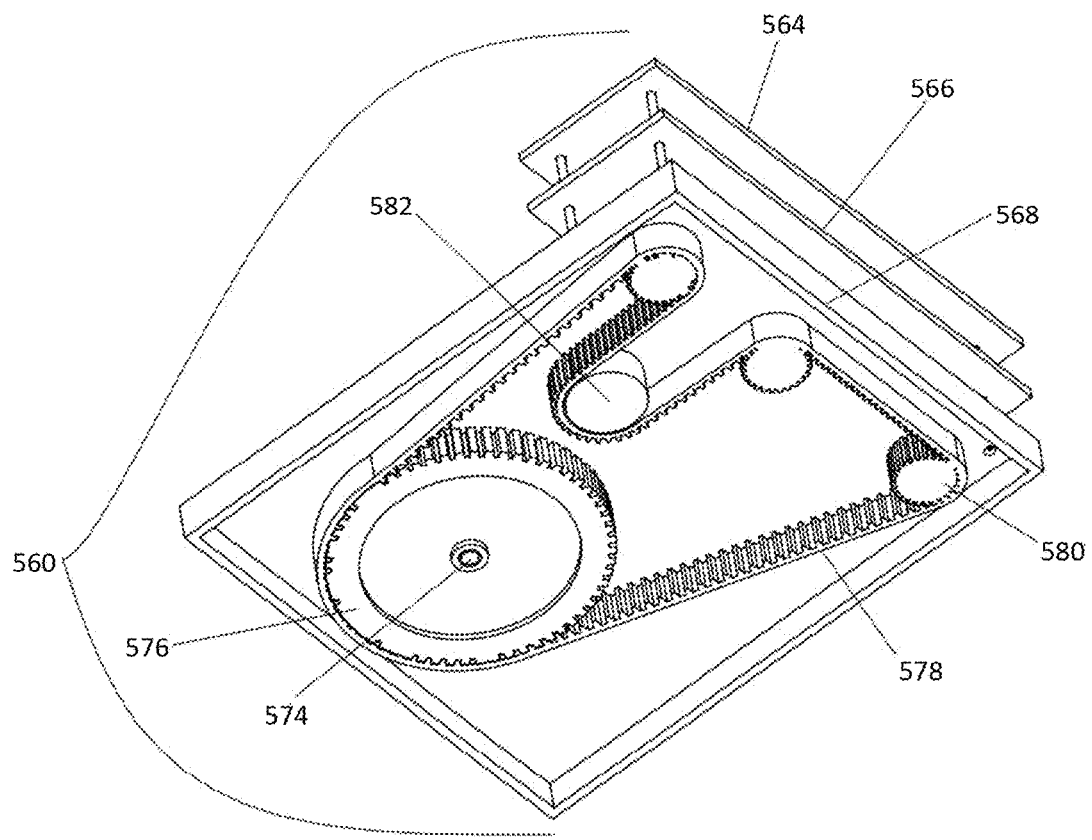
FIG. 5B illustrates an isometric view of the bottom of the pulley driven drive shaft system in in FIG. 5A showing a drive gear and belt pulley system used to rotate one or more spin vessels.

FIGS. 5A and 5B illustrate isometric views of an embodiment of a pulley driven drive shaft system 560. The drive shaft system 560 may be configured to rotate one or more spin vessels 502. Each of the spin vessels 502 may be held by a vessel rack 562. The vessel rack 562 may include one or more vessel plates including a top plate 564, a middle plate 566, and a bottom plate 568. The bottom plate 568 may include one or more spin vessel coupling bases 570. The spin vessel coupling bases 570 may be configured to couple with one or more of the spin vessels 502.

The drive shaft system 560 may include a drive motor 572 coupled to a motor drive shaft 574. The motor drive shaft 574 may be coupled to a gear drive 576 configured to drive a belt system 578. The belt system may be configured to couple with and drive one or more pulley drive shafts 580 and/or tensioning pulleys 582, thereby causing rotation of the pulley drive shafts 580. The drive motor 572, the motor drive shaft 574, the gear drive 576, the belt system 578, the pulley drive shafts 580, and/or the tensioning pulleys 582 may be mounted on the bottom plate 568, as shown in FIG. 5B. The pulley drive shafts 580 may be coupled with the spin vessel coupling bases 570 and may be configured to rotate the spin vessel coupling bases 570, thus engaging the spin vessels 502 in rotational movement in the vessel rack 562.

In some embodiments, the drive shaft system 560 may be configured to periodically alternate the direction of rotation of the spin vessels 502 in clockwise and counterclockwise rotations as well as may be configured to change the speed of rotation, distance of rotation, pause time, and number of cycles run. The spin vessel system as described in relation to FIGS. 5A and 5B, can be used to mix and aliquot particulates, magnetic beads, resin beads, blood, cells, fungi, algae, bacteria, virus particles, phage particles, vesicles, liposomes, micelles, DNA, RNA, proteins, antigens, ligands, analytes, chemicals, liquids, slurries of test articles or drugs, chemical or biological reaction products. The spin vessel system may be coupled with a robotic liquid handler can also be used to sequentially monitor chemical or biological reaction product production and multivariant analysis in a timed sequential manner. This embodiment also lends itself to manual applications.

Figure 6A:
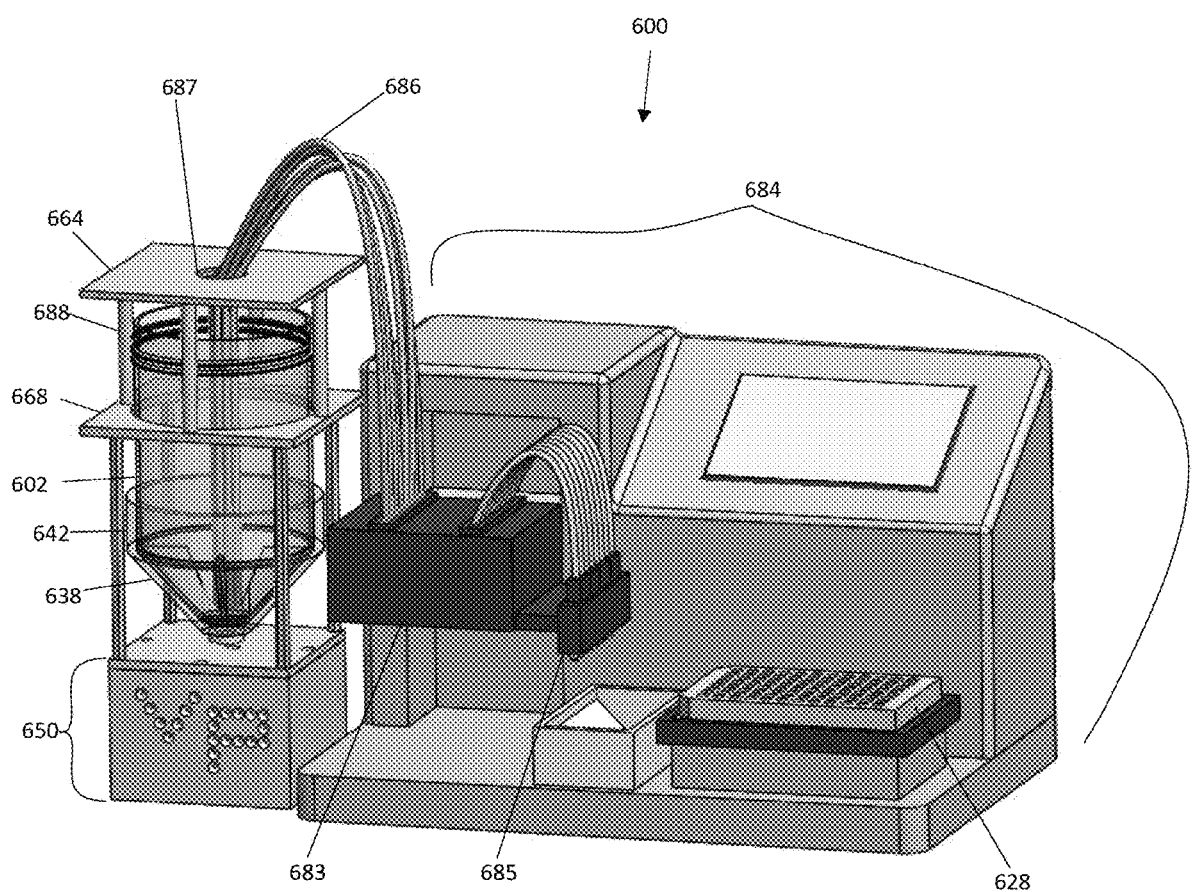
FIG. 6A illustrates an isometric view of a robotic reagent dispenser configured for use with a large volume spin vessel to prepare uniform suspensions of particulates for aliquoting.

FIG. 6A illustrates a spin vessel system 600 including a robotic reagent dispenser system 684 and one or more siphon hoses 686. The spin vessel system 600 may be configured to interact with a spin vessel 602. The robotic reagent dispenser system 684 may include one or more siphon hoses 686 configured to deliver reagents to a microplate have a plurality of wells (e.g., a 96-well microplate). The siphon hoses 686 may be configured to carry reagents from the spin vessel 602 through a peristaltic pump 683 in the robotic reagent dispenser system 684 and may dispense the reagent through siphon tube tips 685 and into the wells of a microplate 628.

Figure 6B:
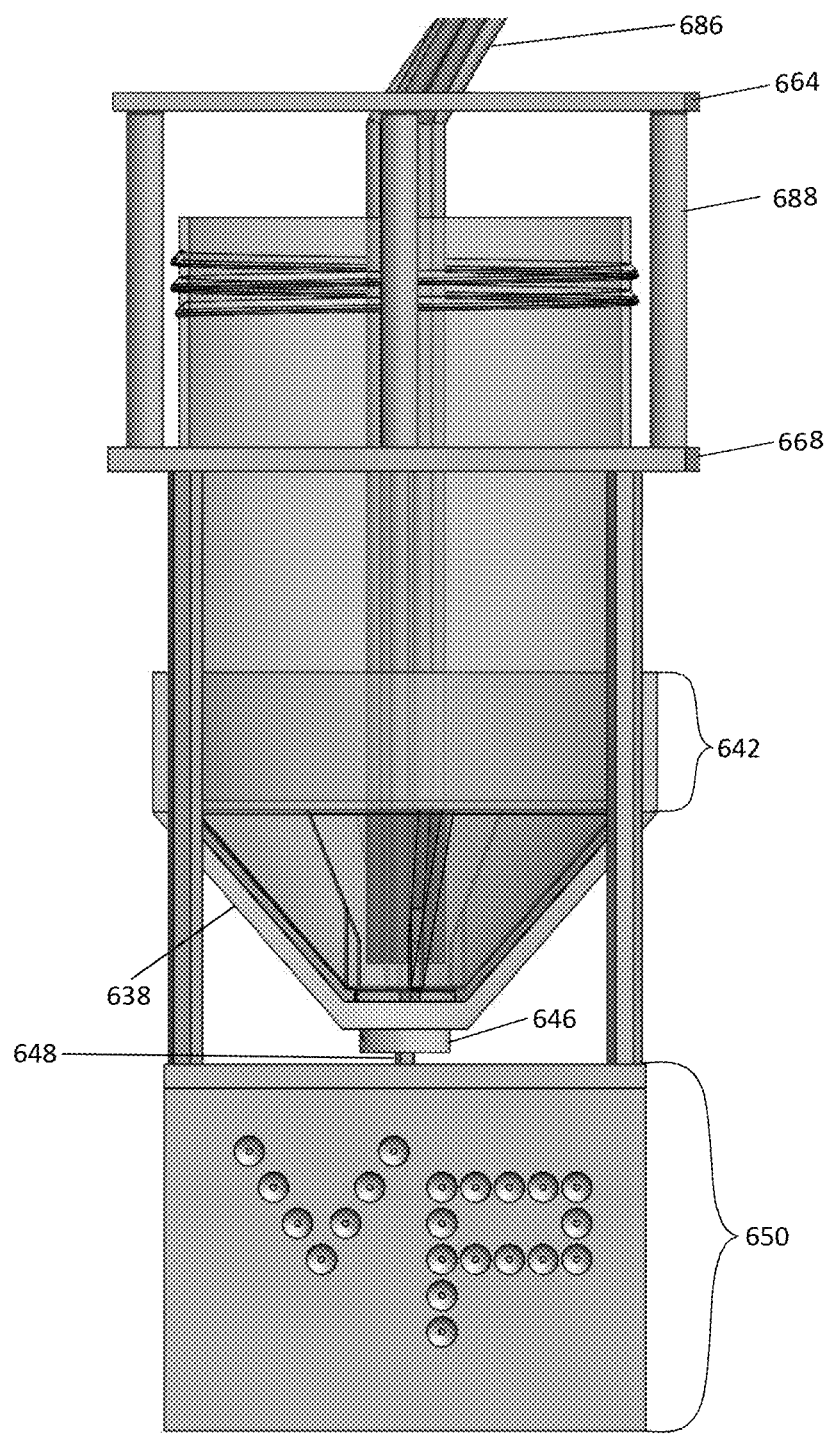
FIG. 6B illustrates a side view of a bundle of siphon tubes being threaded through a hole in a spin plate and into a large conical spin vessel with fins.

As illustrated in FIGS. 6A and 6B, the spin vessel system 600 may include a support structure 688 configured to house the spin vessel 602. The support structure 688 may include a first plate 664 and a second plate 668. The first plate 664 may include a hole 687 therethrough, configured to provide an opening over the center of spin vessel 602 for the siphon hoses 686 to be passed through the support structure 688 and positioned within the center of the spin vessel 602. The support structure 688 may house one or more of the spin vessel 602, a drive base 638, and/or a motor box 650 having one or more motors.

FIG. 6B illustrates an embodiment of the spin vessel 602, the plurality of siphon hoses 686, the drive base 638, and the motor box 650. The drive base 638 may include a lip 642 and one or more slots 636. The drive base 638 may be coupled to a motor shaft assembly 646. The motor shaft assembly 646 may be coupled to a motor shaft 648. The motor box 650 may be configured to apply power to the motor shaft 648 and hence to the motor shaft assembly 646. In turn, the motor shaft assembly 646 may be configured to drive the drive base 638, which may be configured to provide rotational movement to the spin vessel 602.

Figure 6C:
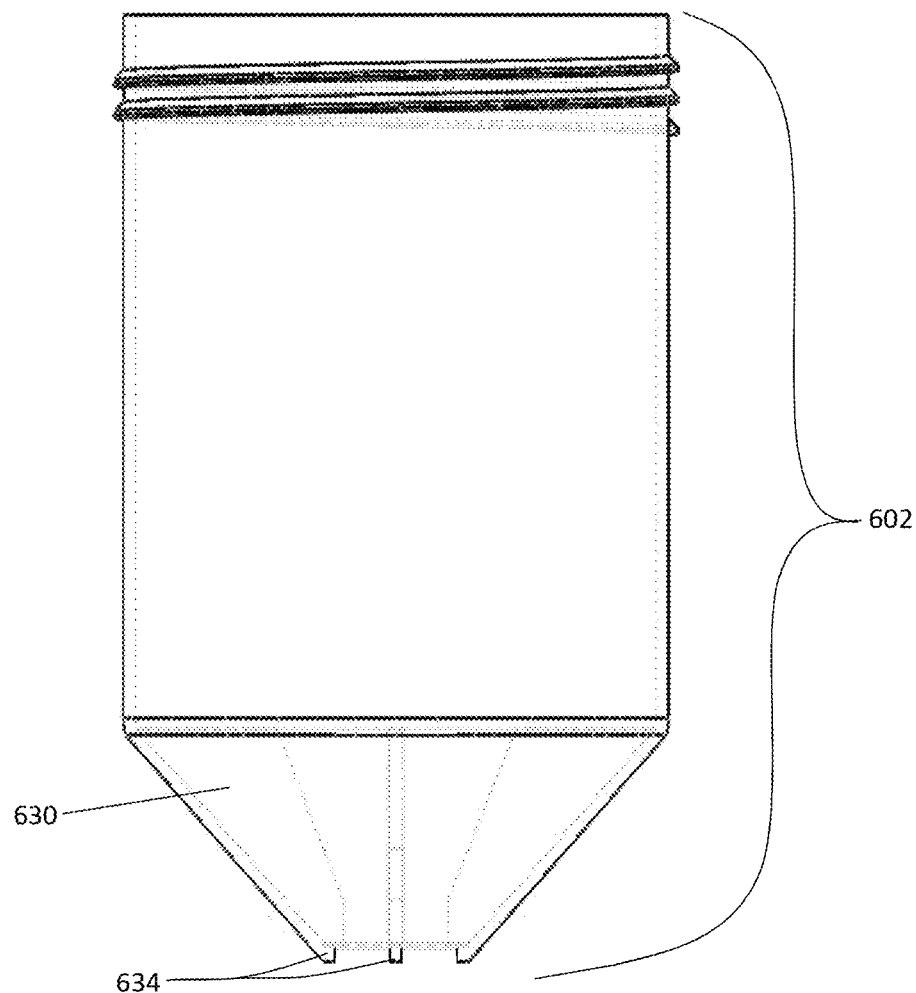
FIG. 6C illustrates a side view of a large conical spin vessel tube with side fins and a flat spot in a bottom to accommodate a bundle of siphon tubes.
Figure 6D:
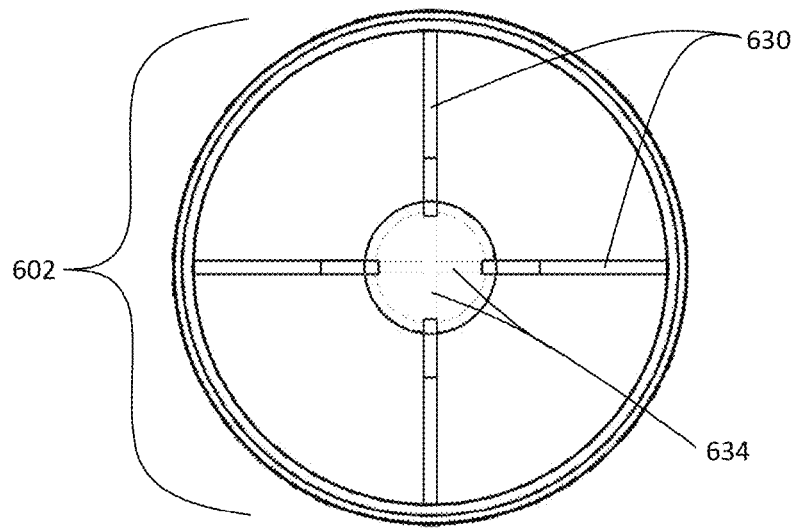
FIG. 6D illustrates a top down view of the bottom of a large conical spin vessel.

As shown in FIGS. 6C and 6D, the side fins 630 may be configured to spin around the siphon hoses 686 without touching the siphon hoses 686 which may be coupled with the robotic reagent dispenser system 684. Also shown are the connecting tabs 634 on spin vessel 602 that connect to slots 636 on drive base 638.

As shown in FIGS. 6C through 6G, the spin vessel 602 configured for use with a spin vessel system 600 may include one or more side fins 630 and one or more connecting tabs 634. The spin vessel system 600 may include a drive base 638 having a lip 642 and a slot system 636.

The side fins 630 may be shaped and positioned such that the side fins 630 do not touch the siphon hoses 686. The connecting tabs 634 may be configured for indexing with the slot system 636 on the drive base 638 to provide a stable connection between the spin vessel 602 and the motor shaft assembly 646. Stability of the spin vessel system 600 is necessary to withstand the considerable force applied when the direction of the spin vessel 602 is suddenly reversed and those skilled in the art would understand that there are a variety of ways to secure a spin vessel. The "waffle" pattern of the connecting tabs 634 on the spin vessel 602, as shown in FIG. 6D, illustrates the coupling arrangement of the connecting tabs 634 configured to interlock with the slot system 636, shown in FIG. 6G.

In some embodiments, the spin vessel system 600 can be used to mix and aliquot, particulates, magnetic beads, resin beads, blood, cells, fungi, algae, bacteria, virus particles, phage particles, vesicles, liposomes, micelles, DNA, RNA, proteins, antigens, antibodies, ligands, analytes, chemicals, liquids, slurries of test articles or drugs, chemical or biological reaction products. This same embodiment coupled with a robotic reagent dispenser can also be used to sequentially monitor chemical or biological reaction product production and multivariant analysis in a timed sequential manner. This embodiment also lends itself to manual and robotic applications.

Figure 7A:
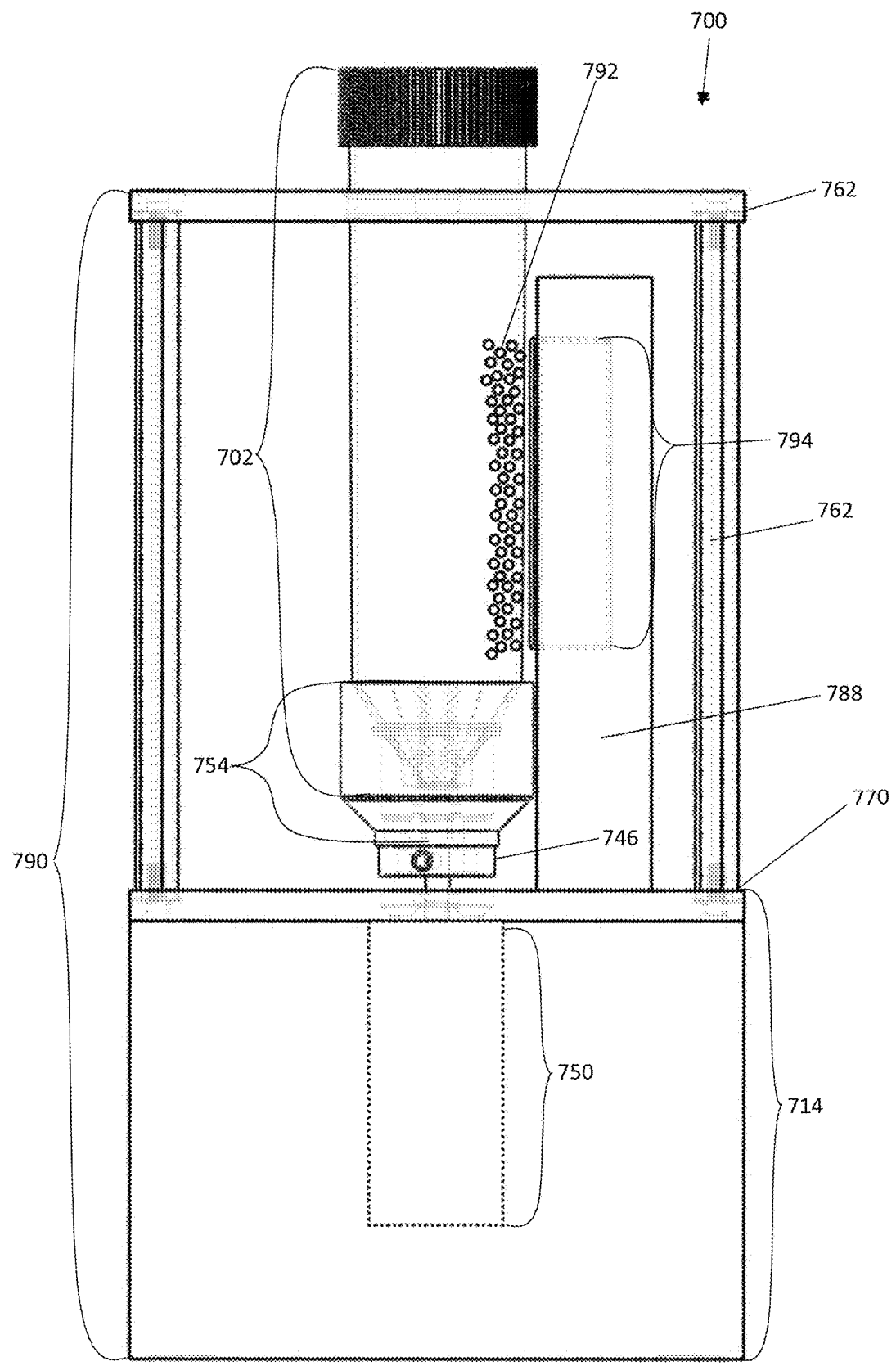
FIG. 7A illustrates a side view of a spin vessel with a magnet placed adjacent an outer wall of a spin vessel.
Figure 7B:
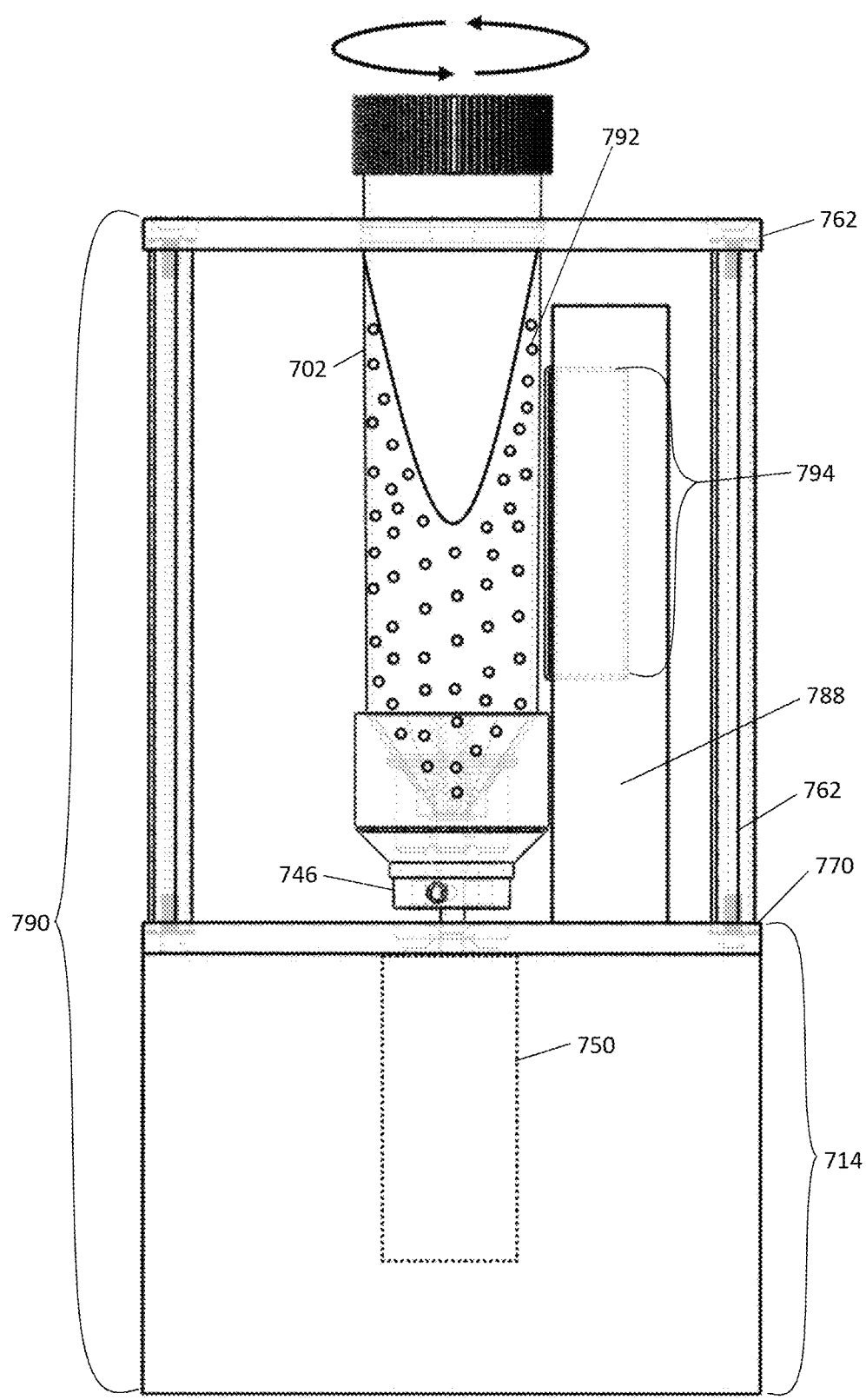
FIG. 7B illustrates the spin vessel of FIG. 7A in rotational motion with magnetic beads suspended in a new wash reagent.

FIGS. 7A and 7B illustrate a spin vessel system 700 including a magnetic bead washing system 790 and a spin vessel 702 containing paramagnetic beads 792. The spin vessel 702 may be positioned adjacent to magnetic field 794 configured to attract the paramagnetic beads 792 to the side of the spin vessel 702 when the spin vessel 702 is stationary. In some embodiments, the magnetic field 794 may include at least a 30 megagauss-oersteds (MG·Oe) magnetic field. A motor box 714 and a motor 750 may form a base 770 of a rack 762 configured to support the spin vessel 702. The motor 750 may be coupled to the drive base 754 by a motor shaft assembly 746. The magnetic field 794 may be coupled to a structure 788.

FIG. 7B illustrates the spin vessel system 700 including the magnetic bead washing system 790 when the spin vessel 702 is spinning and the paramagnetic beads 792 are uniformly suspended in a liquid. The magnetic field 794 may be configured to attract the paramagnetic beads 792 to a side of the spin vessel 702. When the paramagnetic beads 792 are positioned on the side of the spin vessel 702, the liquid may be removed and replaced with a second liquid. The spin vessel 702 may then be rotated to uniformly suspend the paramagnetic beads 792. This process can be repeated several times either robotically or manually to concentrate analyte, wash impurities, or elute analyte from the paramagnetic beads. In certain embodiments, the spin vessel may be rotated at about 10 to 1,000 RPM.

Figure 7C:
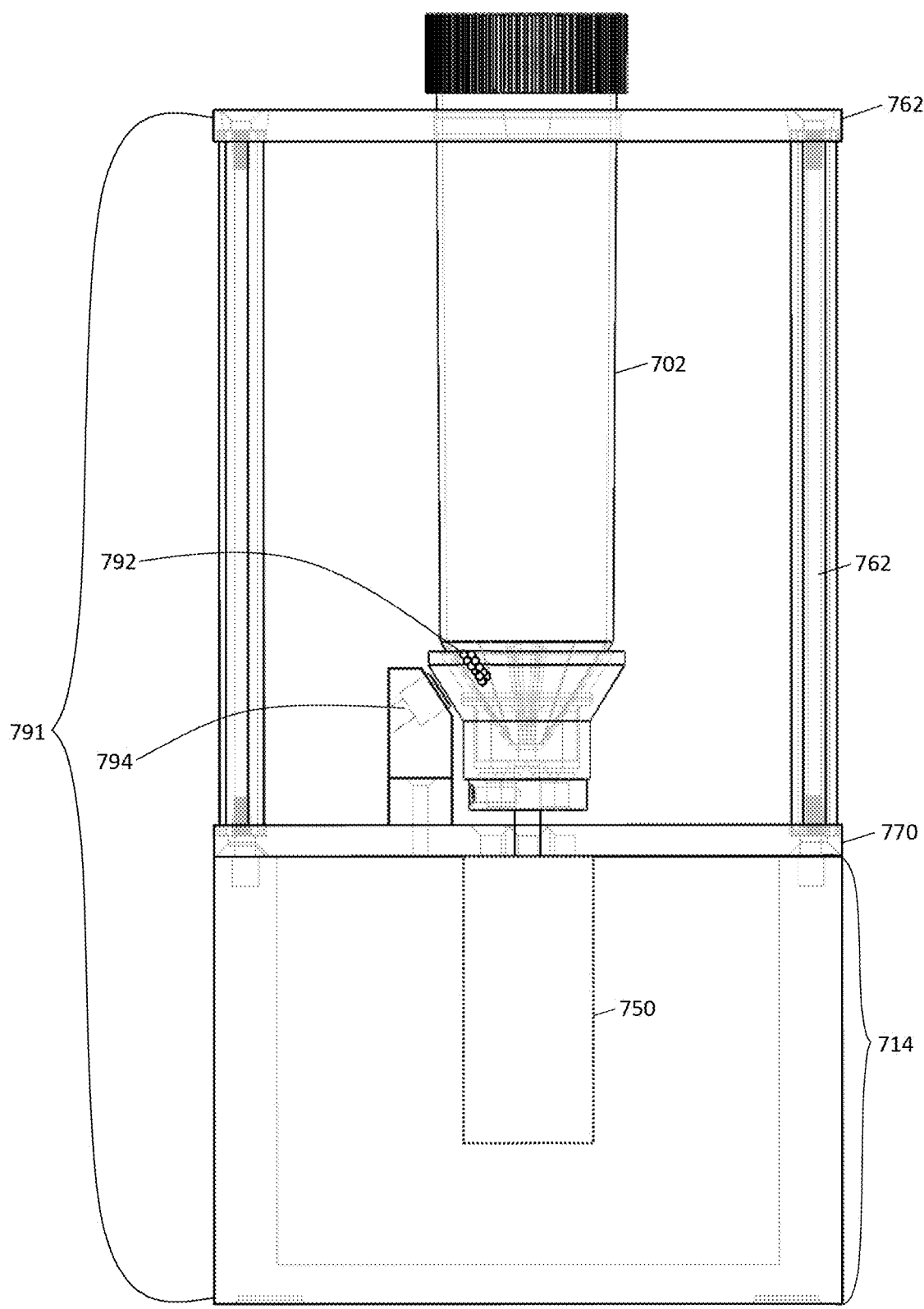
FIG. 7C illustrates an isometric view of a centrifuge tube in a spin vessel rack with magnets at the base of the vessel to collect magnetic beads at a bottom of the spin vessel for elution purposes.

FIG. 7C illustrates an isometric view of a magnetic bead-concentrating system 791 configured to position a spin vessel 702 containing a liquid specimen and ligand specific paramagnetic beads 792 adjacent to a magnetic field 794 (e.g., such as a 30 MG·Oe magnetic field) to attract the ligand specific paramagnetic beads 792 to the bottom of the spin vessel 702 when the spin vessel 702 is stationary. A motor box 714 and a motor 750 may form a base 770 of a rack 762 configured to support the spin vessel 702. When the spin vessel 702 is in rotational motion, the ligand specific paramagnetic beads 792 may be uniformly suspended with enhanced exposure to the analyte of interest for a variable period of time. When the rotational motion of the spin vessel 702 stops, the ligand specific paramagnetic beads 792 may be attracted and collected at the bottom of the spin vessel 702. The liquid specimen may be removed and replaced with a wash liquid and the spinning may resume to resuspend the ligand specific paramagnetic beads 792 followed by stopping and collecting the ligand specific paramagnetic beads 792 and repeating the process until the desired level of washing is completed.

Figure 8A:
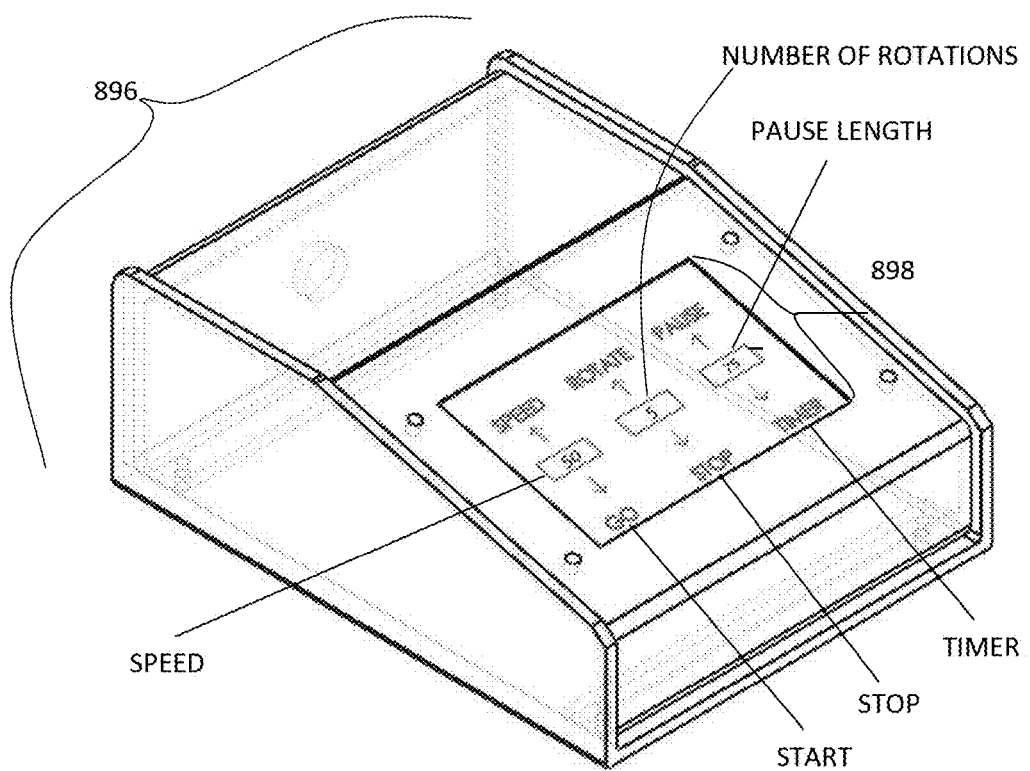
FIGS. 8A and 8B illustrate isometric views of the multi-function control box and multiple digital input interfaces used to control a spin vessel motor.
Figure 8B:
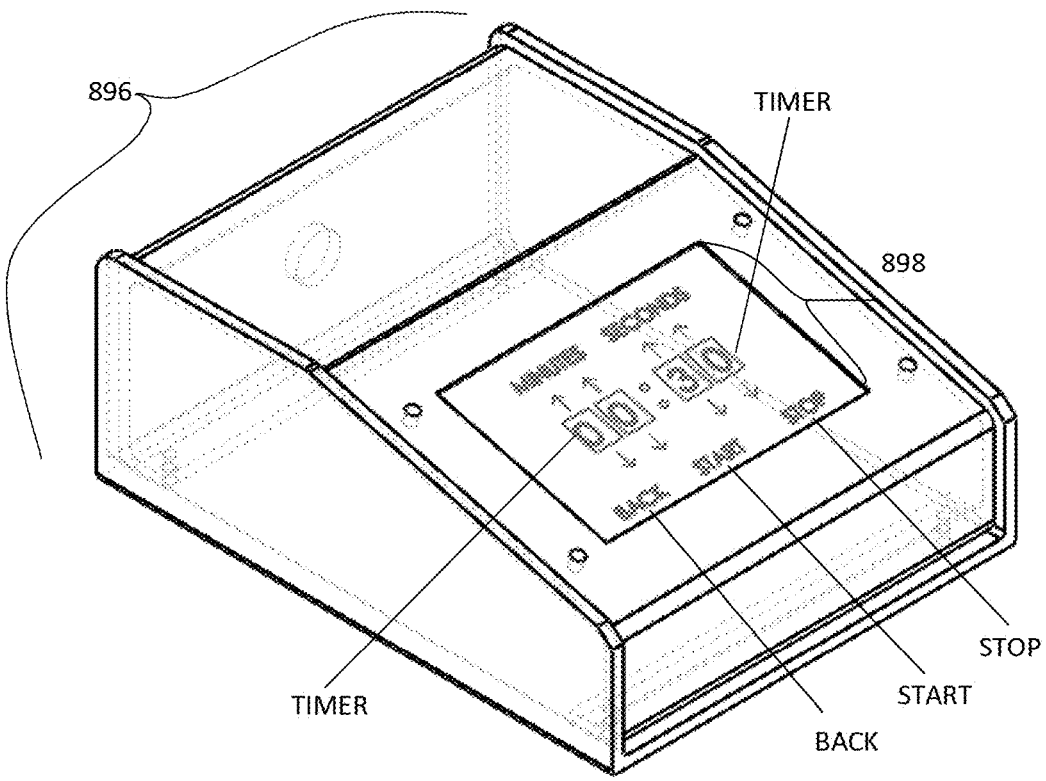

FIGS. 8A and 8B illustrate a motor controller 896 for one or more motors as described herein. Because different liquids have different viscosities and particulates have different densities, specific gravities, sizes, shapes and fragility levels it is essential that operators be able to quickly and empirically determine one or more motor settings. For example, an LED touch function screen 898 may be used to input data and commands as well as to display one or more settings for user control. Such inputs and settings may include a speed in RPM (revolutions per minute), number of rotations before direction reversal, length of pause after stop, length of time in minutes the reversal cycle may run, length of time in seconds the reversal cycle may run, the number of cycles to run and/or other settings. Other functions and settings the motor controller 896 may be configured to provide for user control may include a start or go button, a stop button, a timer button that changes the LED function screen to LED timer screen, a back button to toggle between one or more settings, a start button, and a stop button, and/or other settings.

One or more aspects or features of the current subject matter can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

Figure 9:
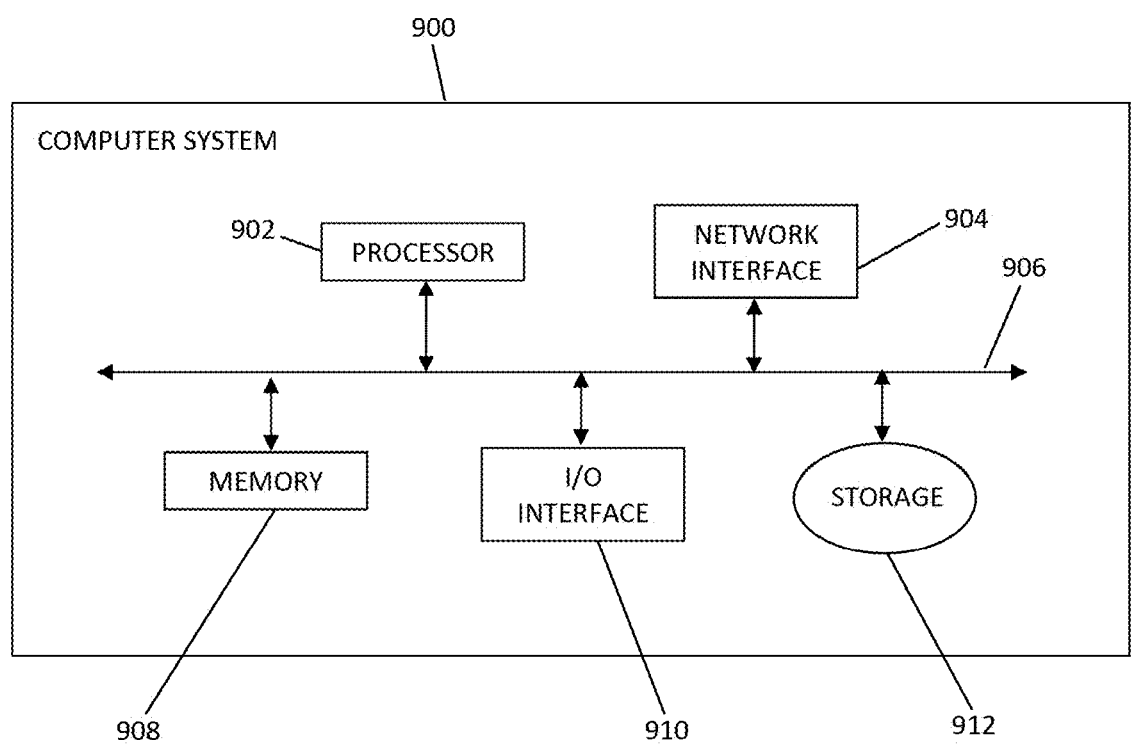
FIG. 9 illustrates one exemplary embodiment of a computer system that can be used to implement a control system of the present disclosure.

FIG. 9 illustrates an exemplary embodiment of a computer system 900. The computer system 900 may include one or more processors 902 configured to control the operation the computer system 900. The processors 902 may also be referred to herein as "controllers". The computer system 900 can also include one or more memory modules 908, which can provide temporary storage for code or programs to be executed the processor for data acquired from one or more users, storage devices 912, and/or databases. Such programs may include, for example, speed regulation as a volume of liquid in a vessel decreases responsive to removing many aliquots of liquid. The various elements of the computer system 900 can be coupled to a bus system 906. As illustrated in FIG. 9, the bus system 906 may represent any one or more separate physical busses, communication lines/interfaces, and or multi-drop or point-to-point connections, connected by appropriate bridges, adapters, and/or controllers. The computer system 900 can also include one or more network interfaces 904, one or more input/output interfaces 910 (such as, for example, a touch screen), and one or more storage devices 912.

Figure 10:
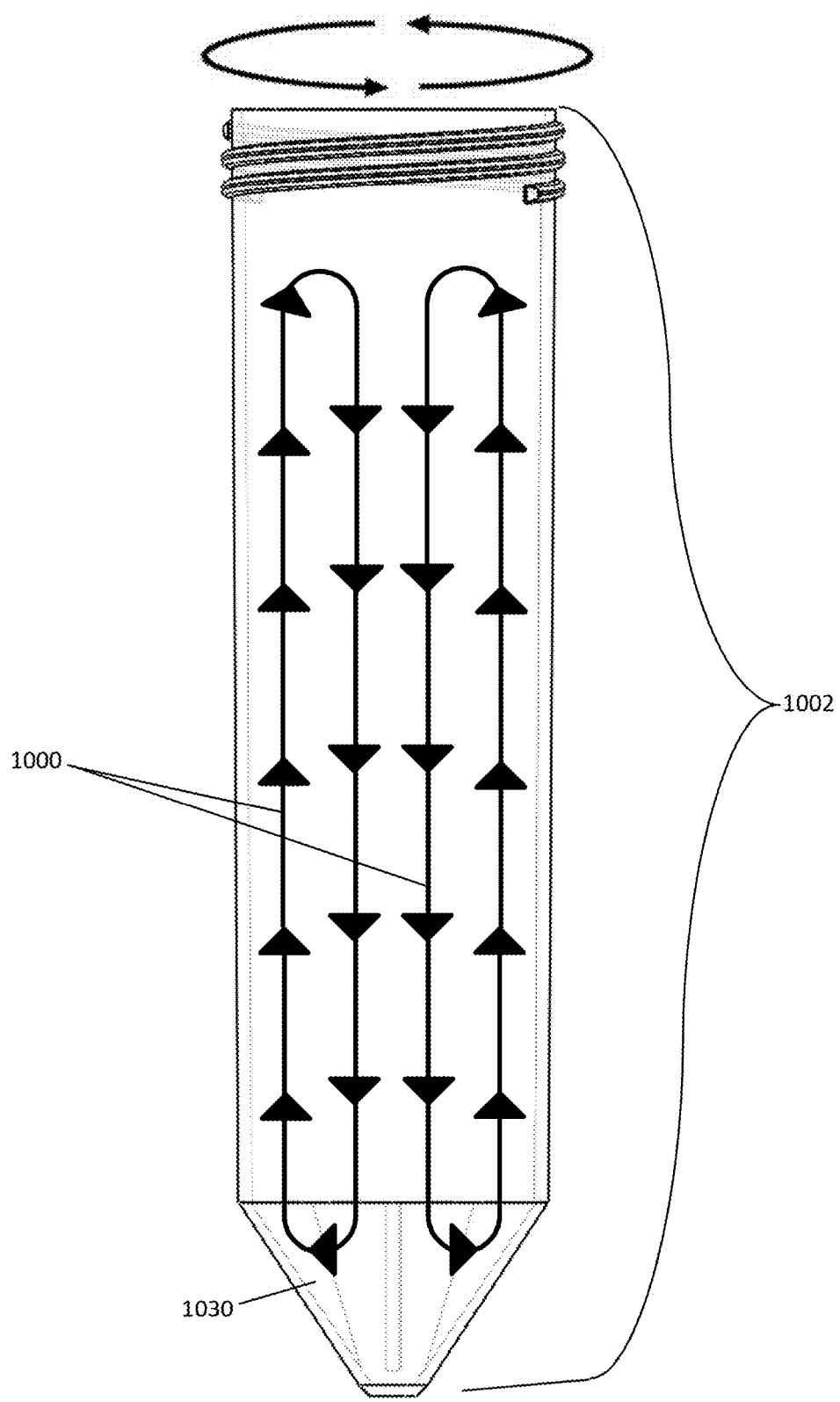
FIG. 10 illustrates an embodiment of a rotationally moving spin vessel showing a "pulsed radial fluid flow pattern"

FIG. 10 illustrates an embodiment of a spin vessel 1002 in alternating rotational motion. While not wishing to be held by theory, a "pulsed radial flow" 1000 as shown, of the liquid within the spin vessel 1002 that includes side fins 1030 may occur responsive to repetition of the spin vessel being rotated in alternating clockwise and counterclockwise directions.

EXAMPLES

Example 1

Figure 11:
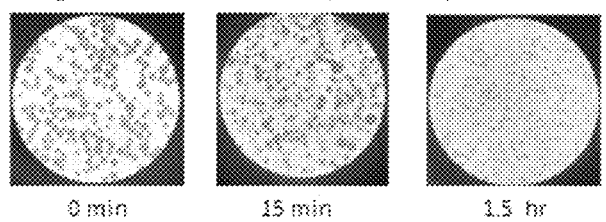
FIG. 11 shows time-varied photographs of Chromatography Resin after mixing with conventional methods versus mixing using a spin vessel system consistent with implementations of the current subject matter.
Figure 11:
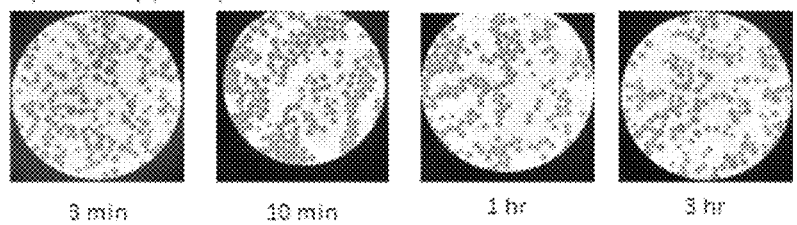

A comparison of the effect of magnetic spin bar stirring compared to spin vessel mixing on chromatography resin in suspension was performed. FIG. 11 shows a time-varied photograph of a Chromatography Resin after mixing in a standard 50 ml test tube with a magnetic stir bar (top row of images) and mixing using a spin vessel 50 ml test tube (bottom row of images). The results as pictured in FIG. 11 show the damage done to the Chromatography Resin by the Stir Bar compared to having no damage occur with even longer stirring using a spin vessel test tube consistent with the implementations of the spin vessel system as described herein.

Example 2

Figure 12:
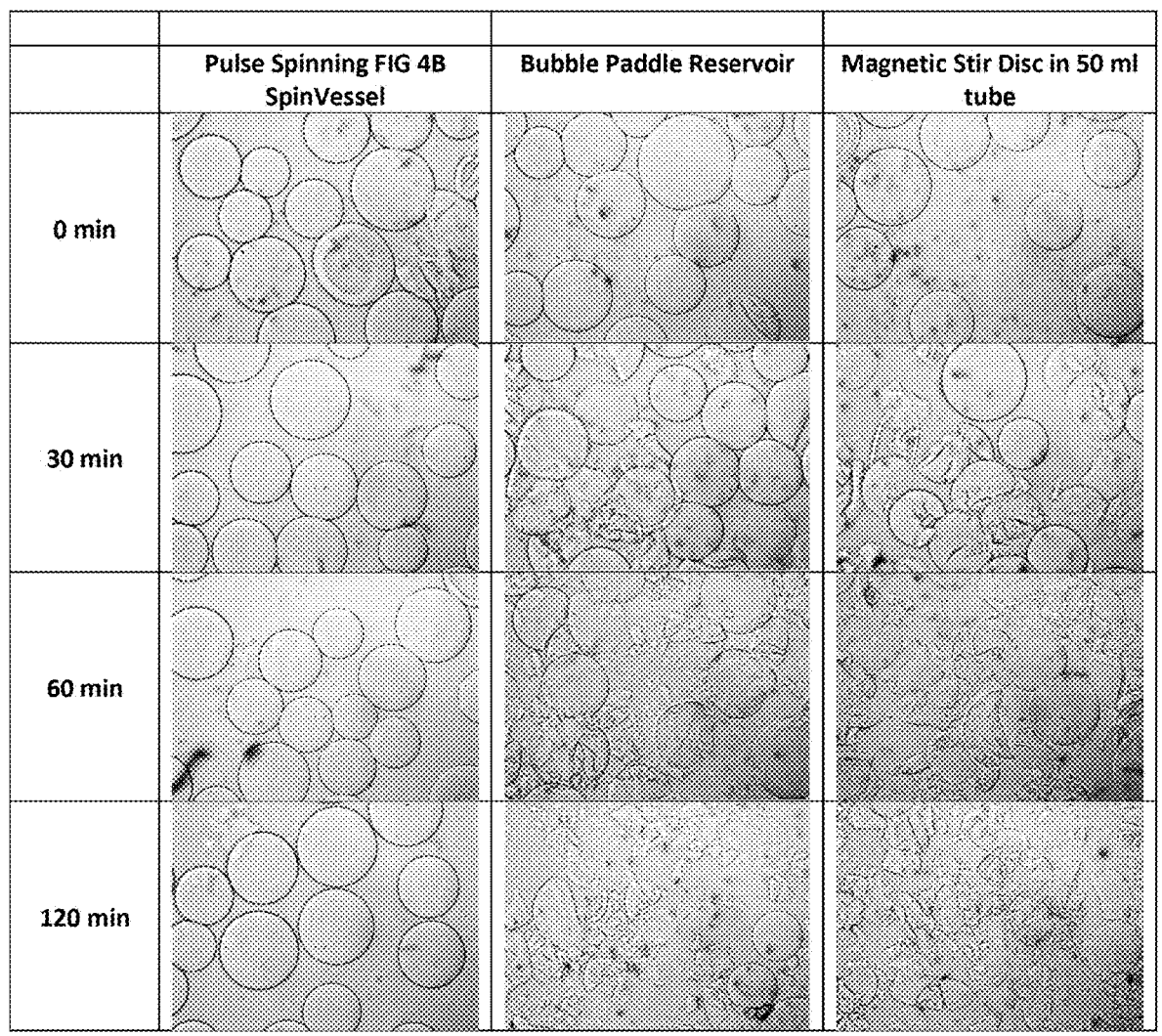
FIG. 12 graphically illustrates the destruction of Dextran Beads over time by Bubble Paddle Stirring and Magnetic Disc stirring, but not with pulsed spinning in a FIG. 4B spinning vessel.

A comparison of the effect of Bubble Paddle stirring and magnetic spin bar stirring compared to spin vessel mixing on Cytodex Dextran Beads in suspension was performed. FIG. 12 graphically illustrates the destruction of Cytodex Dextran Beads by Bubble Paddle Stirring beginning at 30 minutes and resulting in total destruction of the Dextran Beads by 120 minutes. The Magnetic Disc stirring also showed beginning bead destruction at 30 minutes and total destruction by 60 minutes. There was no evidence of Dextran Bead destruction even after 120 minutes of pulsed spinning in a FIG. 4B spinning vessel.

Example 3

Figure 13:
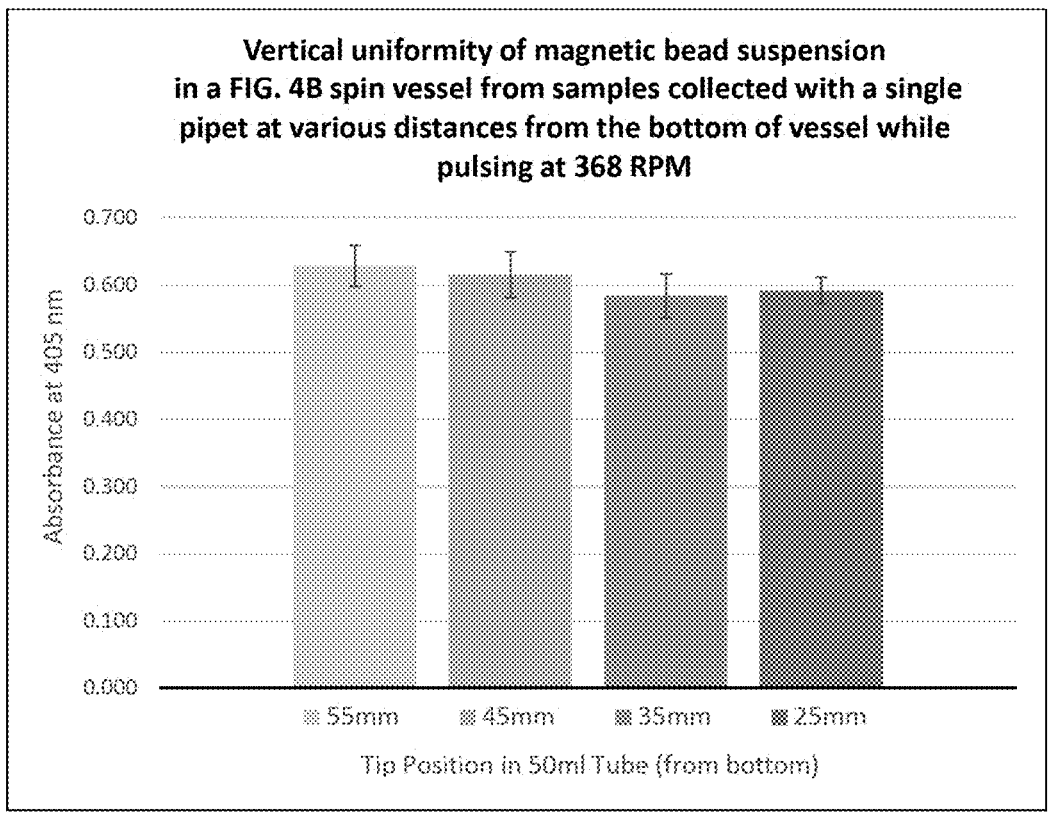
FIG. 13 graphically illustrates the vertical top to bottom uniformity of magnetic bead suspensions in a FIG. 4B spin vessel.

The uniformity of dispersion of a suspension of paramagnetic beads was studied when mixed in a spin vessel embodiment of the invention. FIG. 13 graphically illustrates the suspension uniformity of Promega Magnasil para-magnetic beads from the top (55 mm from the bottom of the vessel) down to 25 mm from the bottom of the vessel. This indicates that the beads are uniformly distributed from top to bottom of the FIG. 4B spin vessel.

Example 4

Figure 14:
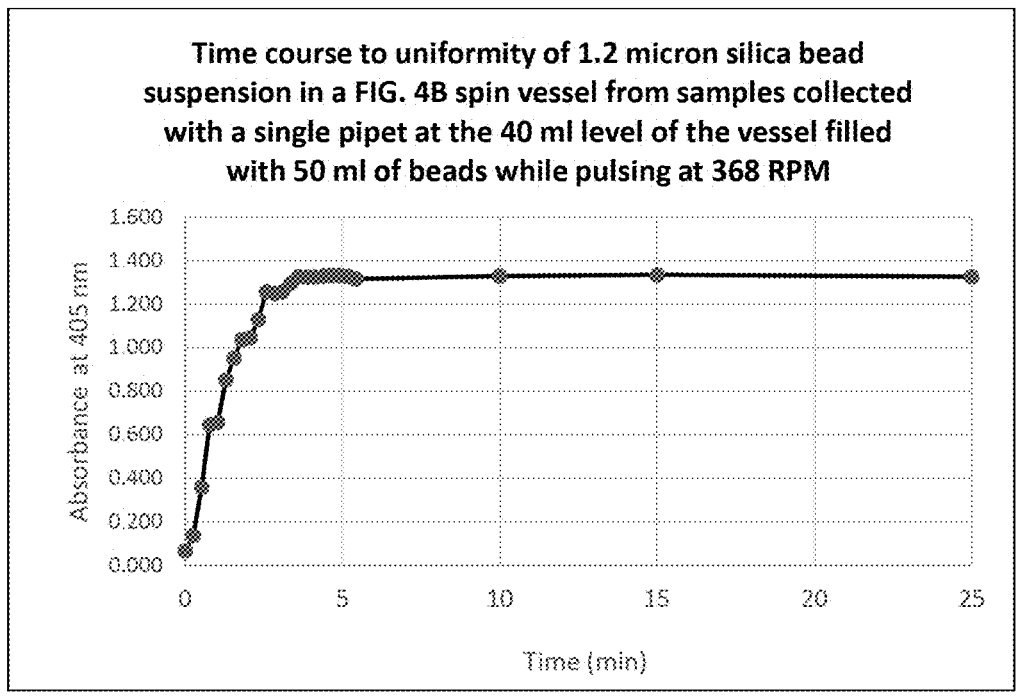
FIG. 14 graphically illustrates the time it takes to uniformly suspend 1.2 micron silica beads using a FIG. 4B spin vessel.

The efficiency and uniformity of dispersion of a suspension of 1.2 micron silica beads was studied when mixed in a spin vessel embodiment of the invention. FIG. 14 graphically illustrates it only takes ~3 minutes to resuspend settled 1.2 micron silica beads using a FIG. 4B spin vessel and pulsing it at 368 RPM.

Figure 15:
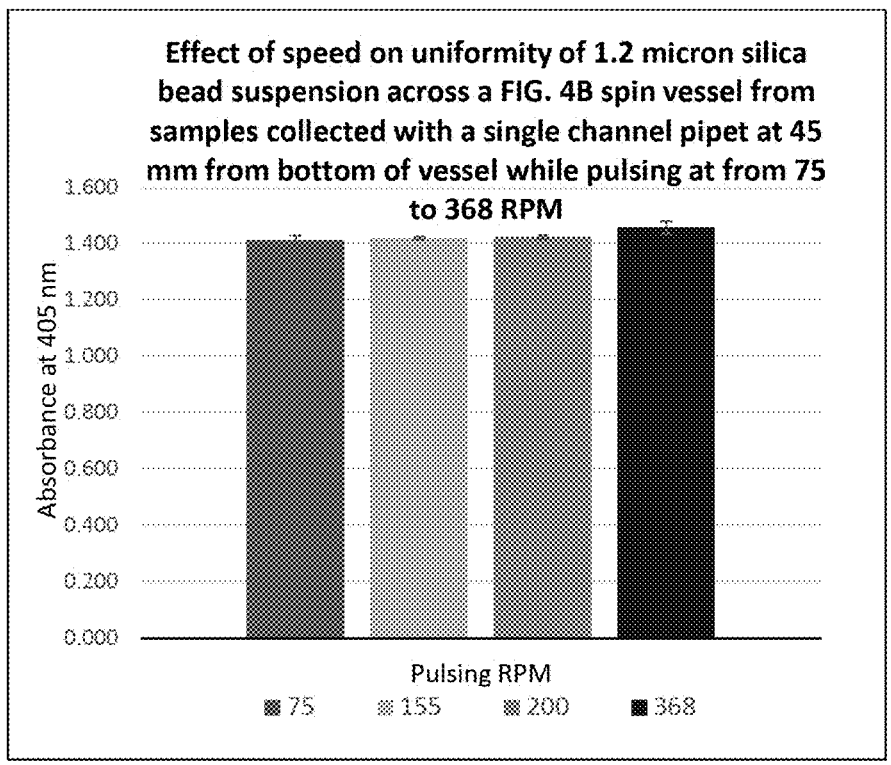
FIG. 15 graphically illustrates the uniformity of 1.2 micron silica bead suspensions performed at different RPM pulsing speeds using an FIG. 3D spin vessel.

FIG. 15 graphically illustrates the uniformity of 1.2 micron silica bead suspensions did not vary between pulsing RPM of 75 to 368 RPMs using an FIG. 3D spin vessel.

Figure 16:
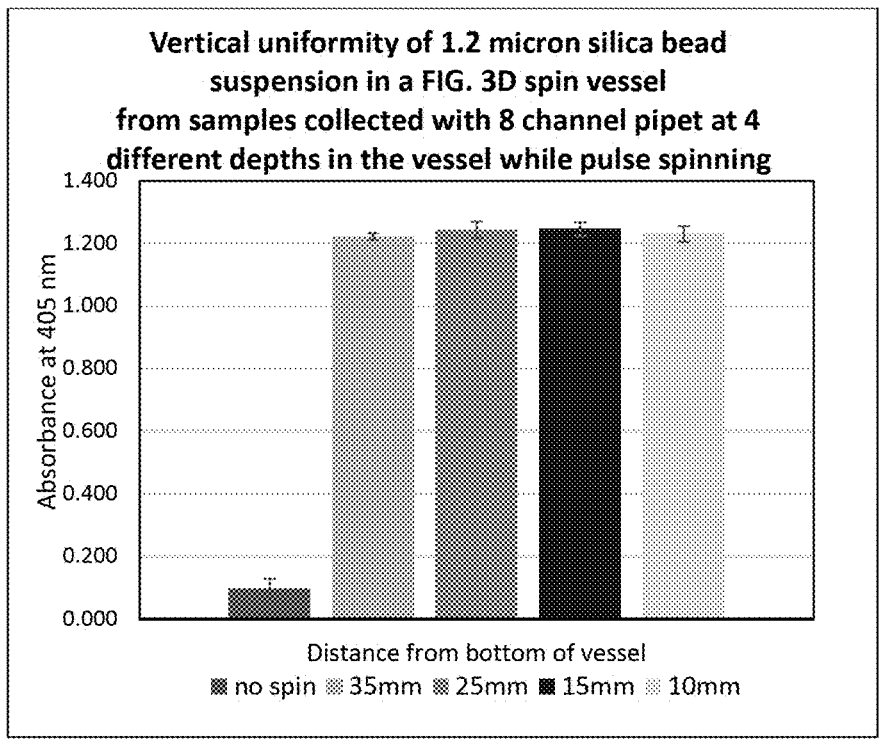
FIG. 16 graphically illustrates the uniformity of 1.2 micron silica bead suspensions collected different vertical distances in a FIG. 3D spin vessel.

FIG. 16 graphically illustrates the uniformity of 1.2 micron silica bead suspensions collected different vertical distances from 35 to 10 mm of the bottom in a FIG. 3D spin vessel and pulsed at 200 RPM.

Figure 17:
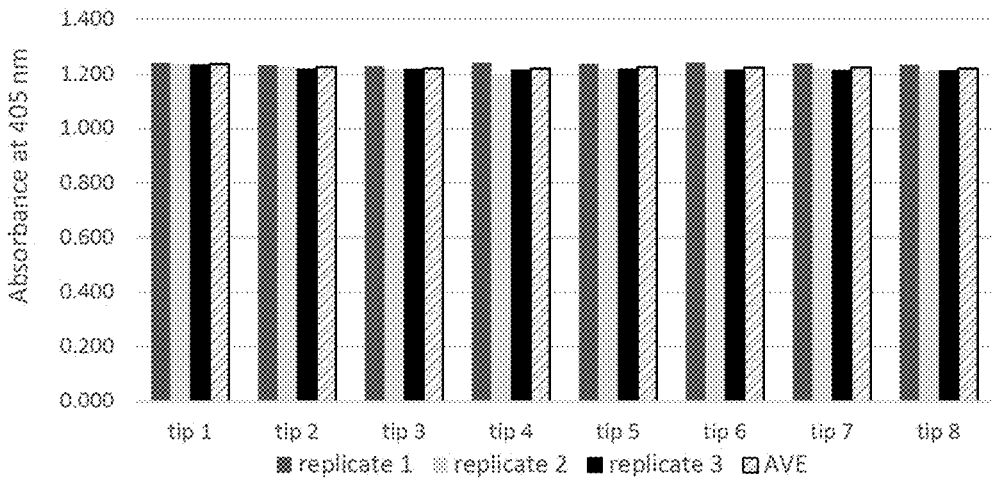
FIG. 17 graphically illustrates the uniformity of 1.2 micron silica bead suspensions collected at different horizontal distances across a FIG. 3D spin vessel at a distance of 35 mm from the vessel bottom.

FIG. 17 graphically illustrates the uniformity of all eight sampling positions of 1.2 micron silica bead suspensions collected at 8 different horizontal distances each 9 mm apart across a FIG. 3D spin vessel at a distance of 35 mm from the vessel bottom and pulsed at 200 RPM.

Figure 18:
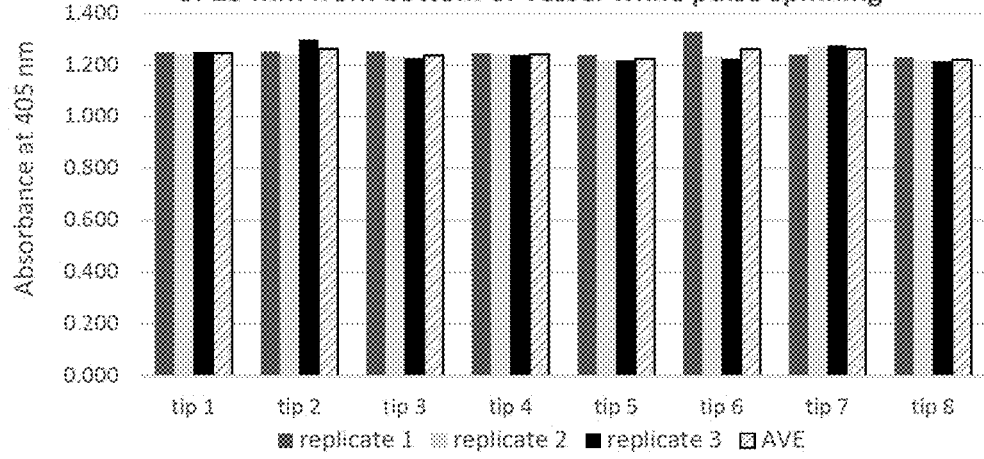
FIG. 18 graphically illustrates the uniformity of 1.2 micron silica bead suspensions collected at different horizontal distances across a FIG. 3D spin vessel at a distance of 25 mm from the vessel bottom.

FIG. 18 graphically illustrates the uniformity of all eight sampling positions of 1.2 micron silica bead suspensions collected at 8 different horizontal distances each 9 mm apart across a FIG. 3D spin vessel at a distance of 25 mm from the vessel bottom and pulsed at 200 RPM.

Figure 19:
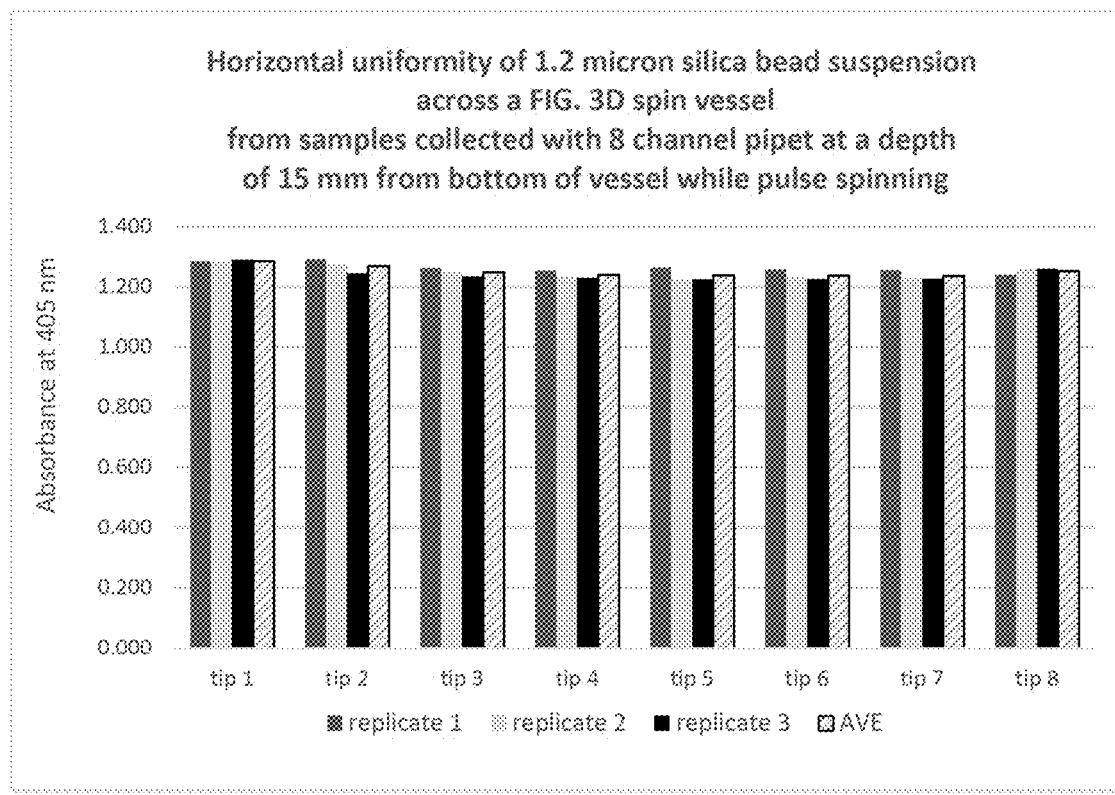
FIG. 19 graphically illustrates the uniformity of 1.2 micron silica bead suspensions collected at different horizontal distances across a FIG. 3D spin vessel at a distance of 15 mm from the vessel bottom.

FIG. 19 graphically illustrates the uniformity of all eight sampling positions of 1.2 micron silica bead suspensions collected at 8 different horizontal distances each 9 mm apart across a FIG. 3D spin vessel at a distance of 15 mm from the vessel bottom and pulsed at 200 RPM.

Figure 20:
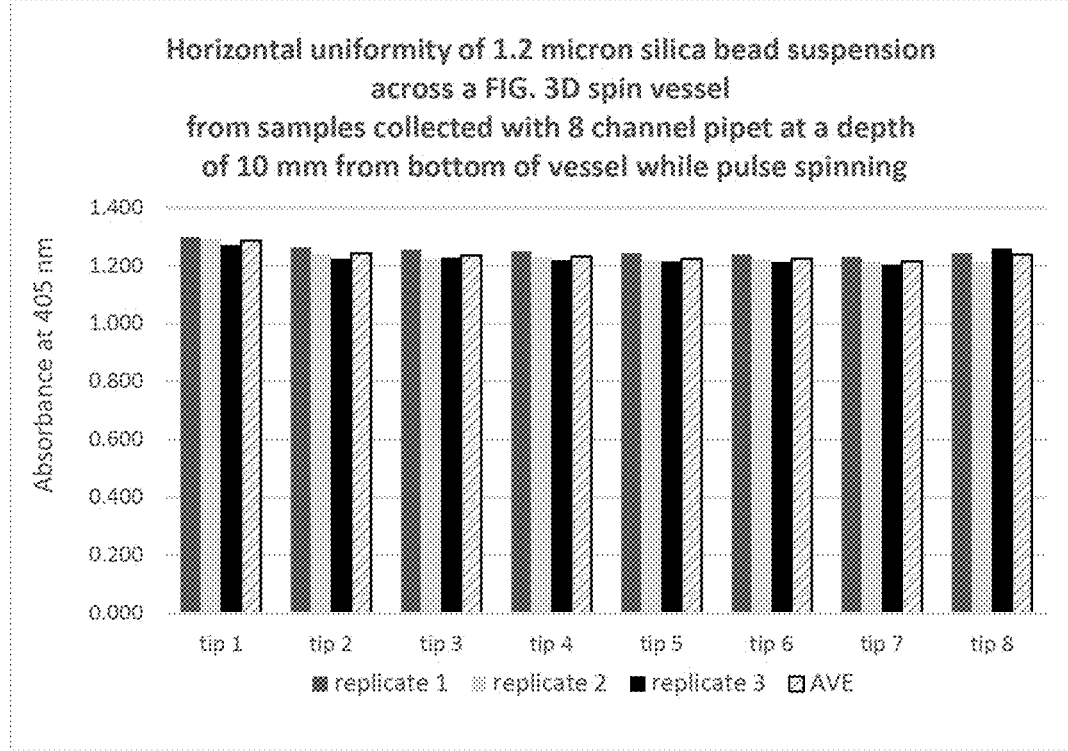
FIG. 20 graphically illustrates the uniformity of 1.2 micron silica bead suspensions collected at different horizontal distances across a FIG. 3D spin vessel at a distance of 10 mm from the vessel bottom.
Figure 21:
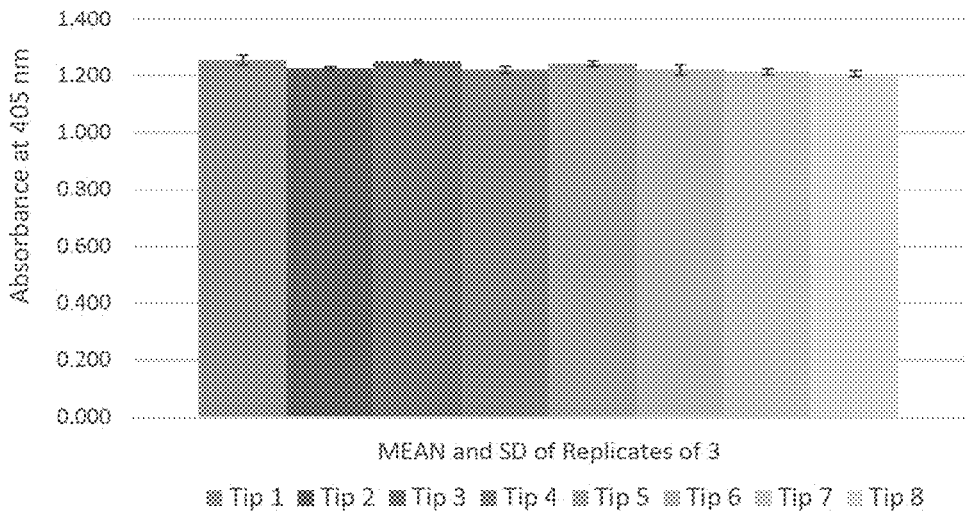

FIG. 20 graphically illustrates the uniformity of all eight sampling positions of 1.2 micron silica bead suspensions collected at 8 different horizontal distances each 9 mm apart across a FIG. 3D spin vessel at a distance of 10 mm from the vessel bottom and pulsed at 200 RPM.

Figure 21:
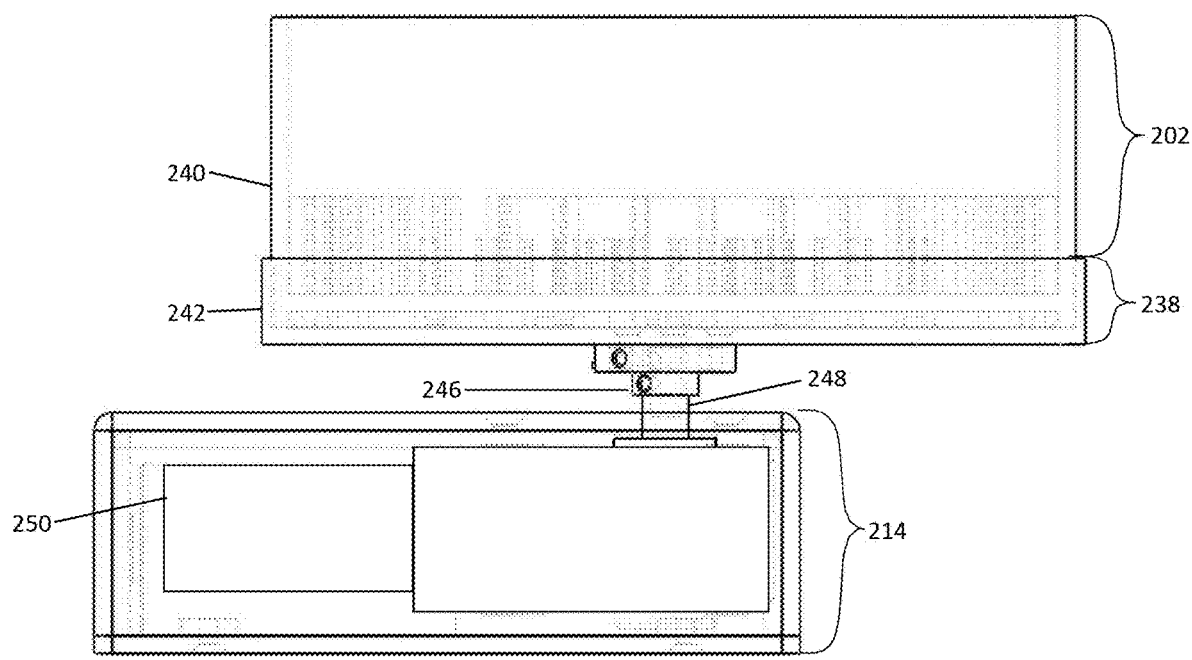
FIG. 21 graphically illustrates the uniformity of 1.2 micron silica bead suspensions collected at different horizontal distances across a FIG. 3D spin vessel while pulsing 368 RPM and a distance of 35 mm from the vessel bottom.

FIG. 21 graphically illustrates the uniformity of all eight sampling positions of 1.2 micron silica bead suspensions collected at 8 different horizontal distances each 9 mm apart across a FIG. 3D spin vessel at a distance of 35 mm from the vessel bottom and pulsed at 368 RPM.

Figure 22:
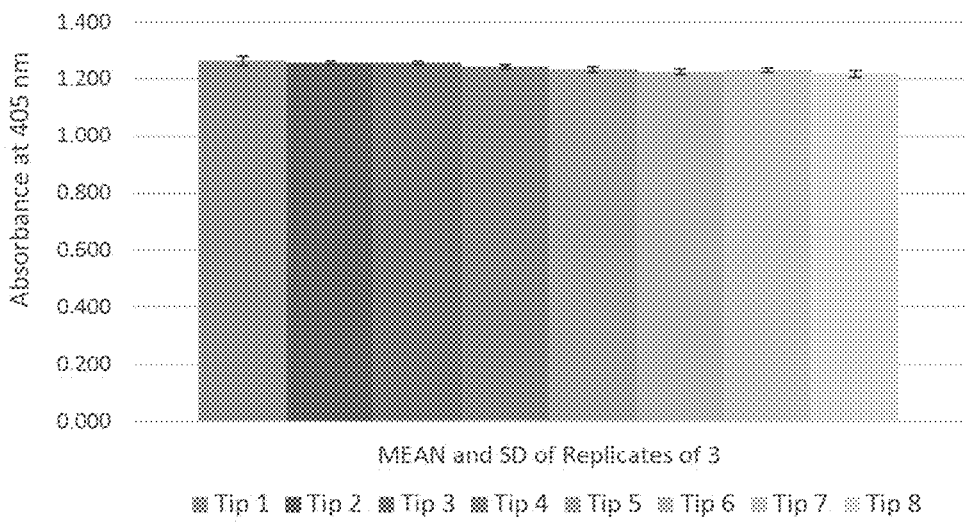
FIG. 22 graphically illustrates the uniformity of 1.2 micron silica bead suspensions collected at different horizontal distances across a FIG. 3D spin vessel while pulsing 200 RPM and a distance of 35 mm from the vessel bottom.

FIG. 22 graphically illustrates the uniformity of all eight sampling positions of 1.2 micron silica bead suspensions collected at 8 different horizontal distances each 9 mm apart across a FIG. 3D spin vessel at a distance of 35 mm from the vessel bottom and pulsed at 200 RPM.

Figure 23:
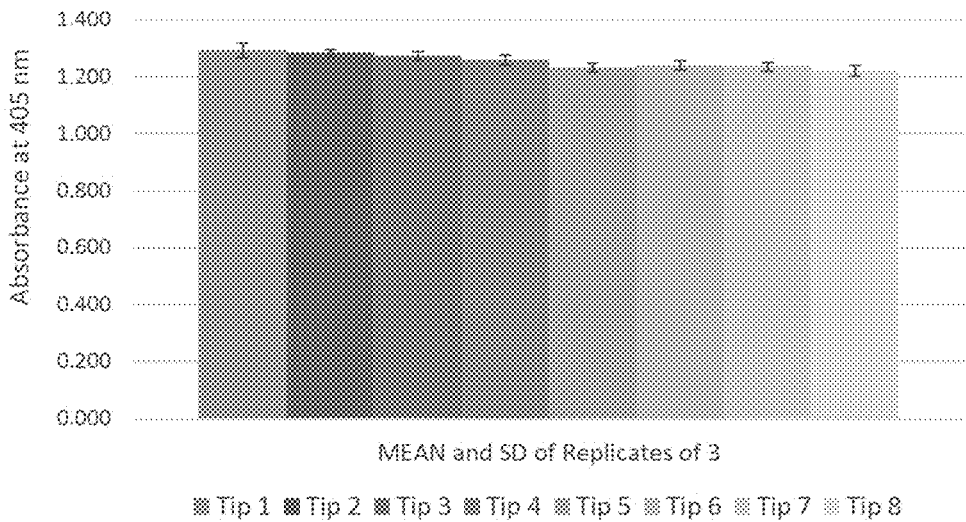
FIG. 23 graphically illustrates the uniformity of 1.2 micron silica bead suspensions collected at different horizontal distances across a FIG. 3D spin vessel while pulsing 155 RPM and a distance of 35 mm from the vessel bottom.

FIG. 23 graphically illustrates the uniformity of all eight sampling positions of 1.2 micron silica bead suspensions collected at 8 different horizontal distances each 9 mm apart across a FIG. 3D spin vessel at a distance of 35 mm from the vessel bottom and pulsed at 155 RPM.

Figure 24:
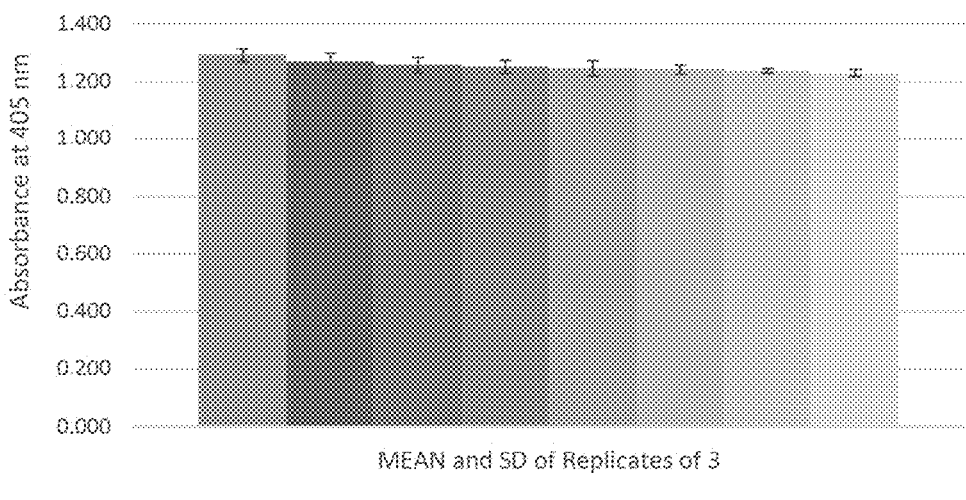
FIG. 24 graphically illustrates the uniformity of 1.2 micron silica bead suspensions collected at different horizontal distances across a FIG. 3D spin vessel while pulsing 75 RPM and a distance of 35 mm from the vessel bottom.

FIG. 24 graphically illustrates the uniformity of all eight sampling positions of 1.2 micron silica bead suspensions collected at 8 different horizontal distances each 9 mm apart across a FIG. 3D spin vessel at a distance of 35 mm from the vessel bottom and pulsed at 75 RPM.

FIG. 25 illustrates Human Embryonic Kidney cell suspensions prepared by 3 different spin vessels (illustrated in FIG. 2A, FIG. 3D and FIG. 6B) without loss of cell viability or reduction in cell concentration after 3 hours of pulse spinning. The Human Embryonic Kidney cells are FreeStyle 293-F cells grown in FreeStyle 293 Expression Medium. Cell counts and viability were determined using the Chemometec Via1-Cassette™ together with NucleoCounter NC-200™

FIG. 26 illustrates Human Embryonic Kidney cell suspensions prepared by the spin vessel illustrated in FIG. 2A demonstrates the rapidity (5 minutes or less) of resuspending the cells after they are allowed to settle out of solution and without loss of cell viability or reduction in cell concentration. The Human Embryonic Kidney cells are FreeStyle 293-F cells grown in FreeStyle 293 Expression Medium. Cell counts and viability were determined using the Chemometec Via1-Cassette™ together with NucleoCounter NC-200™

FIG. 27 illustrates the uniformity of Human Embryonic Kidney cell suspensions collected at eight different horizontal distances each separated by 9 mm across a FIG. 2A spin vessel and without loss of cell viability or reduction in cell concentration. The Human Embryonic Kidney cells are FreeStyle 293-F cells grown in FreeStyle 293 Expression Medium. Cell counts and viability were determined using the Chemometec Via1-Cassette™ together with NucleoCounter NC-200™

EMBODIMENTS

Embodiment 1

A system for mixing liquids and uniformly suspending particulates comprising:
at least one substantially cylindrical vessel with a center and a radius comprising a vessel opening, a vessel base interior, and a vessel base exterior, the vessel further comprising:
a plurality of side fins, the side fins comprising a side fin width and a side fin height;
a plurality of interior projections extending from the vessel base interior, the interior projections comprising an interior projection width and an interior projection height;
a plurality of circumferences, the circumferences each comprising a circumference radius;
wherein the circumferences comprise the following radii: 6.4 mm, 14.2 mm, 19.1 mm, 22.9 mm, 26.2 mm, 31.8 mm, 34.3 mm, 38.7 mm, 40.7 mm, 42.7 mm, 44.5 mm, 46.3 mm, 49.7 mm, 51.3 mm, 54.3 mm, 58.7 mm, 62.2 mm; or,
wherein the circumferences comprise the following radii: 4.5 mm, 13.50 mm, 22.50 mm, 31.50 mm;
wherein neither the side fin width nor interior projection width extends within 1.5 mm of any of the circumferences;
a drive base operably connected to the vessel base exterior;
a motor operatively connected to the drive base;
a motor controller with speed and rotational direction control.

Embodiment 2

The system of embodiment 1, wherein neither side fins nor interior projections are within a 12.5 mm radius of the center of the vessel.

Embodiment 3

The system of embodiment 1, wherein neither the side fin width nor interior projection width extends within 1.5 mm of any of the circumferences

Embodiment 4

The system of any of embodiments 1 to 3, wherein the vessel comprises a height and the side fin height or the interior projection height is less than 20% of the vessel height.

Embodiment 5

The system of embodiment 4, wherein the side fin height and the interior projection height is less than 20% of the vessel height

Embodiment 6

The system of embodiment 4, wherein the vessel height is about 5 cm to about 150 cm.

Embodiment 7

The system of any of embodiments 1 to 6, wherein the interior projection width is at least 1 mm, at least 2 mm, at least 3 mm, or at least 4 mm.

Embodiment 8

The system of any of embodiments 1 to 6, wherein the side fin width is at least 1 mm, at least 2 mm, at least 3 mm, at least 4 mm, at least 5 mm, at least 10 mm, at least 20 mm, at least 30 mm, at least 40 mm, at least 50 mm, at least 75 mm, at least 100 mm, at least 125 mm, at least 150 mm, or at least 200 mm.

Embodiment 9

The system of any of embodiments 1 to 7, wherein the drive base comprises a proximal lip with an internal radius greater than the vessel radius.

Embodiment 10

The system of embodiment 9, wherein the proximal lip comprises proximal lip height and the vessel comprises a vessel height, and wherein the height of the proximal lip is at least 10% of the height of the vessel height.

Embodiment 11

The system of any of embodiments 1 to 10, wherein the vessel base exterior comprises one or more engagement tabs and the drive base comprises one or more engagement slots.

Embodiment 12

The system of any of embodiments 1 to 10, wherein the vessel base exterior comprises one or more engagement slots and the drive base comprises one or more engagement tabs.

Embodiment 13

The system of any of embodiments 1 to 10, wherein the vessel base exterior comprises a friction fit with the drive base.

Embodiment 14

The system of any of embodiments 1 to 10, wherein the vessel base exterior is connected to the drive base via an O-ring, set screws, or adhesive tape.

Embodiment 15

The system of any of embodiments 1 to 14, wherein the vessel comprises plastic or metal.

Embodiment 16

The system of embodiment 15, wherein the vessel comprises Polytetrafluoroethylene, polypropylene, nylon, polyester, acetal homopolymer), Acrylonitrile Butadiene Styrene, Ultra-High Molecular Weight polyethylene, High Density Polyethylene, Low Density Polyethylene, Polyvinyl Chloride, Polyvinylidene Difluoride, silicone, modified Polyphenylene Oxide, Fluorinated Ethylene Propylene, Polyphenylene Sulfide, Polyether Ether Ketone, Perfluoroalkoxy, Polyetherimide, Polyamide-Imide, polyamide, polylactic acid (PLA), photo epoxy resin, or photo polymer resin.

Embodiment 17

The system of any of embodiments 15 or 16, wherein the vessel is machined, molded, or 3-D printed.

Embodiment 18

The system of any of embodiments 1 to 17, wherein the drive base comprises metal or plastic.

Embodiment 19

The system of embodiment, wherein the drive base comprises plastic and the plastic comprises Polytetrafluoroethylene, polypropylene, nylon, polyester, acetal homopolymer), Acrylonitrile Butadiene Styrene, Ultra-High Molecular Weight polyethylene, High Density Polyethylene, Low Density Polyethylene, Polyvinyl Chloride, Polyvinylidene Difluoride, silicone, modified Polyphenylene Oxide, Fluorinated Ethylene Propylene, Polyphenylene Sulfide, Polyether Ether Ketone, Perfluoroalkoxy, Polyetherimide, Polyamide-Imide, polyamide, polylactic acid (PLA), photo epoxy resin, or photo polymer resin

Embodiment 20

The system of any of embodiments 18 or 19, wherein the drive base is machined, molded, or 3-D printed.

Embodiment 21

The system of any of embodiments 1 to 20, wherein the motor comprises direct drive or indirect drive.

Embodiment 22

The system of any of embodiments 1 to 20, wherein the motor comprises a belt driven pulley system or a gear system.

Embodiment 23

The system of any of embodiments 1 to 22, comprising at least four vessels.

Embodiment 24

The system of embodiment 23, comprising at least 6, at least 8, at least 10, at least 12, at least 16, at least 24, at least 32, at least 48, or at least 96 vessels.

Embodiment 25

The system of any of embodiments 1 to 24, further comprising a liquid handling system comprising a plurality of pipettors.

Embodiment 26

The system of embodiment 25, wherein none of the side fins or the interior projections contact the pipettors when the vessel is rotated.

Embodiment 27

The system of any of embodiments 1 to 26, wherein the motor controller comprises a computer control system.

Embodiment 28

A method for sampling a liquid or suspension comprising:
mixing a liquid in the vessel of the system of any of embodiments 1 to 27 by rotating the vessel in a clockwise direction for a first period of time, pausing the rotation for a second period of time, rotating the vessel in a counterclockwise direction for a third period of time, and pausing the rotation for a second period of time; and
optionally repeating step (a) a plurality of times; and, removing a volume of the liquid or suspension.

Embodiment 29

The method of embodiment 28, wherein removing a volume of the liquid or suspension is repeated at timed intervals.

Embodiment 30

A system for magnetic bead attraction and liquid mixing comprising:
at least one substantially cylindrical vessel with a center and a radius comprising a vessel opening, a vessel base exterior, an interior vessel wall, and an exterior vessel wall, the vessel further comprising:
  a plurality of side fins, the side fins comprising a side fin width and a side fin height;
  wherein the side fin width does not extend into a region closer than 1.5 mm to the center of the vessel;
  a magnet positioned adjacent to the exterior vessel wall;
  a drive base operably connected to the vessel base exterior;
  a motor operatively connected to the drive base; and
  a motor controller with speed and rotational direction control.

Embodiment 31

The system of embodiment 30, wherein the magnet is a permanent magnet or an electromagnet.

Embodiment 32

The system of embodiment 30, wherein the magnet generates a magnetic field sufficient to cause magnetic beads in the liquid to adhere to the interior vessel wall.

Embodiment 33

The system of embodiment 30, wherein the magnet generates a magnetic field greater than 30 megagauss-oersteds.

Embodiment 34

The system of any of embodiments 30 to 33, wherein the vessel comprises a height and the side fin height is less than 20% of the vessel height.

Embodiment 35

The system of embodiment 34, wherein the vessel height is about 5 cm to about 150 cm.

Embodiment 36

The system of any of embodiments 30 to 35, wherein the side fin width is at least 1 mm, at least 2 mm, at least 3 mm, at least 4 mm, at least 5 mm, at least 10 mm, at least 20 mm, at least 30 mm, at least 40 mm, at least 50 mm, at least 75 mm, at least 100 mm, at least 125 mm, at least 150 mm, or at least 200 mm.

Embodiment 37

The system of any of embodiments 30 to 36, wherein the vessel base exterior comprises one or more engagement tabs and the drive base comprises one or more engagement slots.

Embodiment 38

The system of any of embodiments 30 to 36, wherein the vessel base exterior comprises one or more engagement slots and the drive base comprises one or more engagement tabs.

Embodiment 39

The system of any of embodiments 30 to 36, wherein the vessel base exterior comprises a friction fit with the drive base.

Embodiment 40

The system of any of embodiments 30 to 36, wherein the vessel base exterior is connected to the drive base via an O-ring, set screws, or adhesive tape.

Embodiment 41

The system of any of embodiments 30 to 40, wherein the vessel comprises plastic or metal.

Embodiment 42

The system of embodiment 41, wherein the vessel comprises Polytetrafluoroethylene, polypropylene, nylon, polyester, acetal homopolymer), Acrylonitrile Butadiene Styrene, Ultra-High Molecular Weight polyethylene, High Density Polyethylene, Low Density Polyethylene, Polyvinyl Chloride, Polyvinylidene Difluoride, silicone, modified Polyphenylene Oxide, Fluorinated Ethylene Propylene, Polyphenylene Sulfide, Polyether Ether Ketone, Perfluoroalkoxy, Polyetherimide, Polyamide-Imide, polyamide, polylactic acid (PLA), photo epoxy resin, or photo polymer resin.

Embodiment 43

The system of any of embodiments 41 or 42, wherein the vessel is machined, molded, or 3-D printed.

Embodiment 44

The system of any of embodiments 30 to 42, wherein the drive base comprises metal or plastic.

Embodiment 45

The system of embodiment 44, wherein the drive base comprises plastic and the plastic comprises Polytetrafluoroethylene, polypropylene, nylon, polyester, acetal homopolymer), Acrylonitrile Butadiene Styrene, Ultra-High Molecular Weight polyethylene, High Density Polyethylene, Low Density Polyethylene, Polyvinyl Chloride, Polyvinylidene Difluoride, silicone, modified Polyphenylene Oxide, Fluorinated Ethylene Propylene, Polyphenylene Sulfide, Polyether Ether Ketone, Perfluoroalkoxy, Polyetherimide, Polyamide-Imide, polyamide, polylactic acid (PLA), photo epoxy resin, or photo polymer resin.

Embodiment 46

The system of any of embodiments 44 or 45, wherein the drive base is machined, molded, or 3-D printed.

Embodiment 47

The system of any of embodiments 30 to 46, wherein the motor comprises direct drive or indirect drive.

Embodiment 48

The system of any of embodiments 30 to 46, wherein the motor comprises a belt driven pulley system or a gear system.

Embodiment 49

The system of any of embodiments 30 to 48, comprising at least four vessels.

Embodiment 50

The system of embodiment 49, comprising at least 6, at least 8, at least 10, at least 12, at least 16, at least 24, at least 32, at least 48, or at least 96 vessels.

Embodiment 51

The system of any of embodiments 30 to 50, further comprising a liquid handling system comprising a plurality of pipettors.

Embodiment 52

The system of embodiment 51, wherein none of the side fins contact the pipettors when the vessel is rotated.

Embodiment 53

The system of any of embodiments 30 to 52, wherein the motor controller comprises a computer control system.

Embodiment 54

A method for separating or washing magnetic beads in a liquid or suspension comprising:
(a) mixing a liquid or suspension comprising magnetic beads in the vessel of the system of any of embodiments 30 to 53 by rotating the vessel in a clockwise direction for a first period of time, pausing the rotation for a second period of time, rotating the vessel in a counterclockwise direction for a third period of time, and pausing the rotation for a fourth period of time; and,
(b) optionally repeating step (a) a plurality of times;
(c) applying a magnetic field sufficient to cause a substantial portion of the magnetic beads to adhere to an interior vessel wall;
(d) removing a volume of the liquid or suspension from the vessel;
(e) optionally adding a second liquid or suspension to the vessel;
(f) optionally discontinuing the application of the magnetic field; and,
(g) optionally repeating steps (a) through (f).

Embodiment 55

The method of embodiment 54, wherein the second liquid or suspension is a wash solution.

Embodiment 56

The method of embodiment 54, wherein the second liquid or suspension is an elution solution.

Embodiment 57

The method of embodiment 56, wherein the elution solution is an acid elution buffer, an alkaline elution buffer, Tris-EDTA elution buffer, deionized water elution buffer or a salt elution buffer.

The entirety of each patent, patent application, publication, and document referenced herein hereby is incorporated by reference. Citation of the above patents, patent applications, publications, and documents is not an admission that any of the foregoing is pertinent prior art, nor does it constitute any admission as to the contents or date of these publications or documents. Their citation is not an indication of a search for relevant disclosures. All statements regarding the date(s) or contents of the documents is based on available information and is not an admission as to their accuracy or correctness.

Modifications may be made to the foregoing without departing from the basic aspects of the technology. Although the technology has been described in substantial detail with reference to one or more specific embodiments, those of ordinary skill in the art will recognize that changes may be made to the embodiments specifically disclosed in this application, yet these modifications and improvements are within the scope and spirit of the technology.

The technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2, and 3" refers to about 1, about 2, and about 3). For example, a weight of "about 100 grams" can include weights between 90 grams and 110 grams. Further, when a listing of values is described herein (e.g., about 50%, 60%, 70%, 80%, 85%, or 86%) the listing includes all intermediate and fractional values thereof (e.g., 54%, 85.4%). Thus, it should be understood that although the present technology has been specifically disclosed by representative embodiments and optional features, modification and variation of the concepts herein disclosed may be resorted to by those skilled in the art, and such modifications and variations are considered within the scope of this technology.

When a feature or element is herein referred to as being "on" another feature or element, it can be directly on the other feature or element or intervening features and/or elements can also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements can be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature can have portions that overlap or underlie the adjacent feature.

Terminology used herein is for the purpose of describing particular embodiments and implementations only and is not intended to be limiting. For example, as used herein, the singular forms "a," "an," and "the" are intended to include the plural forms as well, unless the context clearly indicates otherwise.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device can be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers can be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value can have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes can be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Use of the term "based on," herein and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described herein can be directed to various combinations and subcombinations of the disclosed features and/or combinations and subcombinations of several further features disclosed herein. In addition, the logic flows depicted in the accompanying figures and/or described herein do not necessarily require the particular order shown, or sequential order, to achieve desirable results. Other implementations may be within the scope of the following claims.

What is claimed is:

1. A system for mixing liquids and uniformly suspending particulates comprising:
    at least one substantially cylindrical vessel with a center and a radius comprising a vessel opening, a vessel base interior, and a vessel base exterior, the vessel further comprising;
    a plurality of side fins, the side fins comprising a side fin width and a side fin height;
    a plurality of interior projections extending from the vessel base interior, the interior projections comprising an interior projection width and an interior projection height;
    a plurality of circumferences, the circumferences each comprising a circumference radius;
        wherein the circumferences comprise the following radii: 6.4 mm, 14.2 mm, 19.1 mm, 22.9 mm, 26.2 mm, 31.8 mm, 34.3 mm, 38.7 mm, 40.7 mm, 42.7 mm, 44.5 mm, 46.3 mm, 49.7 mm, 51.3 mm, 54.3 mm, 58.7 mm, 62.2 mm; or,
        wherein the circumferences comprise the following radii: 4.5 mm, 13.50 mm, 22.50 mm, 31.50 mm;
        wherein neither the side fin width nor interior projection width extends within 1.5 mm of any of the circumferences;
    a drive base operably connected to the vessel base exterior;
    a motor operatively connected to the drive base, wherein the motor rotates the vessel along the vessel's center; and,
    a motor controller with speed and rotational direction control.

2. The system of claim 1, wherein the vessel comprises a height and the side fin height or the interior projection height is less than 20% of the vessel height.

3. The system of claim 1, wherein the interior projection width is at least 1 mm, at least 2 mm, at least 3 mm, or at least 4 mm.

4. The system of claim 1, wherein the side fin width is at least 1 mm, at least 2 mm, at least 3 mm, at least 4 mm, at least 5 mm, at least 10 mm, at least 20 mm, at least 30 mm, at least 40 mm, at least 50 mm, at least 75 mm, at least 100 mm, at least 125 mm, at least 150 mm, or at least 200 mm.

5. The system of claim 1, wherein the vessel base exterior comprises one or more engagement tabs and the drive base comprises one or more engagement slots.

6. The system of claim 1, wherein the motor comprises direct drive or indirect drive.

7. The system of claim 1, comprising at least four vessels.

8. The system of claim 1, further comprising a liquid handling system comprising a plurality of pipettors.

9. The system of claim 8, wherein none of the side fins or the interior projections contact the pipettors when the vessel is rotated.

10. A method for sampling a liquid or suspension, the method comprising:
    (a) mixing a liquid in the vessel of the system of claim 1 by rotating the vessel in a clockwise direction for a first period of time, pausing the rotation for a second period of time, rotating the vessel in a counterclockwise direction for a third period of time, and pausing the rotation for a fourth period of time; and,
    (b) optionally repeating step (a) a plurality of times; and
    (c) removing a volume of the liquid or suspension.

11. The system of claim 1, wherein neither side fins nor interior projections are within a 12.5 mm radius of the center of the vessel.

12. The system of claim 2, wherein the vessel height is about 5 cm to about 150 cm.

13. The system of claim 1, wherein the drive base comprises a proximal lip with an internal radius greater than the vessel radius.

14. The system of claim 13, wherein the proximal lip comprises proximal lip height and the vessel comprises a vessel height, and wherein the height of the proximal lip is at least 10% of the height of the vessel height.

15. The system of claim 1, wherein the vessel base exterior comprises a friction fit with the drive base.

16. The system of claim 1, wherein the vessel base exterior is connected to the drive base via an O-ring, set screws, or adhesive tape.

17. The system of claim 1, wherein the vessel comprises plastic.

18. The system of claim 1, wherein the drive base comprises metal or plastic.

19. The system of claim 7, comprising at least 6, at least 8, at least 10, at least 12, at least 16, at least 24, at least 32, at least 48, or at least 96 vessels.

20. The system of claim 1, wherein the motor comprises a motor shaft and further comprising a coupling system attaching the drive base to the motor shaft.

21. The system of claim 5, wherein said engagement tabs and engagement slots are configured to withstand the force of a sudden change from a first rotational direction to a second rotational direction.

* * * * *